(12) United States Patent
Vande Pol

(10) Patent No.: US 7,401,036 B2
(45) Date of Patent: Jul. 15, 2008

(54) FREE-MARKET ENVIRONMENTAL MANAGEMENT SYSTEM HAVING INSURED CERTIFICATION TO A PROCESS STANDARD

(76) Inventor: Mark E. Vande Pol, 25150 Mountain Charlie Rd., Los Gatos, CA (US) 95033-8320

( * ) Notice: Subject to any disclaimer, the term of this patent is extended or adjusted under 35 U.S.C. 154(b) by 1350 days.

(21) Appl. No.: 09/819,159

(22) Filed: Mar. 27, 2001

(65) Prior Publication Data

US 2003/0014342 A1    Jan. 16, 2003

Related U.S. Application Data

(60) Provisional application No. 60/192,183, filed on Mar. 27, 2000.

(51) Int. Cl.
  *G06Q 40/00*    (2006.01)
  *G06Q 10/00*    (2006.01)
(52) U.S. Cl. .................. 705/35; 705/1; 705/40
(58) Field of Classification Search .............. 705/36, 705/36 R, 1, 35, 40
  See application file for complete search history.

(56) References Cited

U.S. PATENT DOCUMENTS 5,812,987 A * 9/1998 Luskin et al. ............. 705/36 R 6,253,191 B1 * 6/2001 Hoffman ..................... 705/35
2002/0188459 A1 * 12/2002 Erickson ........................ 705/1

OTHER PUBLICATIONS

Chiles, Todd H. and McMackin, John F.; "Integrating variable risk preferences, trust, and transaction cost economics"; JSTOR; Academy of Management Review; vol. 21, No. 1 ; 1996; pp. 73-99.*
Jennings, P. Devereaux and Zandbergen, Paul A.; "Ecologically Sustainable Organizations: An Institutional Approach"; JSTOR; Academy of Management Review; vol. 20, No. 4; 1995; pp. 1015-1052.*
Paul Shrinastava; "Ecocentric Management For A Risk Society"; Academy of Management Review; Jan. 1995; vol. 20, No. 1; pp. 118-134.*
Smith, Jr., Fred L.; "A Free-Market Environmental Program"; CATO Journal; Winter 92; vol. 11, Issue 3; pp. 1-15.*

* cited by examiner

Primary Examiner—Ella Colbert

(57) ABSTRACT

Environmental regulation by government is structurally incapable of satisfying its mandate. The present invention is an alternative, free-market management system designed to deliver a superior product, at lower cost, with an insured guarantee, and without regulatory oversight by government. The system uses an insured, certified best-practice form of process certification that objectively accounts the financial value of ecosystem resources. The conduct of practice within the system accounts the price of assets at risk and characterizes their function by which to market them for their ability to offset the environmental impacts of industrial, commercial, and residential activities.

1 Claim, 1 Drawing Sheet

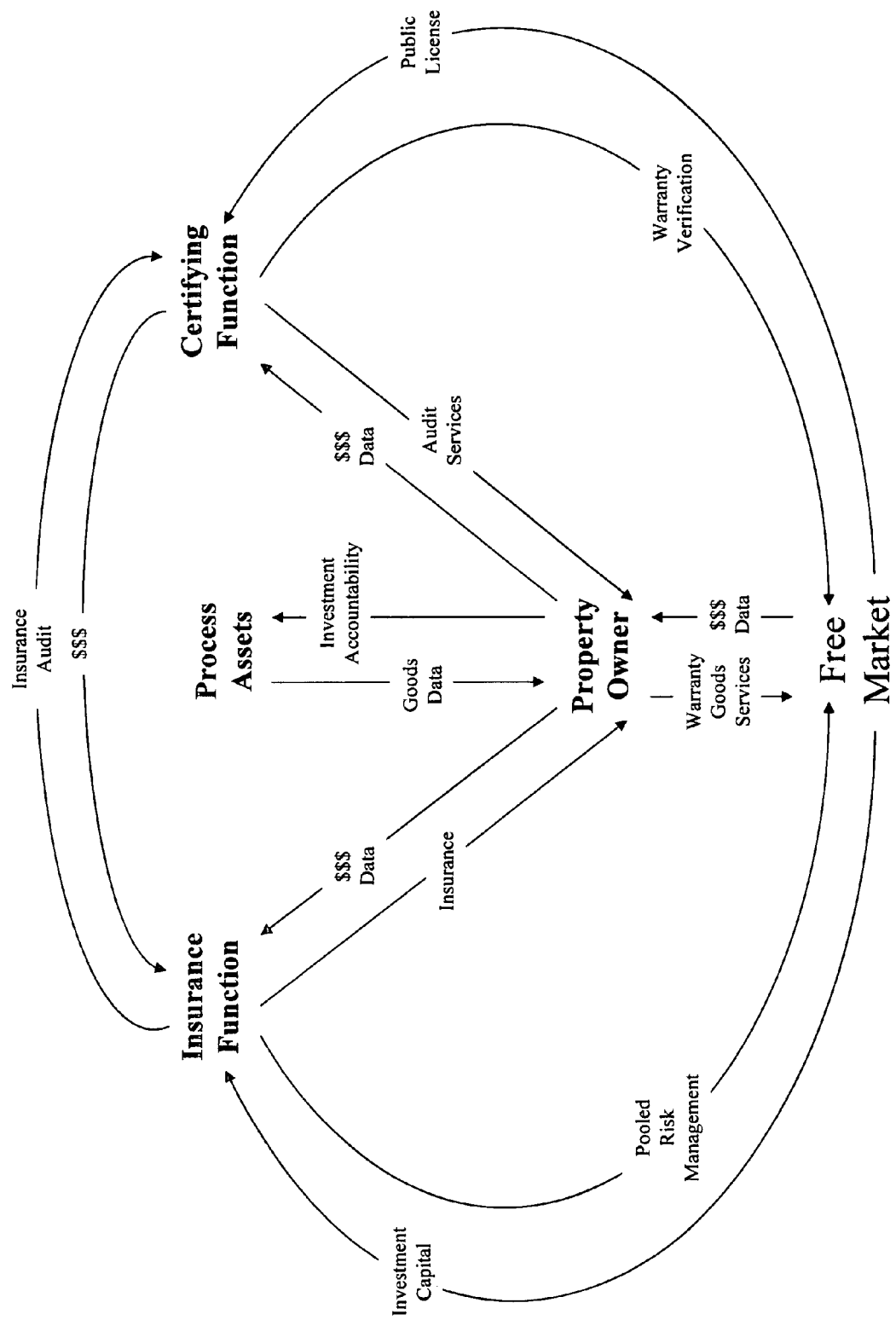

FREE-MARKET ENVIRONMENTAL MANAGEMENT SYSTEM HAVING INSURED CERTIFICATION TO A PROCESS STANDARD

REFERENCE TO OTHER PATENT APPLICATION

This non-provisional patent application claims priority to U.S. Provisional Patent Application No. 60/192,183, filed Mar. 27, 2000, the entire text of which is incorporated herein by reference.

FIELD OF THE INVENTION

Environmental regulation by government is structurally incapable of satisfying its mandate. The present invention is an alternative, free-market environmental management system designed to deliver a superior product, at lower cost, with an insured guarantee, and without regulatory oversight by government.

BACKGROUND OF THE INVENTION

Many people hold well-indoctrinated beliefs that government protects the environment from greedy capitalists at the prodding of selfless environmental activists. Those same people do not think of environmental activists as capable of damaging the environment. Neither of those beliefs is true any more. Meanwhile, adversaries of regulatory policy defensively argue that we are not really doing that much damage and that environmentalism costs too much for things that we must do to survive. The failing of those on the defense is that they rarely offer a preferable alternative to civic regulation other than "less." It is easy to complain about government regulations, but no one will accept an alternative without checks and balances that value the public demand to protect ecosystem function.

The popular truism, that business and property owners are motivated only by greed and that this justifies government control, ignores the fact that the entire history of governments has been one of greed, corruption, and lust for power. Most people would agree that bureaucratic government cannot manage an economy because it is too dynamic and complex for centralized planning. An economy competes with only one medium: money. An ecosystem transacts on so many levels that we have only a very basic understanding of how it works. One should think, therefore, that any political system would be structurally incapable of optimizing complex ecosystem functions. The U.S. government was designed to prevent the accumulation of sufficient power to confiscate property, yet it strays ever further from its Constitutional intent by virtue of its power to control the use of property under environmental law. The power to regulate the factors of production is the power to control an entire economy. Such power has historically devolved to tyranny destructive to an economy and its people. It will not work for the environment either.

"Environmental protection" methods have caused severe ecological problems on lands that have already been disturbed and abandoned. There are hardly any pristine, temperate ecosystems remaining that are not already protected, and some of those are being protected to death. Activist claims and government plans are rarely subjected to objective scrutiny, focusing instead upon continued acquisition at the expense of private property ownership. The aggregation of virtually unlimited civic power over the use of natural resources renders enormous mistakes inevitable. Commons.

Almost all environmental regulation concerns the use of a class of goods known as "commons." These are goods to which no claim of property ownership is recognized and for which the unit price of use approaches zero. Following is an explanation of how commons arise and how a general failure to recognize certain principles has led us to a civic environmental management system.

Living beings compete for control of goods that have relative degrees of scarcity. Whether it is space for roots among competing plants, hunting range, or food stored for a winter's meal, control of goods matters to all living beings as a resource by which to compete and survive. Those goods of which humans retain control are defined as property. Humans survive by the use of property, whether it is one's body, food, shelter, or otherwise. To control the use of property is functionally equivalent to property ownership. Goods cannot be used or exchanged unless possessed as property, whether physically or by social contract.

Goods are not uniformly distributed. Humans exchange rights to control the use of goods in order to combine them to competitive advantage. The process of free exchange transfers control of property. Individual respect for tradable rights requires either respect for a social compact or physical enforcement against competing claims.

Mobility or continuity in a resource complicates the definition of property ownership. Unlike fixed property, mobile and continuous goods (e.g., air or water) can only be controlled by physical containment. For example, humans combine these mobile goods with other chemicals necessary for the biochemical processes of the human body to work. Perhaps the only time the air or water is actually "owned" is while contained within the body.

Are they really contained in the body? Humans can't store the value of air any more than they can stop sweat from evaporating. Humans must constantly exchange air and water with the surroundings. How is it, then, that the air or water is "owned"? Perhaps that which is owned is not the air or the water, but the operating series of biochemical processes that use air and water to perform work while they are contained within the body.

Just as the processes within the body combine inputs to produce and maintain the body itself, natural processes found within property boundaries transform mobile goods into many of the physical attributes of ecosystem assets. Those processes that produce an economic return and transform the state of mobile inputs into products for exchange are defined as "process assets." There are two types of process assets: artificial, such as fences, machines, or chemical reactors; and natural, such as soils, living material, or the processes of the body itself. The latter of these will be called "natural process assets."

Humans combine factor inputs with process assets to produce goods for economic exchange. The sum of process assets and factor inputs, called "factors of production," are either purchased (such as land, raw material, tools, intellectual property, or labor) or merely collected and used without a cost of acquisition (e.g., air or rainwater). Factor inputs, collected without payment, will be referred to herein as "zero-priced goods." Zero-priced goods include: (1) goods sufficiently plentiful that a discrete pricing mechanism is too costly to consider; (2) goods sufficiently difficult to contain that a discrete pricing mechanism is mechanically impossible; (3) goods without identified economic worth or use; and (4) goods with positive and negative worth, so closely balanced that their net market value does not justify a pricing mechanism.

Zero-priced goods are factor inputs for all economic goods. Their potential uses do not change unless a chemical or physical process alters their attributes. For example, the potential uses of oxygen change when it bonds with hydrogen. The uses of water change when it evaporates or inherits pollutants. The changes wrought by process assets upon factor inputs are the "transformation products" of those processes. The economic costs or benefits associated with transformation products, not included in the cost of goods sold, are "economic externalities."

The notion of economic externality is the most important economic concept in the rationale for environmental regulation. Assume the manufacture of a product produces pollutants that cross the plant boundary suspended in a mobile, zero-priced good, such as air or water. The cost of the pollution is not borne by the producer of the goods for sale, nor is it reflected in the purchase price to the consumer. The cost of the pollution is external to the buyer/seller transaction because it is borne by those affected by the pollution, who supposedly derive no benefit from production or sale of the goods. Environmental regulations coerce the producer to incorporate the cost of pollution control into the product, thus forcing the consumer to evaluate its "true" cost compared to other purchase options.

Ownership of zero-priced goods is typically not defined or enforced by contract. To acquire ownership, one simply collects them for use. Their economic value is considered equivalent to the cost of collection, containment, and preparation. That many zero-priced goods are intrinsically valuable is not in dispute; a person certainly needs air to breathe and a commercial fisherman needs an ocean, but in everyday practice, we pay little or nothing for them. Few individuals attempt to own zero-priced goods because the cost of definition and defense of boundaries exceeds the benefits of restricting use by private property ownership. Among resource biologists and economists, environmentalists and politicians, these zero-priced goods have come to be known as commons.

Commons are a superset to zero-priced goods because they include resources that have economic value but their price is fixed at or near zero by social compact. Public parks, though valuable, are commons because no pricing mechanism can be agreed upon among those with an equal claim. Parks are used as if they were free and are, therefore, a commons. The term "commons," then, will be reserved for those goods that, although they might have market value, are used as if the price of acquisition is zero.

Under conditions of decreasing supply or increasing demand, zero-priced goods can rise in scarcity to the point where individual claims are subject to competition. People then expend effort to define property ownership as appropriate to their perception of unit value, positive or otherwise. A claimant will collect, unitize, measure, rent, mark, describe, and exchange property with increasing precision as its value increases. If the goods do not have discrete physical boundaries, then the limits of property ownership have to be defined in other ways, for example, by the manner of their containment or measurement. Once the boundaries to these claims are determined, property ownership appertains to an economic person, whether individual, partnership, corporate, or political. Thus, goods graduate from the status of commons to that of property. To establish the distinctions of property ownership among competing persons, then, requires definition of containment boundaries by contract.

Mobility and continuity render precise definition of property boundaries problematic when the scale exceeds containment limits. Even physical boundaries on land are not static: River channels move, ridgelines are subject to erosion, roads are relocated, even continents drift. In a very real sense, all goods are mobile. The claim to ownership of "fixed" property has thus often had much to do with human perception of permanence within specific boundaries. In part out of response to that mobility, humanly delineated boundaries now reflect artificial lines more often than physical landmarks. The manner in which human boundaries are set, often reflects the cost of measurement and definition for containment more than the distribution of resources.

The issue of mobility becomes particularly troublesome with continuous goods that move rapidly. Whether they are air, water, oil and gas, schools of fish, or migratory animals, as long as they are not contained it is difficult to define the boundaries of property ownership. Some goods move much more rapidly, such as reflected light off a form that someone finds pleasing, or information that provides a subjective perception of well-being in a natural ecosystem. These goods can move from place to place, instantly.

The economic value of these seemingly ephemeral goods is real. People know it. They notice a sense of loss when a customary use has been withdrawn. They get angry when a river that has been dammed engulfs the enjoyment they had, theretofore, derived. They resist the introduction of a shopping mall onto a childhood playground, even if they no longer live in the area. In each of these cases, there is definite sense that one has lost something that one "owns" or upon which one has a claim.

These claims are not always fanciful. A person may have purchased property because of the speculative value of the view, the quiet, the air quality, sparse population, or the availability of groundwater. He or she has a definite sense of ownership of those intangible goods, if not defined by contract, then by habitual use. Whether or not these valued factors were part of the purchase, they are so defended should that use be threatened or withdrawn.

It is difficult for a single person to make a claim against the loss of a use of private property for which they never paid. Because the contested use is inside private boundaries, the claimant enlists fellows to coerce surrender of control of the contested use by the property owner. External claims focus upon the transformation products of the property owner's use (or intended use) that exit the property in mobile commons. The complaints contend that those transformation products are damaging to the use of commons intended by those outside the boundaries. Where such claimants constitute a democratic majority, political means are available to press for legal specification regarding transformation products in commons that effectively restrict the use of property inside the boundaries to that of the majority preference. Hence is the argument that extension of a majority claim on the use of natural process assets transforms the resource into a "democratized commons." Its use is restricted to the majority preference and little or no compensation is offered for legal restrictions preventing alternative economic uses.

To democratize a commons may seem like a good idea at first. In the long run however, is a terribly destructive thing to do to the rights of citizens. It is to convince a democratic majority that taking public control of a particular type of private property without just compensation is in the public interest. The means by which the majority effects collective claims is by controlling social assets, upon which the property owner relies to produce saleable transformation products, outside the boundaries of the property. Public transportation assets (such as roads, rivers or airspace) are necessary to transport supplies and goods for sale. Recognition of the value the property owner's money and bank account is a social resource upon which the property owner has a contractual claim. The police power of the state enforces contracts and maintains respect for private property, as is necessary for the conduct of commerce. Collective action to control any factor of production is a threat to the property owner's economic survival and the source of coercive power. It is a threat to the social compact by which private property exists.

To democratize a commons is also destructive to the contested assets. This is because the maximum number of people then have a power by which to extend their claims upon the use of the resource at a minimum unit price. Claims then proliferate without limit because their cost is virtually zero. There is then no motive to maintain, or improve the condition of the asset, or to invest in controlling the release of undesirable transformation products, because there is no prospect of a return on investment thereby. Private property is therefore effectively destroyed because it has no economic use.

The financial advantages of such tacit property acquisitions can be enormous. As long as a majority claim can acquire control of the use of private property, all it takes to manipulate a market is to buy out the competition with the public's money by manipulating public perception of transformation products. When the people who desire control of the use dominate political contributions, civic and civil powers collude and the individual property owner is easily forced to succumb.

It is to these mechanics that the Fifth Amendment to the Constitution was written to address uncompensated takings. For without a check on the exercise of democratic power to control the use of private property, such claims proliferate until private property virtually ceases to exist. The legislative branch therefore has limited power to directly effect democratic claims, but has every power to write laws regarding the discharge of transformation products across property lines to be interpreted and adjudicated in the courts and verified by administrative government. How transformation products in commons are valued and the manner in which they are discharged in commons then determines the limits of how property can be used.

The courts adjudicate damages resulting from negatively valued transformation products in commons. The few who can afford the investment in legal action and profit by taking competing resources out of production, have every reason to sponsor that first case against a weak target in order to extend subsequent claims over stronger rivals. This is particularly true when the rival property owner produces a different and competing substitute good. An example would be if a developer funded public concerns about the negatively valued transformation products of farming in order to render the use of farmland non-economic and ripe for development. A similar case would be an oil producer attacking the owners of nuclear power plants by sponsoring advocates of regulations concerning nuclear waste.

Lacking administrative capability, the courts seek both technical opinion and enforcement of the judgement from administrative government as a supposedly disinterested expert regarding the use and cost of transformation products. Control of use, and thus property ownership of that use, is effectively taken from the property owner and transferred to government. Regulation of transformation products is then effected through employment of a civic agent with police power to control the use of process assets inside the property boundaries.

Once political or legal means are established to acquire collective control of private property, there is an inverse supply/demand relationship between the degree of control demanded and its cost. Each case can extend the applicability of cited legislation. The rule of legal precedent lowers the incremental cost of successive acquisitions. The property owners gradually lose the ability to finance resistance. Absent a profitable use, the market value of the property approaches zero. After the repeated exercise of external control, a purchase easily covers any remaining claims by the impoverished property owners.

Invocation of police power requires enforcement that is an exclusive function of administrative government. As democratic claims proliferate, legislatures are overwhelmed with technical issues. Similarly, the courts are overwhelmed with cases that are protracted, expensive, and difficult to prove. Democratic demand for expediency exercised, through the legislative branch, has devolved much of both functions, legislative and judicial, to the administrative branch because it has both relevant expertise and police powers. This unconstitutional abrogation of the separation of powers combines all three branches of government into one that derives both its budget and power by manufacturing and enforcing claims on the use of property. The more externalities are identified, the more control is extended, and the more power to control the use of the asset(s) accrues to the enforcing agent. This process alienates the interest of the agent from the democratic majority. The asset has then devolved into a "socialized commons."

A socialized commons is an even greater evil to ecosystems than a democratized commons, because the resource is under the control of an entity with no structural motive to prevent or eliminate ecological problems. Civic management of the environment not only does not work, it has every reason not to work. As ecological problems worsen, as the crises deepen, the claims and power acceded to a civic agent expand while the ability to fund a solution decays. History teaches that this is not a good thing.

The claims by which a commons is socialized are ironically often the same precedents as were used to extend the original democratic claim: i.e., by extending claims against the transformation products of the democratic use of the resource. With the legal precedents in place that were used to take control of the factors of production on individual property, the civic agent now has the legal tools to take control of all private property. Control of the use of land is now in the hands of an agency that is alienated from accountability to the public claim for healthy ecosystem function. The agency instead serves the limited interests of the politically dominant, who gain de facto control of the factors of production.

An example: Consider a ranch. What the rancher owns are the rights to use the assets within defined boundaries. These assets are employed selectively as factor inputs for a specific use, for example, selling beef. Natural process assets (fungi, native grasses, mineral soils, a creek, and soil bacteria) are combined with purchased factor inputs (fertilizer, grass seed, electricity, and diesel), to convert these inputs into starch, cellulose, sugars, and proteins (forage). The rancher combines labor, capital investments in artificial process assets (breeding stock, fencing, or a dam), intellectual property, and zero-priced goods (sunlight, rain, carbon dioxide, oxygen, and nitrogen) to produce transformation products of these processes and inputs. The rancher produces a range of economic transformation products: burgers on the hoof, milk, or logs on a truck. There are also non-economic transformation products of ranching: a pastoral view of the ranch, riparian nitrates, rainwater runoff, urine, feces, forest acreage, carbon dioxide, oxygen, and various other, perhaps unpleasant, gases for which the property owner does not account.

Most of the transformation products of the ranch are economic externalities: goods that do not produce an economic return and that affect the use of commons by others. The rancher earns no proceeds for the view or for brush control in the forest, and pays no penalty for horse flies, carbon dioxide, and methane. These are economic externalities of the rancher's operation.

Suppose the rancher sells some land to pay property taxes. A developer buys the land and converts the use to residential housing. The new residents enjoy the light reflected off the ranch as a view. They may use the ranch for other forms of entertainment, with or without the rancher's permission. They might have invested a marginal sum in the purchase price of their land, because of its proximity to the ranch. They don't particularly complain about the available meat, the quiet of the countryside, or the other positive externalities of the ranch, nor consider that its economic viability maintains open space. They like to go hiking there.

The residents inherit commons containing transformation products of ranching, some of which they consider deleterious to their residential use of commons. To have a case by which to enlist a civic agent in support of their claims, they must focus only upon the transformation products of the ranch operation that constitute negative externalities outside the boundaries of the ranch. They complain to the authorities about the taste of the water, its suitability for swimming or fishing, and the algae on the surface as transformation products in a mobile commons: water. The claimants focus exclusively upon externalities negative to their preferred use of commons as a vehicle by which to enlist a civic agent to enforce a collective claim. An enforcing civic agent is not necessarily a disinterested arbiter. The agent inevitably recognizes that to control the enforcement of the use of private property is equivalent to acquisition of partial property ownership. There is no corresponding propensity to weigh the total integrated economic impact of the ranch because positive externalities of the ranch or minimizing the cost of treatment have nothing to do with the claims against which control of the ranch is acquired. It is a system that focuses only upon harm.

The claimants and agent then focus action upon acquiring control of the use of the rancher's process assets. This is accomplished through regulation of the source of transformation products adverse to their preferred use. The representatives of the competing interests draft rules to be enforced by the civic agent. To manipulate distinctions of method and concentration as to benefit a particular treatment or use of the property is a temptation for corruption because it is at the discretion of the regulator.

As concentrations of transformation products in process outputs approach zero, even minute reductions in concentration can greatly increase the cost of treatment. Both claimant and agent are motivated to select attainment specifications that necessarily invoke the most expensive technologies. As the cost of compliance consumes a higher fraction of the sale price of the economic good, the return on the original use approaches zero. Once the return on assets goes negative, investment in improving technology to reduce production of negative externalities becomes negatively valued as well. No one would develop new control technology because no one could pay for it. If there is no return on the use of the asset, that use of the property will be abandoned, as it has become a zero-priced good.

Both claimants and the enforcing agent are motivated to focus upon concentrations of transformation products that are most difficult to control or attain because it is those properties that yield the greatest degree of control. The fight with the regulator devolves to one of seemingly trivial details regarding differences in specifications, measurements, penalties, and enforcement governing the rancher's use of assets. All of these considerations structurally diverge from environmental health because that was never the objective.

The higher the regulatory cost to control the transformation products, the more complete is the civic control of the use. Collective claims are treated as if they are property because they have speculative value by which to gain control of the asset. The civic agent or its sponsors start to measure and quantify the negative transformation products of the process appropriate to the perception of their value to a residential use. Rarely does either acquiring interest consider the possible unintended ecological consequences of their actions, among other reasons, because they have little experience in ranching and no accountability for the consequences, other than to secure their intended use. The legal process is thus immediately alienated from its purpose to establish justice and the regulatory process directed away from ecological health. As long as there are claims to extend upon the rancher, that use of the land is an asset with which to advance a civic career. There is little civic accountability for determining a successful balance among the competing interests in the use of the land, indeed, very likely the contrary is true. Ecological problems are a source of civic claims by which to control the entire economy, which is antithetical to the purpose of environmental regulation.

Another example: The rancher has a stand of timber. The rancher invests capital to plant trees on the land and uses a combination of zero-priced goods and natural process assets to support their growth. The rancher announces a plan to harvest the forest. The surrounding residents then complain that the transformation products of the timber production process harm their residential use of zero-priced goods. The air could carry dust and noise of chainsaws and helicopters. The light reflected off the property might carry a potential loss of "view-shed." The residents claim that the rancher's use of natural processes that produce trees creates transformation products that degrade the economic value of their residential use of commons that leave the rancher's land. There is seldom a dollar value to such claims; the residents just want the rancher to stop cutting trees.

The residents focus the threat of potential harm to enlist democratic support from numerous urban claimants for protection of "priceless" resources by using similar arguments of harm to urban uses of commons. The runoff from the property might carry sediment into a reservoir. Logging trucks may damage roads. A majority can then exert democratic power to enlist a civic agent to exert coercive force over the rancher's use of collectively held assets, such as the road. Lacking sufficient political or legal power, the residents might enlist a Non-Governmental Organization (NGO) to "force" a civic agent into asserting control of the rancher's property. Where would the resources of the NGO come from? Those who had financial interests in the use of the property would have every reason to make such a tax-deductible donation, for example, a developer.

A civic agent has the power to execute coercion through jurisdiction over public roads, operating licenses, or permits upon which the rancher relies for the conduct of timber operations. The civic agent can block access to the harvest, or place specifications on the transformation products of the harvest such that the control measures are expensive enough to render harvesting the forest unprofitable. An example would be a "zero discharge" specification for silt from timber harvesting. However, erosion is a necessary environmental process that proceeds no matter what anyone does and always has. The smaller is the amount of dirt allowed in the creek, the more impossible it becomes to comply, until the timber becomes a zero-priced good.

The residents never once had to contest the property right of the rancher to cut the trees, but instead removed the option to sell them at a profit. The residents have thus converted the use of private process assets that grow trees within the rancher's property lines from outside the property boundaries. The trees are now worthless as timber, and their residual value is reduced to a specific set of uses: scenery, entertainment, and augmentation of residential value all accruing to the surrounding residents. They have gained control of the use of private property for nearly free, and its only product is thereafter a democratized commons, so called because the use is constrained to a preference determined by majority rule.

The rancher now has no economic motive to invest in the forest. It costs too much for too little return. Meanwhile, taxes have risen because of the proximity of the houses, traffic is making it very costly to make and take deliveries, and suppliers are going broke and leaving town. The cost of compliance is such that the feedlots along the freeway are now more competitive. The rancher tries to cash out whatever is left of the land value to a developer who has sufficient clout to overcome the objections of the local residents. The sale is at a considerable discount to the total resource and residential value. Everybody loses, except the developer.

If the residents have sufficient political power, they can get the State to buy the property as a public park. The use still accrues to the democratic majority and benefits the property value of local residents. If the urban democratic majority, that does not use the park, resists paying for the maintenance, then the forest falls into a state of mandated neglect. It becomes subject to local overuse, pest infestations, fire, and eventual landslides that might even take the residents with them. It happens. Everybody loses, except the civic managers who move to protect the forest from the public. They declare overuse a problem or cite sediment from development and nitrates from septic systems to be a threat to the same creek that the residents had used to take the forest from the rancher. The forest is now a socialized commons serving only the interests of the managing agent. As long as there is a problem with the forest or a nearby creek, the agent now has the power to control the residents. The focus of action will be upon regulating the public, not upon accounting the passive degradation that would require investment in the forest to repair. Indeed, the forest is now held hostage by the agent, who can demand payments to "protect" it by any means, regardless how inefficient. A civic agent has every reason to fail because failure generates justification for additional funding to solve the problem, transforming the forest into not only a hazard, but an economic liability.

In sum, the democratic majority premises its arguments upon externalities that result from the rancher's use of process assets. The employment of a civic agent extends the application of the rules that can then be used to control the residents by precedent, if not by uniform regulation. This example clarifies the legal road from a constitutional republic, to democracy, to socialism. The terminology used herein reflects the exercise of those means.

Collective claims upon private assets can only be exercised against uses of processes that induce externalities to collective uses of commons. The person who purchased the land loses asset value with each newly defined claim. Claims can be multiplied by reinterpreting transformation products as negative externalities. Subjective interpretations enlisting democratic power can be effected simply by manipulating popular opinion. As the cost of acquisition drops to the cost of publicizing subjective opinion, the size of acquisition required to provide the same perception of emotive benefit rises accordingly. The claims become ever larger. The greed for continued acquisitions is insatiable because they are acquired at minimal cost. As the claims proliferate, the asset value continues to decline in anticipation of additional claims and, eventually, any remaining commodity value of the land to its property owner is destroyed. The land is ultimately treated as if it is worthless because its assets no longer provide a predictable return upon investment. The ambiguity, scope, and number of claims eventually meet declining availability of property to take. The claims eventually overlap. The process is unsustainable. It has no means to weigh claims but political. Political struggles over resources with survival value have historically led to wars and revolutions.

Given that the ability to gain personal control of commons is based upon the ability to make a political sale, several factors come into play: (1) a simple justification to maximize the applicability of the claim to individual perceptions and desires; (2) a majority perception that acquisition comes at minimal personal cost; (3) powerful beneficiaries with sufficient personal interest and resources to fund and execute the taking; (4) collective benefits that are difficult to measure or long deferred; and (5) control of communications media to consolidate political forces becomes the means to control the factors of production and key to the control of wealth.

The need to maintain a sense of crisis leads to shortsighted decisions and the unconscious realization of self-fulfilling prophecies. It creates a smokescreen for the exercise of corrupt intent. The repeated application of mechanics like this lead to the unwitting vengeance of self-destruction. A system that so artificially distorts its priorities is not likely to render an objective resolution among competing risks, particularly when there is so powerful an ulterior motive. The more such competing claims proliferate, the more strident are the expressions of concern, the greater becomes the subjectivity of justifications for speculative measures with an increasing likelihood of grossly destructive errors.

To take appropriate action one must analyze the balance of risks under the variety of circumstances as exist. It would take an enormous number of experimental trials. Private capital can provide the necessary financial resources, only if it can regenerate itself. Donated and confiscated public funds cannot do the job. It is just too big.

It is astounding that so many potential risks associated with human action are so seldom weighed against the virtual certainty of errors of inaction. Every dynamic variation in nature has benefits for some individuals and adverse consequences for others; it is the nature of differentiated and competitive systems. It is not uncommon for species virtually to disappear, only to return years later after a natural disturbance, such as a fire, flood, volcano, or recovery from over-predation. To claim that any change in the distribution of natural populations justifies radical changes in land use could be appropriately regarded as extreme until science had proven otherwise. A management system that derives power by constraint automatically biases the system toward allowing no human intervention of any kind. If one prevents action and the crisis never materializes, one can then claim success, whether or not the threat was real. If on the other hand, the problem grows, the administrator can claim that funding was insufficient to solve it, without fear of accountability. This has been repeatedly true in the case of initial infestations of exotic pest species. The confining nature of the "prevent harm" ethic leaves its advocates with the constraint that control measures must be minimally intrusive, even if destructively ineffective. Under the control of those who derive their mandate by environmental problems, the patient will likely worsen, a victim of a self-fulfilling prophecy, no matter how much money is spent in resulting crises.

Any democratic system is manipulated by the politically dominant. It thus comes as no surprise that the property ownership systems the politically dominant propose are to be "collectivized" among the people, but administered by an agency dedicated to their interests. Under such a system, that frightened mob may well get the environmental crisis that they fear.

Property rights as a matter of natural law and as protected by the 5th Amendment really are that important. If the price for the control of land resources is but the deflection of the winds of political fashion, the available wealth to support, defend, and nurture the land is minimized. What ends up forgotten in the political acquisition of "commons" is the need to maximize the economic value of these goods to the land. With the declining public perception of marginal benefit is a declining marginal economic value of the land itself as is exemplified by the distress of farms, ranches, forestry, and mining, worldwide. If we should destroy the economic basis generating wealth found in resource lands, we will lack the tools, money, and knowledge to do the work of habitat restoration and enhancement. Without the objective efficiency of market-based capital allocation processes, the distribution of resources will not efficiently differentiate according to need.

Ecological issues are seldom simple. They vary considerably with different situations and over time. They often involve enormous costs to a few individuals and have public benefits that are difficult to measure. The economic value to the individuals who would gain control of those resources provides motive to invest in making the political sale, regardless of the technical or ecological compromises. It thus becomes unlikely that, in the heat of political and legal battle, the solutions offered will adhere to the principles of the scientific method. The idea that neglect is always benign presupposes that natural systems can fix any problem unassisted and contradicts the very purpose for regulatory policy. How then, do we devise an efficient and objective system that motivates and extends the state-of-the-art of ecosystem management?

Regulating Behavior by Civic Coercion.

Over the course of industrial expansion across America, civic authority selectively ignored or deferred governing decisions about accountability for economic externalities. Whether they were associated with manufacturing, agriculture, transportation, or resource extraction, government made all the final decisions about permits, leases, homesteading, or transportation subsidies. Government also chose to ignore pollution, erosion, or automobile safety until they were serious problems.

The early manifestations of civic management systems took two forms. The first was dispensation from responsibility for economic externalities (of which the history of pollution management is an easily understandable example). The second form was direct subsidy, examples of which are: mining claims, irrigation and flood control projects, public roads, and agricultural price supports. Individuals and corporations have gained these dispensations and subsidies by political and legal means.

A century ago, continuing economic progress was the consensus democratic goal and the political resource management system made it happen. People wanted cheap materials and supported the sale of government resource lands for virtually free. Such popular license was also a serious matter of cultural respect for private property rights and individual freedom. Only after a democratic majority of the voting public took interest in environmental degradation, did government force a change in policy. Though the priorities have changed, that transformation has employed the same political and legal means as originally used to abet the perpetrators. The intent to improve might seem to be genuine, but are the priorities truly any more ecologically sound? The policies of the last 150 years have much in common with the current proposals of environmental activists, namely, they presupposed democratic control of land; they were based upon the political value systems of the day; they mandated single methodologies over widely diverse conditions; they depressed the profitability of privately held forestland; they confiscated the use of resource land for the exclusive benefit of politically dominant urban populations; they were enacted through lawsuits; and there were rapid changes, with enormous economic consequences, under a crisis mentality, and without accounting for side effects.

The debate concerning whose preferred politically and legally coercive path must be used, fails to note that it is the political and legal process that is incapable of optimal, technical solutions. It is not a matter of whether we should allow people to do whatever they want, or whether humans must withdraw from ecological intervention to protect or repair the environment. Political and legal processes are simply the wrong tools with which to best manage dynamic and competitive ecosystems. The idea that government should hold a monopoly franchise to coerce politically preferred uses of private property, presupposes several errant assumptions, namely, that civic policy-makers are uniquely capable of environmentally appropriate economic choices in every instance; that administrative government possessing coercive powers is an objectively disinterested arbiter; that the unintended adverse environmental consequences to the regulation itself will not outweigh the benefits; and that there is no preferable alternative with which to motivate extension of the limits of land management technology.

Most of our critical environmental decisions have come out of courtrooms, structured upon an adversarial assumption: a winner-take-all battle, decided by the uninvolved and technically incompetent. The structural problem, with the use of legal processes to decide environmental remedies, is that they are shaped by bipolar outcomes: whether by adversarial legal process or two-party political system, bipolar decision-making systems are structurally biased toward conflict. Adversarial conflict inexorably proceeds toward a bipolar structure whatever the battleground. Bipolar opposition creates a numerical minimum of possible options because each adversary needs to maximize its contingent. It drives the bases of argument to reflect differentiating properties and reduces the possibility of acknowledging either common ground or external options. The very facts necessary to achieve a satisfactory synthetic solution may thus be omitted from the argument, entirely. Lawyers do not make as much money by ending a contest with an agreement or by finding that the whole point of contention was a mistake. There is little likelihood that a pair of adversaries will opt for a solution that reflects the interests of a third party. The cost of conflict and the subordination of ecological objectives to legal strategy preclude objective study of options appropriate to the resolution of disagreement. Both legislative and adjudicative proceedings sponsor supporting expert opinions, with consequently divergent bias. Legal training presupposes the projected assumption of artful dissemblance, discounting all testimony to the listener's personal opinions. Knowing this, when confronted with divergent testimony, politicians (predominantly lawyers) seek "experts in the field." The points of discussion thus graduate to extremes, respective of their bipolar positions, and diverge from their scientific bases.

As legal strategies overtake other objectives within the activist organization, the collection of expensive data increasingly respects its source of sponsorship by the financial grantors for the research. The money source thus skews the data, much the way opinion modifies perception. The solution set, as intersects the interests of the legal opponent, is avoided as a possible point of unnecessary concession and weakened argument. This process taints the conduct of all science. When government and legal advocacy assume the principal role for the distribution of research funds, the propensity for scientists to serve sponsoring interests increases markedly. Technical decisions are seldom completely deterministic, made instead among countervailing properties that must be weighed. The more complex the system under consideration, the more likely that a large number of technical disciplines will apply. Few subjects are more complex, or involve more technical disciplines, than human interaction with ecosystems on a real project. There are, consequently, no experts who possess the intellect and experience necessary to weigh all practical and technical ecological considerations in even one instance.

The breadth of expertise on a public university campus should render their consultative product capable of integrating a wide range of technical expertise toward solving ecological problems. Unfortunately, the politicized structure of university "Environmental Studies Departments" precludes delivery upon that reasonable expectation. These venues control the process that produces "experts-in-the-field" for environmental testimony in court and before legislative hearings because they control the credential system that confers the status of expertise. Investigation of the distribution of faculty credentials therein reveals a large fraction of social scientists. The politicization of the sciences at universities is a testament to the degree that government and foundation grants have assumed so much control of the universities. It has rendered research results suspect and redirected scientific work toward the socialization of private process assets. It may be bad for science, but it has been an absolute bonanza for the "study-the-problem" business where universities and government have a virtual monopoly.

Besides a subsidized advantage in marketing expertise, the universities have a virtual lock on the raw material supply of graduate student labor. Once a professor receives a grant to fund a study project, he or she can then recruit graduate students to do the work necessary to earn advanced degrees. Graduate students need to specialize in order to get advanced degrees, which focuses their expertise upon a narrow topic. Thus, many of our "experts" are people who know an immense amount about very little, with a low probability that the subject matter will have application to a specific issue. If a problem has multidisciplinary requirements, then a post-doctoral candidate is the wrong "expert" for real ecological problems. The post docs, who aren't offered tenure, need jobs, and more importantly, they need jobs that provide a return on their investments in obtaining that credential. The professors, who distribute the grant money for graduate study, can strongly influence the opinions of the students with grades and potential faculty appointments. They can also influence private consultants, competing for consulting contracts, through the peer-review process.

When a technical team publishes a study report, it must pass peer review to be considered credible. In pure form, peer review is a wonderful thing. Through objective criticism, one learns what is missing, what is unnecessarily pointed or contentious, where supporting citations or data are needed, etc. A problem with peer review arises when conclusions are presented that are sufficiently controversial to upset the gravy train for funding. It becomes a career-threatening move to break ranks. Another factor involved in taking controversial positions is that of simple conservatism: the Precautionary Principle. No one wants to be the authority who said "Go ahead, there won't be a problem," only to regret it later. It is an acculturated willingness to assume that to take no action is harmless, for which culpability is nearly impossible to affix, rather than an attempt to act on an objective degree of risk. It is simply safer to posture as "protecting the environment" than to say that a particular human enterprise is harmless, or perhaps, beneficial.

In order to meet the standards of scholarship, the thesis must properly reflect the evidentiary standards and verbiage of the specialty peerage. The result will be that few outside that group will understand the study well enough to question its conclusions, without technical experts of their own. The real meaning of the data can only be extracted from direct analyses. Research conducted while developing the present invention encountered technical papers whose conclusions were diametrically at odds with the supporting data! It is more common than one would think, that the political product of a study, its summary remarks, have little use other than to advance the particular agenda of the grantor. NGOs and government issue most grants involving environmental issues. The professors who manage these studies maintain their status by publications of the results; thus, their expertise is directly related to their ability to raise grant funding. No grants, no credentials. No credentials, no expertise. No grants, no cheap grad student labor. No labor, no data. No data, no publications. No publications, no grants.

Unfortunately, ecological health is not a thing to win or lose in a litigious fight. In many respects, the real barrier to the service of our charge is the adversarial assumption itself, because it assumes resolution through bipolar conflict. Optimal solutions cannot be subjected to the structural requirement of a binary outcome. Perhaps a competitive system among people striving to do their best for ecosystem health might be somewhat less destructive and more apt to engender cooperative behavior. Political processes, by which environmental prescriptions are currently mandated, are no better. Allegiances to voters no more create optimal syntheses of divergent philosophies, than do legal cases. They are still bipolar decisions that often mandate their compromises among extremes. In cases where one side does not win outright, the warring factions trade whatever they value least. The important factors go one way or the other, depending upon whom is in power, seldom reflecting a harmony of any philosophy.

Within the respective political constituencies, it is the extremists who take charge of the group agenda. These are the people who personally benefit enough to expend the energy toward their respective agendas. Extremists are incapable of either compromise or weighted analyses of relative risk because the competing extremists within their group will tolerate them as leaders only as long as the majority perceives that they are succeeding. Political and legal control systems are thus open invitations to corruption and manipulation by those with the most to gain. It is fanatic, "deep ecologists", corporate grant-makers, and industry lobbyists who advance and define the agenda for environmental decisions, whether anybody else likes it or not. Political appointees prefer to adhere to the realities that are the source of operating cash flow. Public agency employees have the exposure to the costs and benefits of targeted legislation with which to extend influence beyond their numbers. They also conduct either direct lobbying efforts of their own or fund NGOs to do it for them. The system consequently grows irreversibly, without effective challenge.

Government mandates end up as fixed prescriptions because civic agencies are inherently stabile. Nature is neither static nor compliant to specification. If the conditions upon which rule systems operate change over time, then static prescriptions end up being misapplied. We have allowed administrative government to also function as legislator, police, prosecutor, and judge, as funded by the penalties collected. With that much power in control of the factors of all economic production, it is a system motivated to tyranny.

To a bureaucracy, problems justify a cash flow. Those responsible for managing ecological problems are motivated to expend time and resources to acquire and retain new administrative turf, not to eliminate the need. Any civic investment in a new problem thus requires new people and a new administrative body in addition to the old, justifying a new infusion of cash. Problems can thus be considered the assets of the regulatory enterprise. When those problems are a source of income or a sense of personal purpose or social power, just try prying them loose. There are tens of thousands of such people in the regulation industry. They collect paychecks and watch them disappear, just like everybody else. It would be daft to assume that they are, by virtue of either their individual intent or the purported purpose of their work, either evil or benevolent. If you want a place to spend infinite money, and you want it all to go down the drain while the problem gets worse, you couldn't find a more demanding welfare case than "The Environment." There are no checks on this system to assure that it is producing a product that meets the objective requirement to be beneficial. If the system backfires and produces a counterproductive result, there is no mechanism by which it would voluntarily reorganize.

The inherent complexity and intensity of democratic struggles over land use is the reason the decision-making process was delegated to appointed panels of experts in State boards. Unfortunately, as the power of both activists and lobbyists has grown, as rules have propagated into thousand-page manuals, and the competing interests of numerous federal agencies and court cases has come into play, the pressures on these panels of political appointees have left them with both fewer options and conflicting results. Management by appointed boards has consequently devolved to its political and legal origins. The complexity of government rulemaking entrenches a system of opposing lobbyists, either side dependent upon the continuing existence of the civic agency. The only experts in implementation, then, are the direct beneficiaries of regulatory complexity and continued contention. Civil agencies are, thus, inherently likely to develop maladaptive systems.

From the perspective of system-design, punishments for rule violations are means to deal with system failures. The further a practitioner drifts toward the criminal side of legal timber practice without facing prosecution, the greater the competitive advantage in the bidding war for the resource product. Because interpretation of the rules is subjective, a reasonable doubt threshold is difficult to attain. To be fined one must go beyond the bounds of the law. Although a bad actor can lose his of her license, that person can always work under the supervision of another. It just doesn't work. One reason for this mess is that many rule changes are written with ulterior motives. Lawyers demand documentation by which to prove a case. Activists seek to magnify the administrative costs. Practitioners want rules that can be met without ambiguity. The system's attributes end up becoming more important to the transacting participants than is its purpose, which is why so many environmental regulations backfire. The system is broken. It needs a competitor.

Political Manipulation of Asset Value by Regulation. The preceding discussion presupposes that the civic environmental management system is well intentioned, but structurally flawed. The former is no longer entirely true. Once government gets its hands upon the factors of production, it isn't long before industry leaders recognize a patronage system for what it is. When a system is capable of either handing them an oligopoly or destroying them, the politically dominant will learn to take advantage of it to survive. Those with sufficient political pull are obviously tempted to manipulate the deal and sell out their competitors.

The corporate winners use their profits to start a tax-exempt foundation with which to fund political advocacy without the annoyance of campaign contribution limits and the advantage of deniable culpability. They use the charitable donations to lobby politicians, fund groups of NGO activists, and gather data supporting specific legal action as benefits cases sponsored through the NGO. The regulatory system thus ends up a triumvirate among NGOs, industry monopolists, and government regulators. The mechanics work as follows:

1. There are economies of scale associated with regulatory compliance, as with any other cost of production. Capable compliance to rules becomes a barrier to entry and a means to target existing competitors.

2. Rules can be tailored to the advantage to those possessing property with favored attributes. Competitors can be targeted by similar means.

3. Selective enforcement, through bribes, friendships, and political connections, is a problem as old as government itself.

4. Regulatory constraint of supply can raise the capital value of assets in production through monopoly profits.

Private interests sponsoring environmental groups seek to control the asset value of resources that affect commodity prices, chiefly of energy, food, housing, raw materials, and minerals. It is easy to do. One need only successfully attribute harm to a majority interest in the use of a competing resource. These can be either direct competitors or suppliers of a substitute good.

There are numerous tools by which political forces implement political influence of asset value. Examples include tax policy, land use and zoning law, the threat of eminent domain, and regulatory specifications as affects specific industries, locations, markets, or constituents. The purpose of this demonstration is to represent how the politically dominant manipulate environmental regulation to improve the investment return on assets. Political and legal advocacy can be a very a good investment. Tax-based control of use occurs when an asset is taxed as property against what government has determined to be the "highest use" as opposed to that in which it is employed. If the return on assets is insufficient to fund the taxation that use has been effectively taken. Influence is exercised through a few badly paid local planners or politicians. An example is that a developer might find a profit on lots purchased for speculative purposes by advocating adjacent open space through civic acquisition. Urban speculators can influence rents through consolidation of greenbelts around cities by zoning law, public open space district acquisition through eminent domain. The cost of public purchase is suppressed through aggressive enforcement of environmental laws to specifying minute concentrations of pollutants or demanding specific measures for protection of habitat for endangered species. In this case, the beneficiary of the civic acquisition does not pay for that asset.

The public has ceded unconstitutional acquisition of control of resources through laws favoring NGOs that purportedly advocate for environmental protection in the courts, citing increasingly extended interpretations of harm according to existing environmental law. The legal representatives of these corporations cycle through a revolving door as political appointees in civic regulatory agencies. Public acquisition for the purposes of manipulating the value of resources that produce energy is now conducted on a grand scale. Nuclear power has been entirely withdrawn through NGO lawsuits. Species (for example salmon) have been maintained as endangered over the entire Pacific Northwest even when present in record numbers after a cyclical downturn. Billions of dollars worth of electricity was foregone with no demonstrated need and no objective benefit to the fish. The nation's largest deposits of low sulfur coal were acquired through Presidential Executive Order. Gas reserves on the Western Slope of the Rockies and all Pacific Coast offshore oil and natural gas were similarly confiscated, and access to tens of millions of acres of public lands were denied for similar purposes as justified for forest protection. Environmental NGO activist lawyers now sit on the Boards of Directors of major electrical producers who refused to produce plant capacity. The resulting energy crisis across the West has produced tens of billions of dollars in additional revenue to those fossil fuel companies remaining in production. Meanwhile, public land managers ignored the dire warnings of forest professionals that such set asides would induce disastrous fires and seven million acres of those forests burned in the year 2000 alone to confirm that prediction.

The exercise of power in political systems is just too much temptation to trust its players to manage ecosystems out of altruism. It puts the politically dominant in control of all economic factors of production. That leverage is too great to trust our future and our freedom. One has to wonder how it is that such civic acquisition strategies, functionally equivalent to conspiracy, could operate on such a scale for so long. People don't have to exercise conspiracy and collusion consciously for it to be such, particularly when governmental institutions are dominated by an entrenched group whose ideas and perceptions are immune to challenge and unconstrained by accountability. A functional conspiracy can be constructed merely out of acculturated personal preferences and social affiliations at the golf course, in civic organizations, at work, or just among friends. These social groups are powerful people: academics, lawyers, planners, politicians, real estate agents, financiers, and developers, who all share a similar focus to implement their preferences by the means at their disposal. Bureaucrats consider the exercise of preferences to be an entitlement of the assumed expertise associated with a civic mandate. Except for a very few individuals among the development community, the present inventor's research did not discover evidence of evil intent or conscious conspiracy, although there was indication of obvious manipulation, preference, and willing obedience to questionable "requests."

Instead, there is a larger evil. It is an individual sense of entitlement, acculturated through the entire regulatory, activist, media, political, and legal community. It is the subjective propensity to project "what should be done" with private property in service to personal preference and without accountability for the results. This is, by definition, what it is to covet. It is a self-deception, by which one entitles oneself to take the use of property without buying it first. It takes so long for the results of this kind of thinking to manifest, there is so much struggle involved, and there is so much self-reinforcing subjectivity within a powerful social group, that it really isn't hard to misattribute the results and fail to see the consequences of one's own invisible hand. This greater evil is inherent to socialized commons. Nobody would think that it is optimal that nature should be managed under a system that knows only coercion. It isn't logical to expect expertise from inexperienced urban youth, blinded by fashionable ideology. One shouldn't expect solutions from bureaucrats with a structural motive to perpetuate problems, nor should ecosystem management algorithms be designed by politicians and lawyers.

To accuse capitalism of environmental damage because of "greed" on the part of individuals belies the fact that the system we are using has been government resource control, all along. It has always served whomever happened to be in power, whether by political payoff or by majority support. Lawyers, foundations, academic grant hustlers, and NGO grandstanders, many of them ignorant of resource management practice, are now mucking about with the environment just as destructively as any timber baron or strip miner ever has, and on a scale of which they could never dream.

The sheer scale and intensity of the catastrophic fires, the unabated spread of weeds, and the misery that has befallen so many "reintroduced" predators, all have resulted from misguided efforts to force nature to comply with human dreams, coupled with the civic resources capable of making huge mistakes. All are all-too-commonly followed with finger pointing, backtracking, and denial, with the ubiquitous excuse of "insufficient funding." "Mother Nature" is being reduced to a welfare case. It is not fixable by "new leadership," more money, or higher standards of professionalism. A regulatory system inherently does not work because its motivational structure can not be designed according to natural law. Nature is dynamic, adaptive, competitive, and uses distributed risk to integrate individual interests. Free Markets have all of those attributes along with the prospective intelligence and creativity of human beings.

Regulatory government is a tremendously crude system. Compare the number of variables it can handle, the speed of decision-making, and its operating overhead costs against the sophistication and flexibility of a free market. Compare the predictive capacity, adaptive response time, and efficiency of the Chicago Board of Trade, against a County Planning Department. Compare the complexity of producing a permit review to the manufacture of an automobile or computer. There is no comparison. The question really is: How would a free market, motivated to reduce or avoid costs, choose to incorporate the cost of externalities into the conduct of operations? Let's take a look at some clues from existing private regulatory systems.

Existing Private Regulation: Certification Systems as Partial Solutions.

There are several existing certification systems that demonstrate the present invention's applicability to environmental law. Each has deficient properties. The first regards manufacture of electrical appliances, and the second, forest certification.

Insured Certification in Manufactured Goods. Certification companies have no incentive to corrupt their standards for the benefit of any particular industrial concern. The reason is that they have earned their public confidence in diversified markets. The loss of confidence in any one of them would spell total loss for all. In this system, a second level check on their behavior is the financial cost of the reinsurance they carry, based upon their record of misjudgment.

Consider the example of electrical appliances. This industry recognized, long ago, that electrical appliances carry potentially fatal hazards. The products were subject to misuse and damage. Production standards were variable. In order for public confidence to be maintained and to protect manufacturers from either government mandated production standards or capricious lawsuits, Underwriters' Laboratories (UL) was constituted. UL manages tens of thousands of products, without need for civic oversight. Considering that few people worry about the safety of their appliances, can you imagine having to go to Congress or a bureaucracy for every new type of wire insulation? That is what we are doing with the environment. Civic compliance destroys innovation because they have little structural motive to nurture it.

Existing Environmental Certification as Applies to Forestry. The following is a comparative discussion of three existing forestry certification systems.

Type 1: Voluntary Guidelines of Industry Associations. The largest forest certification program in the world is under the American Forest & Paper Association (AF&PA). This organization is comprised of large, industrial producers of pulp and lumber. The purpose of such industry-based organizations are obvious: Weed out the bad actors, retain competitive productivity, and deflect political and legal pressure from environmental activist organizations. The AF&PA certification is a self-policing system. The organization proposes its own standards and requests self-certification of its membership. Because the system is designed by an industry association, it might be specified to the advantage of the big players that fund the association budget. It is easy to bias specifications to favor the attributes of property held by specific owners. No matter what the level of integrity of its membership, the system has a discernable potential for conflict of interest in verification because there is no independent auditing function.

A structure like this will lose a political battle under accusations by environmental NGOs looking to support their organizations by fees for verification "services." "Independent verification" by activist organizations is subject to its own inferred conflict of interest on the part of the environmental NGOs themselves. The NGOs' claim of sole legitimate authority for accreditation of third party certification is akin to the acquisition of market share by political extortion.

Setting aside NGO business ethics, there are legitimate questions about their technical competency for this kind of oversight and no reason for them to extend their standard of competence. Given that the paper industry is a competitive business, this industry rightly fears the kind of political leverage that the NGOs represent as well as the potential violation of confidentiality regarding intellectual property. Such process distinctions can be critical in consideration of approval or disapproval of a specific technology, for example, a type of genetically modified tree or specialized machinery that might have taken years (and millions of dollars) to develop.

There will probably be no way to avoid third party verification. What remains is who should do it, how it should be verified, and who is financially responsible? The AF&PA system design does not accomplish these goals.

Type 2: Third Party Chain-of-Custody System, Audited to Performance Specification by an Accredited Non-Governmental Organization (NGO). There is something intuitively appealing about third party audit systems. It is the reduction of conflicts of interests, a motivational check in the system. The key assumption is the auditor's manifest disinterest, professional expertise, equitable treatment of customers, and financial accountability. Though this system may have preferred applications, unfortunately, the execution of the prototypes has exposed serious deficiencies that necessitated the development of the current invention.

This type of certification uses independent audit to a performance standard or specification. It has components that are desirable. There are also critically deficient attributes for most environmental applications. So far, the way it has been implemented has manifested many, but not all, of the structural problems to be detailed to demonstrate the evils of unaccountable monopoly and the structural deficiencies in conformance specification in environmental certification systems.

There are two corporations now operating this type of forest certification program: Scientific Certification Systems Inc. and the Institute for Sustainable Forestry (more commonly known as the Rainforest Alliance). Both are accredited by the Forest Stewardship Council (FSC). There are several more companies with current applications for accreditation to the FSC, most notably the Certified Forest Products Council (CFPC). If the AF&PA surrenders to activist pressure and seeks FSC accreditation, it would make the FSC the only certification program of this type in every town, otherwise known as a global forest certification monopoly.

The FSC is a NGO incorporated under Mexican law, based in Oaxaca. It derives its accreditation from the likes of the International Union for the Conservation of Nature and Natural Resources and World Wildlife Fund through their member organizations: Greenpeace, the Sierra Club, Friends of the Earth, and the Environmental Defense Fund (to name but a few). The FSC carries a lot more weight behind it than that: the Ford Foundation, the Rockefeller Foundation (Standard Oil), the Pew Charitable Trusts (Sun Oil Company), and Prince Bernhard (Shell Oil), among others.

The FSC program is organized as a chain-of-custody system. It regulates forest practices by control of the customer base through "green" labeling. The idea is that, if the supplier adheres to FSC specifications and operational requirements, and subscribes to independent verification services provided by FSC accredited auditors, they can use the FSC logo on a "green" label. The label allows the supplier to claim the endorsement by the FSC for their standards of practice, certified by the accredited auditor. All that remains is to track the product through the entire supply chain so that an impostor cannot sell goods as certified. There is supposedly a reason for impostors to want to do this. FSC market research indicates that 80% of customers say that they will pay higher prices for products with green labels. That claim is suspect when it comes to construction materials.

Early applications of the labeling and chain-of-custody principles were applied to the case of "dolphin free" tuna or vegetables marketed as having no detectable pesticide residues. These products require no integration into higher order levels of complexity: the fish stays as fish and the vegetables don't change composition unless they are integrated into prepared foods. There are a limited number of things a fisherman has to do to comply and, other than the difficulty of auditing a boat at sea unobserved, it is pretty easy to determine if they are killing dolphins or not. Once the fish is off the boat, it is canned, labeled, and boxed immediately. It is also relatively easy to audit the vegetables by testing samples taken from a store. It gets a bit more complex with timber products.

The essential problem with chain-of-custody systems, is that wood is a raw material that is integrated into a wide range of processes and products: structural lumber, fencing, pressboard, sawdust for pulp, moldings, all in various grades and various lengths. The boards do not come off the log in order and some logs can't make many of the products at all. The boards do not occur in proportions that match demand. The mill must store a few pieces and keep them separate from non-certified logs while they run enough logs to accumulate a saleable unit, particularly of larger sizes or higher grades. It is an expensive inventory problem.

Chain-of-custody is a supply problem of major proportion unless the mill owns sufficient certified forest acreage. If a smaller mill operator sells only certified goods, then they must buy logs only from certified forests. These are often further away, with higher trucking costs and uncertain deliveries. If they must mix log sources because either the supply of certified logs or demand for certified wood is insufficient to keep them busy, inventory management becomes extremely complex. If the composition of demand changes, one is left with either an expensive product deteriorating in inventory or selling it to one who will not pay extra for green labeling. The double inventory factor also greatly increases the complications of optimizing the utilization of materials by highest value grade, which decreases the profitability of the lumber. It also falls afoul of the ecological principle of best use of resources. It either means that the mill operator must have sufficiently high production volume that these inventory accumulations are not a problem, or compose all inventory of certified product.

The amount the consumer has demonstrated willingness to pay for the benefit of certified lumber has been insufficient to offset these lumber production and construction inefficiencies induced by the certification process itself. The property owner just doesn't get very much for the initial investment, much less the additional operating costs. When one contemplates how certified-content, in-house construction might be verified, or would serve as a market advantage, the benefits of green labeling start to appear increasingly suspect. Once someone sells lumber into a house, does the property owner know if it is all certified wood inside the walls? Not all the lumber produced ends up in the final product. Poured concrete foundations use a great deal of wood that ends up unusable or discarded. How would anyone track whether certified wood was used there, by poking through dumpsters?

Worse, if contracts are negotiated among suppliers and retailers for exclusive use of green labeled products there are serious concerns about collusion and restraint of trade. The entire "chain-of-custody" method may well have worked for cans of tuna, from which people can choose among brands on a supermarket shelf, or for vegetables, because the consumer can choose a different store. It is not so applicable to lumber, some of which may be in the frame of a house and not in the sub-flooring because such products may not be available. People are much less likely to distinguish among houses by green labels than among cans of tuna or stores selling vegetables. There are too many ancillary considerations in the purchase of a home that have much more bearing on buying decisions, such as location. Customers usually won't pay a higher price for a house built of certified wood to offset the higher product cost or the difficulty of finding an alternative supplier. When the product has a sole source, such as a book, the decision of whether the book is made of certified paper becomes ridiculous. One can't pick an alternative source of a book and still buy the product.

When asked about these problems, the FSC answer is that chain-of-custody is not a requirement of FSC certification. It is, however, required if the mill wants to put the green label on the wood to get that higher price "promised" by FSC market research. Without the label and the chain-of-custody, the mill can't get the higher price unless there is a customer so rich that they don't care what the price is. If the mill gets the higher price, a lot of good material is wasted getting the specialized product the customer wants at net adverse environmental impact. If the mill can't get the higher price for all of what was cut, what good is it?

There are more problems with FSC certified systems than chain-of-custody. First, the FSC not only claims it can get the mill a higher price for its product, it claims that it is a legitimate judge of expertise in the certification of all forests worldwide. It is demonstrable that legitimate disagreement and ignorance still exist about the best way to manage various single types of forest even where we have been managing those forests carefully for a long time. Thus the FSC claim of expertise, or even its reason for existence, can't be validated.

Second, the FSC subordinates its ecological management to political and social goals. It starts out with the "accreditation" of the FSC itself by its requirement for adherence to all UN treaties, ratified or not: "In signatory countries, the provisions of all binding international agreements such as CITES (Convention on International Trade in Endangered Species of Wild Fauna and Flora), ILO Conventions (International Labor Organization), ITTA (International Tropical Timber Agreement), and Convention on Biological Diversity, shall be respected." This hierarchy immediately politicizes and socializes the claim of accreditation on the scientific conclusions of the subject organization. For example: There are unspecified commitments to "maintain community well being." Who determines what that means? There are requirements to "conserve economic resources." What those are, is subject to economic variation and subjectively-determined as well. There are requirements to "maintain biological diversity" even though some forests naturally go through periods of near monoculture. The UN guarantees the "rights of indigenous peoples," and those guarantees are written into the bylaws of the FSC. What happens if a tribe of "Native Americans" makes a property claim against the land? Are the property owners required to surrender it?

Given that the FSC is a supporter of the Convention on Biological Diversity, and that the Global Biodiversity Assessment specifically endorses the Wildlands Project, does that mean that the use of the land must eventually conform to the whims of the Seville Strategy of the IUCN and, therefore, the Wildlands Project? Does this mean that a forest as certified under the FSC, no matter how well managed for production, must eventually be surrendered to a status of "no entry"? It is, at least, a tacit violation of U.S. law, to agree to contractually require adherence to the terms of rejected treaties.

Third, there is no regulatory benefit to FSC membership because it subordinates its verification to all local laws. There is no added value if the laws are in error or in conflict with those rejected treaties; indeed it is an overlay of additional bureaucracy and puts the property owner in a position of serving multiple masters with differing opinions.

Fourth, there is no consideration of offsetting funds or mechanisms for risk management or means to minimize the cost associated with certification to FSC principles. Nor is the certifying body accountable to fix the problem if they are wrong. If the practitioner fails or makes a mistake, there is no backup.

Fifth, there is no motive for the property owner or his practitioner to improve the limits of best practice for their specific situation. There is, instead, the assumption that the FSC is the seat of knowledge, standing in judgment of the certificate holder for their specific combination of circumstances. How is that any structurally better than the expertise of the local authorities?

Sixth, the FSC is about forests. Who decides the value of other ecosystems affected by the forest, relative to the local circumstances? What if the forests have grown over meadows. Do they care about those? There is no structural means to identify the relative contribution of resources specific to an individual property and foster the best superposition of countervailing interests in that location.

Seventh, because this type of certification is audited to performance criteria, the inspections are subject to the interpretations of the inspector. The interpretation differs from audit to audit, based upon the interests and goals of individual inspector. This is a recipe for graft and extortion, not to mention a headache for the forest property owner.

Finally (and in the judgment of the author, the most egregious failing), once a critical mass of forests are certified by the FSC, what is to keep the environmentalists from changing their minds as to what constitutes sustainability and/or acceptable performance specifications? These organizations are, after all, beholden to their global benefactors. The rules of the group are likely to be defined by the most radical members of an internal structure of bipolar stability. What if someone in the organization dreams up a requirement for "cruelty free" redwood?

If there is an internal coup d'état in one of the governing NGOs, then there is a shift in control of the entire political food chain. What is to keep the social welfare crowd from hijacking the forest from the property owner and the environmentalists to make houses for the poor? What if the NGOs at the UN decide that these specifications are to be subject to an overriding global social need? Isn't this a recipe for disaster?

Thus, the FSC operates very much like a protection racket without the protection. It has but one advantage to the property owner: Because it is the only certification system blessed by environmental NGOs, the property owner and timber operators might be left alone to take care of their forests if they seek the appropriate blessing. These "protection benefits" have been illusory. When there has been dispute with local government over what constituted best management practice, the accredited auditors have historically been of no help, whatsoever. Reports from those interviewed suggest that they fall back upon the "adhere to local laws" aspect of their bylaws and defer to the local authority. Thus, the most important reason that the timberland property owners and foresters have for certification ends up producing no real benefit. The FSC system, however well meaning it might be, is still unaccountable political control of a resource on multiple levels subject to multiple authorities. It is yet another way to lay increasing external claims upon the wealth of the land.

Type 3: Process-Based Systems Audited by Standards Organizations. This third type of certification has favorable environmental properties, in that it starts as a process certification and not a performance standard or conformance certification. There are two organizations offering such certification products, the International Standards Organization (ISO) and Canadian Standards Administration (CSA) (whose product is traceable to the ISO 14000 environmental process specification). The ISO is accredited by UNESCO (which leads us back to the FSC) but so far has had a fair track record for scientific independence, given its technical origins and composition. Neither of these products enjoys support by environmental NGOs. The ISO 14000 process specification is currently in the process of developing a chain-of-custody system, which would be equivalent to restraint of trade by treaty to a bureaucracy accountable to no one.

"Performance" certification systems are designed to prove that the product is adequate. They more seldom address the distinctions of how the processes are designed and optimized to produce that product. They do more for verification to the specification than the improvement of the process design. They do less to integrate quality systems into the mechanics of continuous process improvements than to organize the enterprise around paperwork. More manufacturers adhere to the ISO 9002 manufacturing quality system, which involves verification of process conformance to specification, than the ISO 9001 document that includes a controlled process for design validation. Most manufactured products derive their production and quality problems out of design related problems. So it is with process designs as well.

The purpose, for any certification system design, is to imbue confidence in its ability to verify the trustworthiness and competence of those under audit. What performance specifications do provide is the sense of emotional security attendant to a deterministic outcome. They make people feel good without necessarily knowing why and are thus an easier political sell. Validated compliance to specification does not mean that something will work (much less be optimal), only that the practitioner can prove compliance. That's how the military gave us $200 hammers. It took $200 to prove compliance to specification. It did not make for better hammers.

There is no point in taking the position that anybody knows what is "best" in environmental management. "Best" should be a verified means by which these things are learned, tested, and subjected to independent review upon consideration of the conditions specific to the location in question, not an outcome. It should always remain an elusive target to be pursued with vigor. Our understanding of ecosystems is too ephemeral and the circumstances too dynamic and varied for conformance goals to work among living ecosystems.

To attempt to write a specification that describes the form of an outcome of an environmental product is fraught with the same complications as led to the California Forest Practice Rules comprising over 1,000 pages. Performance specification (rule-based) systems may feel good to customers, but they are not dynamic, adaptive, diverse, competitive, or capable of differentiation—quite the contrary. How is the design of the specification itself to be verified?

It is here that the opportunity and superiority of process certification systems have their greatest opportunity. It is how you do, what you do with stuff, that changes its state. One can verify that one did what one proposed and then measure how it worked. It is here that the bulk of research must be directed, not only to come up with good ideas, but to devise systems by which a practitioner identifies and tests the efficacy of the way process improvements are developed and tested. Specification systems fail because deviation is not allowed.

That is what is not being done with either the ISO or CSA products. These certification systems are designed to prove that the systems the operator uses will deliver a specified output, usually determined by the local authorities! They thus end up functioning as a conformation specification. That they are a form of process validation is an improvement.

Unfortunately, the process specification systems of the ISO not only rely upon chain-of-custody as a benefit; they do little to systemically push the limits of best practice from the design control perspective discussed. They offer no regulatory dispensation. They do nothing to financially manage risk and offer no weighting mechanism for decision-making, nor do they have a financial stake in the successful conduct of experiments. Without these, the ancillary environmental and financial benefits to be discussed in this and proceeding chapters cannot be realized. We can do better than that.

The Need for an Improved System.

Ecosystems are diverse, dynamic, and change irreversibly. They are subject to random events of enormous scope. They operate in an interdependently competitive manner. Their species undergo random mutation, are capable of near monoculture, and are subject to ruthless extinction. Nature is an entirely objective judge of fitness, not to be underestimated. The civic environmental control system enjoys a monopoly assumed to be natural. The extent of its powers is unchecked, irreversibly acquisitive, maladaptive, unaccountable, and indissoluble. Its motivational structure is to perpetuate, extend, and accrue problems rather than to complete a job and cease operation. The concentration of civic power inherently attracts corruption, incompetence, and manipulative greed. It has been thus since the dawn of civilization. It is why the Constitution instituted limited government to guarantee the unalienable rights of citizens.

Plants and animals compete for scarce resources in a manner similar to laws of supply, demand, and indifference, much as people do. Business now applies many of these economic laws by quantitative computer models in its research toward predicting commodity market behavior. Manufacturers must have some idea what the demand for a product might be or they may size capacity incorrectly, either losing early market share with high margins, or wasting capital invested in a "turkey." Investors must have an idea how to weigh a prospective risk associated with an action. They offset that risk by hiring insurers to understand how to quantify and efficiently manage the capital to mitigate an error in judgment. Much of that investment in analytical tools is thus available and applicable toward the management of risk in environmental systems.

Human intelligence is not only adaptive and competitive, it is creatively prospective. The chaos of speculation among independent interests can provide the focus and energy necessary to quantify and model productive ecosystem potential and rapidly adjust the models to new information. A free market in risk management can discount the present value of the respective contingencies into a real picture of weighted options. These are the real blessings of and mandates to personal responsibility, not achievable under a coercive system, wherein people are habituated to avoid blame based upon retrospective experience. There is simply no civic authority that has such capability to manage risk adaptively, as does free enterprise.

Political motives have historically been far more corrupting than a managed and audited profit motive under the rule of enforceable contract law. Political corruption is usually harder to detect or redirect because the individual profit to politicians can be indirect, non-pecuniary, or hidden to avoid prosecution. Civil power relies upon third party audit to make reliable investment decisions. Civic enterprise has the power and scale to avoid scrutiny. The organizational motives of either a civic or non-profit enterprise are thus harder to identify or attribute than is a financial profit on the books of a publicly traded enterprise. When one looks, the economic motives are easily identified, even if the profit via manipulation of the power of government is obscured. The problem is: What alternative do we have once the corrupt motives and acts of the government/NGO cabal are identified and publicized? Which system is inherently more likely to subject its acts to trustworthy verification?

Over the last century, there is a record of nearly 100 million deaths of citizens, by deliberate starvation and execution, at the hand of their own governments. People commonly respond this historical observation with statements such as "that wasn't the U.S. government" and "U.S. citizens enjoy rights under the Constitution," even while insisting upon violation of the Constitutional property rights of others in order to get what they want. Constitutional rights didn't matter to them when they belonged to farmers, ranchers, and forest property owners, but now that these precedents have given eventual control of the use of all land to government, why should people think that "they" won't come after them and their property.

It is paradoxical that the very scientists who advocate biology education based exclusively upon the theory of natural selection, should also advocate the exclusive use of deterministic management systems for competitive ecosystems. With such an ubiquitous example of successful Darwinian economy, and in the name of preserving Darwinian ecosystems, it is bizarre that a society founded upon free-market capitalism and private property rights has assumed that civic control of ecosystems constitutes a "natural" monopoly. With an unbroken history of democracy leading to tyranny, it is frightening that a successful society, founded upon republican principles of limited government, should justify an irreversible accrual of power in the hands of a demonstrably incompetent and historically destructive master.

It is time to break up the civic (governmental) monopoly in environmental management with the introduction of a capable competitor: the free market itself. The problem with that has always been identification and manipulation of checks and balances within the market with which to motivate the individual to account for externalities associated with their uses of their property. The good news about a free-market management system is that the motives of those in business are less confounded with religion or political power. They are thus easier to understand and manipulate because the principles are simple.

Markets can identify the means to find financial benefit in the services that land provides, as long as they are free to do so. Under current law, we are illegitimately saddling with regulatory liabilities, and declaring private assets to be public property, confiscating its preferred uses into democratized commons and all too often serving the selfish interest of a few in the process. We all have that compulsive urge to think about what "should be done" with somebody else's land. We want to assume that we have a "right" to dictate the use of private property as a collective good, instead of purchasing a contract for that use. Civic acquisition robs investment value into those very uses we so highly prize. It is a process of enacting what are, in effect, public acquisitions of what are legally constrained to be zero-priced goods. Once the control of those uses succeeds to a civic agent, the objective means to evaluate and weigh individual cases has been destroyed, devolving to political struggles, as reflect specific interests, not all of which are altruistic.

One would think that highly educated stewards of the land, selling diverse products as appropriate to the topography and resources, willing to invest their own money, and committed to long-term ownership and the improvement of ecosystem function, would be a good thing. Unfortunately, without at least adequate profitability in the investment, it won't happen. Does that mean that these investments have to be wildly profitable to make a free market in ecosystem management a reality? How can an environmental management system justly motivate industrial interests to develop an advancing level of stewardship in order to survive? How do we focus on motivating the kind of forest management and development that represents the best balance of public need and technical capability? How might a market, trading these products, be structured so that the owner maximizes profit through an objective balance between resource extraction and other productive land uses? How do we do that without the unnecessary cost of civic oversight or possible corruption?

SUMMARY OF THE INVENTION

The present invention challenges the assumption that environmental "protection" through politics, regulation, and lawsuits can work for either nature or humanity. The invention operates upon the premise that people can make rational choices based upon an objective measure of self-interest that incorporates the interests of others, and that free markets have the ability to rationalize abstract interdependent interests through marketing services managing actuarial risk. The proposed system rewards rigorous risk assessment, research, and accountability. These principles support responsible expression of individual freedom and protect unalienable property rights.

The invention is a business model, capable of financially accounting the objective value of ecosystem resources into the conduct of operations. That accounting renders ecosystem components and subsystems into tradable assets. The invention applies identified principles of natural law into a detailed structure and explains the rationale for each component, complete with necessary checks and balances. Together, the structural components of the invention produce a regulatory system that is motivational instead of coercive.

Proposed applications of the invention suggest specific pilot programs with which to address complex environmental problems, many of which have eluded existing rule systems: timber and fire management near residential development, exotic species control and pesticide management, the Endangered Species Act, and site-specific septic system management. This application for patent includes examples of how the structure of the system produces the ability to manage highly mobile assets such as water quality, migratory animals, ambient noise, or reflected light in the form of a viewshed. It provides a foundation for the privatization of civic holdings forbidden under the Constitution.

The free-market regulatory system will offer working professionals and university academics within the existing civic system a preferred career choice to civic indenture. The program can start on a small scale as numerous local enterprises in competition with civic regulation, and displace government regulation where it proves to be superior.

The proposed civil verification system provides privately certified environmental management with an insured guarantee. The certifying body audits practitioners to validated process specifications. A competitor in the verification business has every reason to assure that their customers perform at both minimal risk and cost because they reinsure the practitioners. The program requires continuing research and education on the part of the practitioner toward extending the state-of-the-art of resource management practice. Insured Certification, as proposed, must supersede civic permit authority for those under coverage. The system generates necessary accounting data to determine the financial worth of insured ecosystem assets at risk, as part of the conduct of certified operations. This is similar to the manner in which industrial insurers developed our understanding of financial risk, through direct measurement of the scope and probability of an insured loss. The practitioner compiles the data from records of habitat restoration and hazard mitigation projects along with the continuing research as required. That data serves other valuable purposes within the system.

As risks are identified and accounted, investments to reduce or offset that risk become profitable, thus immediately improving the conduct of operations. The use of pooled risk also serves to counterbalance experiments that are more aggressive against those that are less intrusive. Uses of parcels and the nature of risk reduction investments can thus differentiate according to their local attributes. Crude pricing schemes begin to take form with which to trade rights to use those ecosystem assets, capable of offsetting other accounted risks. Ecosystem assets can thus have financial worth, as long as they can be bundled into valuable units. To reduce the cash flow requirements necessary for financial viability, one must reduce the transaction overhead of trade, in contracts for the use of these assets. Transaction volume also helps promote accurate appraisal of ecosystem resource value and reduces the cost of administrative overhead yet further.

Recognition that natural process assets are worthy of investment will induce investors to contribute capital to successful risk-reduction and risk-offset asset-management enterprises. Stock ownership can engage self-interested consideration of others, holding competing assets as overlays within a particular geographical region or spread over the entire planet. Many resource assets are mobile, or have such low unit value that their minimum economies of scale can wildly exceed the bounds of traditional property lines. The solution is to create a property definition of uses of ecosystem process assets that transform the state of these mobile resources. Such process units could operate on a noncontiguous, global scale and overlay other economic land uses that may well have their own boundaries.

The structure of the invention is a synthesis of the following components: certified conduct of insured operations in lieu of civic permit; validated operational processes; audited ecosystem data; valuation of risk through the accounting of mitigating operations; continuing education and research to extend the state of the art; use of a legal description of ecosystem assets as dynamic models describing bounded processes, capable of offsetting operating risks; and civic respect for Constitutional principles protecting unalienable private property rights. These components are structured in service to the following principle: to improve ecosystem health, invest in shares of private enterprises selling uses of natural process assets priced by their ability to offset environmental risk.

Unlike rules, which are simpler in concept than application (e.g., the Forest Practice Rules), one does not need to fully understand principles in order to use them. Nobody fully understands gravity, but everybody knows how to use it to the degree that the applications of the law of gravity, as describes its behavior, are understood. Everybody viscerally understands the laws of supply and demand. A management system, structured according to natural law, will be ultimately easier to use. External assessments of risk and claims against the uses of property are incorporated into the price of either insurance or investments in assets, capable of offsetting those risks. Brokers will offer the services as package deals. Standard units of account will develop through trading.

People don't think about natural laws, because they are immutable descriptions of seemingly obvious truths. That doesn't mean that all the manifestations will be simple. The combinations of applications will be as complex as the cost of overhead will support and the ecosystem under management demands.

BRIEF DESCRIPTION OF THE DRAWING

FIG. 1 is a general schematic of the present invention to assist the reader in understanding the architecture supporting the examples discussed in this Specification. A brief glossary describing the terms on the drawing as apply to this specification follows. In each instance, each entity, whether owner, insurer, or provider of certification services can be individual or multiple entities. For purposes of clarity, these definitions may include lists of applicable synonyms applied to specific examples in this application that are subsets of these more general terms.

PRINCIPAL ELEMENTS

The Insurance Function markets contracts for indemnification services to restore process assets to original condition or for less than contractually satisfactory performance, settles damage claims resulting from losses due to operations, pools capital for investment to reduce both premiums and reserve requirements, conducting actuarial analysis to price premiums, defines the scope of coverage contracts, and funds research and development of new technologies to reduce the magnitude of covered risks. Synonyms are: insurer, insurance, reinsurance, insurance company, and insurance industry.

The Certifying Function audits performance to contract between the Property Owner, the Insurance Function, and the Free Market, introduces measurement technology, and provides validation services. Synonyms for the Certifying Function are private certification, certification process, and certification system. Providers of the Certifying Function include: certifying company, third-party certification enterprise, certifying entity, certifying agent, certifying body, certification enterprise, etc.

Process Assets are resources within a bounded area that transform the state of commons into marketable goods and services. Related terms used in this application include ecosystem assets, natural process assets, resource assets, and land assets.

Property Owner controls, manages, and contracts for services to manage the performance of process assets, invents or introduces new management methods, and is responsible for the performance of process assets to contractual specifications. Related terms used in this application include: property ownership, landowner, practitioner (as an agent for the property owner), etc.

In this instance a Free Market is one whose pricing and exchange mechanics are not under control by an agency of any regulatory government or affiliate (such as the Federal Reserve or the IMF). Its participants are constituted of all legal persons. Although it does include trades in use of process assets that offset risks, these are not "issued" by any agency, but by those who can prove they have a performing process asset capable of providing a specific service.

Transaction Elements

Between Insurance Function and Property Owner

The Property Owner purchases an indemnification contract or equivalent from the Insurance Function.

The Insurance Function optimizes the performance of reserve capital to reduce the cost of coverage, provides capital to the Property Owner to develop new processes that reduce the cost of liabilities of associated with the use of Process Assets or to improve the performance of Process Assets that provide services offsetting risks.

Between Certifying Function and Property Owner

The Certifying Function is one of more firms which offer audit and verification services, validation consultation, analytical services, and aggregated data.

The property owner provides data for validation of conformance to contracts.

Between Insurance Function and Certifying Function

A provider of the Insurance Function markets indemnification to a provider of the Certifying Function which includes but is not limited to covering errors in evaluating the efficacy of or inadequate oversight of Property Owner's validated processes. A provider of the Insurance Function markets indemnification to a provider of the Certifying Function to cover unforeseen events beyond the scope of coverage held by the Property Owner, which is a form of reinsurance.

The Certifying Function assures that the data and validation systems the Property Owner provides are reliable, and markets aggregated data to the Insurance Function with which to better calculate the cost of risks.

Between Insurance Function and Free Market

The Free Market provides Investment Capital to the Insurance Function in the form of stock purchases.

The Insurance Function provides the Free Market the benefits of Pooled Risk Management: effectively maximizing the performance of total wealth at risk, collecting sufficient capital to deal with massive losses, while minimizing the impact of minor losses. They also protect capital at risk from frivolous claims.

Sub-elements of the Free Market in this specification include: suppliers and customers.

Between Certifying Function and Free Market

This relationship is the most abstract element of the architecture. "Public License" is what allows the existence of private property at all. It is the public confidence in any product, contract, service, or medium of exchange under the rule of law founded in Roman law, Common Law, and the Constitution.

Thus the public accepts Warranties and Verification in manufactured goods, just as they accept regulation by police power. The line on FIG. 1 thus represents the application of that public confidence, now expressed in a marketplace for manufactured goods, to the goods derived from processes assets held by Property Owners under this system.

Synonyms include: public acceptance.

Between Property Owner and Process Assets

The Property Owner invests capital to gain rights to control of the production of Process Assets. The Property Owner is accountable for Process Asset performance. The Process Assets provide goods, services, and data by which to control the performance of those Process Assets.

DETAILED DESCRIPTION OF THE INVENTION

This description begins with a dual system to manage the externalities of resource industry. It suggests an optional free-market system in competition with civic oversight. This motivational system audits practitioners to a best-practice standard of validated processes, by a private, insured, third-party certification enterprise. Public acceptance of private certification in lieu of permit authority can be an incentive for a company to adopt practices so excellent that the civic authority need require no permit or civic review process for proposed projects or operations. Permit authority is instead granted by public license or acceptance through the certification process, which relegates disputes to civil liability law.

There is no unequal treatment under the law in this proposal. It is within Constitutional bounds to implement quality systems, demonstrably superior to those set by law. Any person, corporate or individual, who could prove the excellence of their operation under a guarantee, insured by a certifying company with financial responsibility for audit to validated process specifications, would qualify for the exemption from the civic enforcement protocol. The trick is to determine how to define a best practice standard against the myriad combinations of possible products. Generally, the practitioner agrees to: operate under documented, guaranteed, and validated process specifications; obtain insurance to repair, mitigate, or offset externalities; and improve best practice through education and scientific research. The certifying company agrees to: audit validation reports against conditions on the ground; carry reinsurance in case of insufficient indemnity or bankruptcy; coordinate data and supply composite data; and manage complaints and arbitrate primary settlements.

The certifying company would reinsure the already insured guarantees provided by the certified practitioner. It will be financially liable for its own verification and auditing practices and would have to carry its own insurance. Pooled risk is a more efficient use of capital than the existing system of putting up barely adequate surety bonds for permitted projects. There is also a means to address the actual scope of the claim. The certifying entity can independently verify their customers' practices without requirements for hierarchical traceability to a national or international civic authority because they have a stake, both in the success of their clients and in maintaining low insurance costs. Both have every reason to reduce their insurance payments by reducing the scope and frequency of claims. The system is, therefore, self-correcting. Because the certifying entity would carry reinsurance. The guarantees, offered by the system, thus enjoy multiply redundant coverage.

According to the present invention, commonly referred to herein as "Insured Certification," there is no incentive for a certifying company to burden or extort funds from their customers. Unlike certification as currently "accredited" under the FSC, this is a competitive market where the certifying agent has a stake in both customer success and minimal risk of a loss. The necessary checks and balances in this system have multiple backups. This lowers required capital and pools risk further. Insured Certification also holds practitioners to a standard of continuous research, education, and process development, without requiring civic funding of the research. It will do a better job of allocating research funds toward problems, with a technically justified environmental return.

Once freed of the costs of delay in obtaining permit approval, insured timberland owners, foresters, and timber operators will have the opportunity to take advantage of the spot market. They will have advantages of higher margins, lower operating costs, and efficiencies in inventory management with which to offset the costs invested in best practice management of the forest. It would help attenuate the price spikes that tend to motivate rapacity on the part of others by sating transient demand and would reduce the temptation to log more trees to cover costs under falling price conditions.

When asked about certification programs, our local administrative officials respond that they would love to do "differential enforcement." They would focus their efforts on the few "bad" timber operators in the area and leave the "good guys" free to do what is appropriate. Such a policy would be unconstitutional under the equal protection clause. The local politicians display an equal lack of comprehension. To hear a member of the Board of Supervisors call insured certification "autonomous groups running around" betrays the civic assumption that any system must operate under their control to constitute adequate oversight.

Insured Certification to a Best Practice Process Standard

It is one thing to prove that you did what you were told to do. It is another to prove that your systems produce results that meet civic specifications. Once those two objectives are attained, the only claim to be made is that the work isn't excessively destructive as determined by the local authorities. The output can only be defended in terms calibrated by the degree of harm. Whether they are, in fact, minimally harmful, or perhaps beneficial, harm remains the currency by which the results are subjectively evaluated. Why not have a certification ethic that, instead of obsessing on minimizing harm, focuses instead on knowing that the work being performed is the best that can be done and advances the state of the art to improve ecosystem function? The best practice regimen, as discussed, focuses upon continuing education and the collection and dissemination of data ancillary to forest management for these very reasons. It is intended to build the understanding of externalities such that decisions are accurately weighed.

The objective of validated process design and development is to have a means to assure that, not only do continuing operations meet the highest standards, but that new technologies have a high probability of low risk and high return. To incorporate consideration of externalities by insured guarantee is to assure a rigorous test for an idea, to see if it is worth the risks, and to set aside appropriate funds to cover them.

Insured Certification is just a way of using systems to keep us honest and using capital to manage the environmental risk of human error or unforeseen circumstance. Insured certification is not NGO-based; it is instead, entirely business-based. There is no international governing body other than the stock market to hold this system accountable because, if the certifying body does not do a good job, they get to file for bankruptcy and the reinsurance company guaranteeing the certifying entity gets to pick up the tab for the fix. That fact deepens the financial redundancy to three levels. Public confidence in that dispensation is assured by multi-layered financial accountability.

So far, there is not a certification program in the world that has any real market benefit for its customers. Insured certification is alleviated from restraint of trade entirely by its civic sanction to a civil account of civil financial responsibility, similar to UL and its documented and validated record of best practice. Its customers are deemed insurable by their subscriptions and behavior. There is no requirement in it for a single definition of what constitutes "best practice" or a single vendor of insurance—quite the contrary, it is necessary for there to be competition toward that continuing purpose. Let's examine the attributes of the system, as applied to forest management, in more detail.

EXAMPLE

Forest Certification

Certification of timber practice and forestry is being done in places, but there is no unifying effort to render it accountable or reduce the influence of civic authority. As it is, a certified forester, operator, or forest property owner has to maintain the overhead of compliance to both regulating bodies in the hope that consumer demand for environmentally sound practices will pay the higher price for their products. So far, the consensus is that private, third party certification doesn't work for the customer because such pricing premiums are small and the chain-of-custody requirements are odious and counterproductive.

Under Insured Certification, civic permit authority would have competition in the verification business and can still focus its energies on maintaining adequate oversight on a consequently smaller population consisting of marginal, average, or habitually non-compliant practitioners. Thus, there is a market incentive for the contractor to be impeccable. There is competitive incentive for government to improve its efficiency. Further, under Insured Certification there is market incentive for the practitioner or property owner to hire the services of those who would do the hard technical work of improving certified processes. It is possible to reward trustworthy behavior and assist those who want to do the best that can be done. It is high time that integrity was rewarded in our society. The alternative is inherently corruptible.

Most of the paperwork in civic agencies exists, not to improve the quality of the work in the field, but to verify that the practitioner is culpable for non-compliance to their proposal. Performance "standards" ossify the development, implementation, and maintenance of "best practices" by casting a politically-derived set of specifications into a set of checkboxes. Positive incentive to improve best practices ends up missing in the controlling legislation. "Underfunded" government oversight programs, overwhelmed by this paperwork, can effectively absolve "marginal operators" of indirect costs and thus, operate as a subsidy.

Who oversees the government when it comes to ecological impact? There is a record of corrupted officials looking the other way in such matters, the world over. The U.S. Government has already been determined to be liable for over a trillion dollars in cleanup costs for its own operations. No one knows what the bill for the cleanup of MTBE (a mandated fuel-oxygenate, defended by the Sierra Club) in California groundwater is going to be. Civil liability can invoke increased focus on risk reduction process development and loss prevention, in general, because profits are at risk and people lose their jobs if it is not done. Competitive, insured, private certification could assist the incentive to measure and define the limits of liability as well as adhere to and improve preventative practice. Competition in the marketplace assures that it is done at minimal cost.

Insured Certification can eliminate time-to-market delays similar to that of a manufacturer and supplier with a Just-In-Time (JIT) inventory control systems. This allows responsible foresters to take advantage of transient peak prices. JIT systems reduce capital requirements in two ways: they lower the physical capital required to maintain physical and regulatory capacity for peak production rates and reduce the stored inventory required to meet instantaneous demand. Adoption of these systems would also reduce the total volume of trees cut and sold at discount. Until the elapsed time and risk associated with a THP is reduced, these benefits cannot be realized because green lumber has a long lead-time, a short shelf life and a high inventory cost.

Minimizing work-in-process inventory improves product quality and reduces capital costs. It is a law of manufacturing supply chain management. Response instabilities, induced by permit delay, that cause frantic over-harvesting to satisfy a starved market, will likely remain until government gets out of the production control business.

The time is ripe for insurance, priced by behavior, to replace oversight by criminal penalty or waiting for rulings from inexperienced, understaffed, opinionated, and possibly corrupted inspectors. The key to its eventual success will hinge upon how it is implemented.

Structural Accountability. Accountability should be identified and the limits of authority documented for each job. This is another situation where the certification process has real advantages over the existing system. The Registered Professional Forester (RPF), the Licensed Timber Operator (LTO), and the property owner would be free to define the structure of responsibilities if, for example, they are among the same enterprise. This reduces ambiguities in the chain of command on the job and allows for redesign of the structure appropriate to the specific job or the skills of the individuals involved.

Meets or Exceeds Specified Practices. This is a transitional idea for activities not traditionally certified. Once there is an established group, that has maintained and advanced best practice standards for a few years, the specification criteria would be adherence to the validated process standard, instead of those defined by the certifying body, state specification, or customary practice. Many of these functions now occur within the State permit process during Pre-Harvest Inspection meetings, inspections, and the like. If this system is to operate without these actions, then the functions they serve need to be incorporated verifiably into operations at higher levels.

Validated Practices. Process Validation is a big subject. The core principle is that validation is the process by which a practitioner measures the process inputs and behavior against its outputs to acquire knowledge sufficient to operate the process, deterministically. Whole books are written on the subject. There are three types: retrospective, concurrent, and prospective. Retrospective validation examines system outputs and correlates them with measured system inputs to determine if the process is meeting expectations. Concurrent validation measures critical variables of processes while they are in operation to assure that each is delivering intermediate results within expectations. Prospective validation operates with the knowledge that so much is known about the process, its operations are under such control, and results are so predictable, that only monitoring of process inputs and settings is necessary to achieve desired outputs. A manufacturer usually starts with retrospective validation, incorporates concurrent, and works toward prospective.

Validation is not typically used by the forest management industry. It is, however, essential. The problem with implementation is that people who try to do good work take a lot of pride in it. They are so tired of challenges to their integrity and expertise that they get more than a little touchy about it. This is especially true if it requires any addition to an already onerous level of paperwork that might point up something less than perfection. They are also rightly concerned about one more source of blame.

No one can honestly know the quality of their work without monitoring the results of past projects. The requirement of the current law, governing forest practices, is that the licensed practitioners are accountable for their work for three years after completion. Given that the jobs are often fifteen to twenty years apart, this is a farcical standard. The question falls to who should be accountable for, and own, the data.

It is not recommended that any one job function be held accountable for collecting data and record keeping, only that accountability be defined and verified by the project participants. Let them figure out how to collect it efficiently, document, and validate it. The work can be performed under the control of the property owner, the RPF, the LTO, or all three. What matters is the quality of the data and the effective management of risk. Up until now, property owners have been afraid of data and scientists, and for good reason. Why should they want to know they have a unique plant, pathogen, or insect on their land when what it represents is an opportunity for someone on the government payroll to gather information to be used against the property owner and tell them to forgo operations or undergo an expensive fix? This is a legitimate fear when the activities of resource agencies often rely upon fines as a source of operating revenue. The government and the activists have invariably ended up using such data against property owners. Given the motive for subjective interpretation, and the degree to which overlapping and contradictory rules are subject to selective enforcement, it is no surprise that such concerns exist. Why should we expect people to comply with laws that require knowledge to the limits of science unless we have a system by which they are the source of that scientific knowledge?

Another problem with collecting data is that it is expensive. The alternative is the cost of political struggle. One way of making continuous scientific data collection more affordable is to trade it for dispensation from paperwork and delay, from civic review and appeal, and constant political and legal battles through Insured Certification. At least that data is private property.

There is a need for biotic map information, plant census and survey data, geological mapping, documentation of insect populations, or maps of infestations and pathogens, including external threats. The list could become extensive over time. Imagine how useful it might be as a way to identify the origins of an exotic pest vector or plant disease so that it can be treated early, or at least observed in progress. Little erosive rills and cuts could be found before they were notch stresses and landslides. When the recorded data are related to the proper fix, they can become part of future internal process specifications. Results of controlled burns could be incorporated into the knowledge-base to learn how often, how hot, and at what time of year a controlled burn should be and how to best to control each type. This is a huge opportunity by which to develop fuel control and fire management processes.

Validated practice is an opportunity to build an information base that can prevent problems from developing without requirement for unproductive paperwork. It is the foundation for the education processes that lead to an owner's operating manual to the parcel. It is a format to record the progress and control of infestations of exotic species. It is a reporting system for compilation into larger enterprises. It is basis for communication on overall ecological health and land use possibilities. It is a way to assure competent ownership, should the land pass among owners or generations.

This is where the Insured Certification system has advantages over existing verification services. It calibrates relative risk and allows local resources to consider potentially global impacts. It monetizes those constituents of risk and renders the assets that offset them, tradable. The key is the collection and organization of data. The data is the foundation of new environmental management markets. One cannot financially value the elements and interactions of ecosystems, without the understanding that comes only with the creative focus that a profit can motivate. One cannot weigh competitive claims upon ecosystem resources objectively, without a calibrated evaluation of their respective risks of loss.

Data collection may cost a lot at first but so does the uncertainty when managing pooled risk. There is thus a motive to collect information to reduce the cost of actuarial uncertainty. We can put certification systems in place as a carrot for permit dispensations, but without an extant format for the structure of research information, it will be very difficult for that information to have a practical use beyond the bounds of the property. More people doing that work will reduce the cost, improve the tools, and improve exchange of information. This is a demand potential for improved measurement devices at lower cost and software products configured for cataloging this kind of information.

Documented Design Processes and Project Hazard Reviews. Design Control in timber operations? Yes, because it works. Process design is that little fact of life when you get to confront how little you know about what you thought you understood. It is hard to write things down because there are a series of uncomfortable moments when you have to discover how to express what you know.

A formal hazard review is something with which anybody involved with industrial chemical processing is intimately familiar. If you don't think of everything: trace every pipe, valve, circuit, operation, software command, and possible out-of-bounds chemical reaction, the plant blows up, people die, lawyers come running, TV reporters ask ignorant questions and get unflattering pictures . . . . Nobody likes chemical plants that blow up (especially insurers) except ambulance chasers and TV advertisers . . . .

Ecological problems are easier to attribute and harder to prove. They usually involve a tremendous number of variables. If, after a timber operation, there is a landslide, people die, lawyers come running, TV reporters ask ignorant questions and get unflattering pictures . . . . The only difference is that with chemical plants we know that there is an assignable cause that can usually be determined after the fact. It isn't so easy with timber operations, only because we are so ignorant. Sometimes you have to do something about a bad situation with a high probability that it may "fail." Is the cause of the problem assignable? This is where the hazard review becomes essential.

Hazard reviews are that moment when we ask: 'Did I forget anything?' 'What is the cost of failure?' 'Am I on track?' 'Do I need any resources?' They are essential to successful and low risk operations. It is this process of hazard review that builds the project record-keeping that renders risk vastly more predictable and identifies opportunities for improvement. It dovetails with the insurance aspect of the program to be discussed. Hazard reviews are the documentation of the risk factors that had to be weighed before the conduct of operations. If the situation involved an unstable slope that was showing signs of failure, the review documents the risks, properly assures that due precautions are taken (such as notifying people), and attempts the best mitigating steps, under the circumstances. It may be the best that can be done, even if the slope fails. At least there is a way to pay for some of it and reduce the cost of the eventuality.

A classical hazard review process includes a time when all the data, accumulated during preparation for the job, can be rolled into the file on the location, any necessary revisions to process documents incorporated, and action items for needed hazard mitigation generated. If, after the slope eventually fails, one conducts a "post mortem" on the event by consulting the review history, one can then accurately recall if the risks were correctly accounted and a better job can be done next time.

A Record of Continuous Improvement. If an industry's operations involve "The Environment," government does much of the research and development for "free," whether it is timber, agriculture, or fishing. Look at the list of industries and consider their relative prosperity. The incentive for government employees to expend that research toward developing new regulatory markets is so strong and the job security so attractive, that the research product diverges from its mandate, in order to continue acquisitions.

To qualify for a certification to a best practice standard should require private conduct of, or support for, research. This requirement can be met by the activities discussed in the last section. The research can be as simple as that being done now on truck tire pressures and soil disturbance. The work performed by the Monterey Bay Salmon and Trout Project, as supported by Big Creek Lumber Co., certainly qualifies as an example. There is no reason that active participation in a trade organization coordinating the work couldn't qualify as long as the results were being incorporated into the best practice standard, as applies to the supporter and their site database.

Continuing Education and Publication. Without training, there are few means within an operation to develop proprietary process procedures as intellectual property or to validate that processes were performed as documented. The people at the top are often too busy fixing problems and fighting battles to think about the future. The requirement advocated is the maintenance of a documented record of research, development, publication, and adoption of improved methods and practices on all levels of the enterprise.

Would it be useful if the topper understood tree pathology and insect identification and reported data on the way up the tree? Could we train cat-skidders in a smattering of geology, hydrology, and tree root pathology so that they can perform data entry and identify potential problems before they rip into them? Would it be worth the money? The validation step is a check that provides the data. Without that internal confrontation, a training program is a pipe dream.

Everyone acknowledges the value of education; everyone hates the cost. Everyone acknowledges the career benefits to publication; few take advantage of it. The process has been of benefit to every profession. The problem has been that, if one company institutes an expensive technical training program, other companies hire the people away. The biggest benefit of training, heretofore, has been problems that do not happen because of the education of all the people on the job. To this can be added to the best practice benefit of permit dispensation resulting in steadier employment and a safer place to work.

The Society of American Foresters has a series of publications. They are dominated by foresters with the time and grant money for research: government resource professionals and university academics. There is a reason that private forestry so seldom publishes process data and experimental results: It is proprietary information. The nature of the industry makes it terribly difficult to protect intellectual property. Perhaps an open standard, interdependent ownership of ancillary process assets, a financial motive for licensing processes, will produce motives for marketing proprietary information that is related to production from that which relates to overall forest health.

Better comparative, validated data, on operations will help verify whether an intellectual property asset has been infringed. Auditors would have professional liability for inappropriate disclosure.

Transparency of Operations. The single biggest problem with public resistance to timber harvesting is the fact that the public does not know very much about it. If one has to hold a public meeting with movies, charts, and learning aids, it is cheaper than a week of delay on the job or one day spent in a courtroom. If the local foresters got together on a learning package it would not cost very much. It would be worth it. Notify the public of the impact, gather the concerns, write them down and respond. That way, if they have a hassle, the documentation of notification is already in place.

There are foresters that have made an effort to educate a neighborhood prior to a job and regretted it later. The pitfall to the previous idea has been that if a neighborhood is brought together and educated, the act and fact of the education can organize the opposition. Here is how. The activists get wind of the notification, feed the homeowners a load of fear based upon at least misleading information, and provide assistance with a legal battle over the job. The certification system proposed eliminates that concern as follows:

1. There is no permit appeal. The certified practitioner would have a process for addressing complaints. If that is not satisfactory to the activists, they would have to take complaints to the certifying body that would have the independent expertise with which to evaluate the case against the audited record. They can record the claims of the activists and would have civil recourse to recover expenses related to false claims. They can also tell the neighbors that, because of the documented record, the likelihood of a problem is so small, that a claim would have to develop before the certifying body takes action. If there had been an unusual risk, the cost of job insurance would have been negotiated. Remember, sometimes a risk exists whether anything is done or not. Often, forestry can mitigate a risk. This is not about a perfectly safe world. It is about defining systems with which to best manage that risk.
2. Process validation provides the certified practitioner with the historical record of practice with which to refute improper claims. This is a long-term process requiring patience and documentation. The speed with which the job can be done and the reduction in unnecessary bureaucracy will offset some of the costs of additional data collection.
3. Process validation provides a format to compare prospective risk. Site-specific records can be applied to assess both to future proposals and to meet the verification standards of certified audit. It also forms the basis for discourse among property owners and a future market in ecosystem assets.
4. Transparency to audit assures that intellectual property is respected. It preserves property rights to data that drive technical innovation and the privacy of property owners undeserving of specious accusations.

The transparency, advocated here, does not mean that all data (particularly raw data) belonging to the practitioner or property owner are available free to anyone. It does mean that the composite audit to validated practices, complaint and resolution records, and experimental results are verified by the certifying entity and that the verification record is available for inspection. Perhaps composite data of various owners and practitioners for purposes of furthering general research might be available from the certifying body. The rest is at the option of the insured because it is often proprietary information.

Adequate Capital and Insurance. Insurance companies would have to learn to price this kind of risk to sell this type of product. In most cases, the cost of estimated ecological loss is estimated from the cost of mitigation. That information is generated out of the insured certification process itself. This is a bootstrapping process to account the value of ecosystem resources.

None of the recommendations in this specification are terribly complex manifestations of the principles described. There is ample risk of capital loss that is associated with civic environmental management to interest the participation of insurers. These introductory products and markets will create the opportunity to learn how to price and finance risk reduction, as part of best practice management. These products can then differentiate into new markets. That is the beauty of incremental implementation. The insured best practice management system proposed here can supersede regulatory management as new products and processes are proposed, tested, and improved.

One objective of the program is to verify that design of the management system by the property owner and practitioners under contract will combine to minimize overall risk. The certification process must, therefore be about how these people go about learning and verifying experiments to determine what the best available options and to assess the quality of risk analysis on the part of the practitioner. What is missing is how to price the risk. Insured Certification can do that.

The Price of Risk in the Cost of Goods Sold. This discussion will start at the level of the individual resource enterprise and demonstrate that, at even this simple level, a free market in risk management of resource enterprise has immediate benefits. The effects of the Insured Certification system go further than to assure accountability. Besides the obvious benefits to be realized with a motivational system on the micro-systemic level, the benefits of the Insured Certification system extend to novel macro-system management enterprises with ecosystem products priced by their capability to offset measured risk. Though it may be decades before these benefits can be realized at full scale, there is every reason to start small and work toward larger and more complex manifestations.

Insurance performs many economic functions in a market economy beyond its primary objective of paying the bill in cases where there is a loss. The cost of capital, used to offset risk in the production of a product, incorporates consideration of that risk on the part of the buyer. The buyer of a product doesn't need to know how safe the factory is or if tornadoes or droughts are a high probability in its production. They automatically weigh that risk against both competitors within that industry and the relative benefit of substitute goods. They don't need the equivalent of a "green label" or a certificate on the package for these risk factors because the cost of risk management is included in the cost of the production.

Our knowledge of industrial insurance pricing has evolved over a long period. The insurance industry has derived its historic estimates of the risk of capital loss by factoring the present value of the asset at risk against the estimated probability of a loss. Early insurance markets for cargo shipments used the knowledge of the construction cost of ships, the purchased price of cargo, the history of losses, and news of current risks in transit to a particular destination to estimate bids for insurance contracts. That data set also directs efforts to reduce the cost of mitigation and lower the probability of loss, thus lowering the total cost of risk.

The process has continued for centuries and has involved a huge number of iterations constantly reevaluating historic risks against those associated with new information. The result has been improved reliability, safety, and reduced cost of industrial products, while simultaneously managing the pool of risk capital more efficiently.

Let's examine the principles of asset value and loss probability against the historical industrial example to see how they might be applied to environmental management in two recurring phases:

First: the value of assets at risk is estimated from the cost accounts of acquisition combined with the settlement records of related losses.

Actuaries must have an accurate measure of the replacement cost and market value of the insured asset and the probability of its loss over time, in order to price their risk management product. The financial arms of insurance companies are not, however, experts in auto mechanics, medicine, construction, or law, much less the specific process practices of the insured. They don't understand the cost of nails, the price of bandages, or the cost of downtime in a chemical plant; instead they have access to the audited accounts of the insured and similar records of operations of other enterprises. If they require outside information, they can either permanently hire or consult as required in order to render technical information into both accurate estimates of asset value and probability of objectively defined, accounted, and attributed harm.

Raw data for the calculation of financial risk is derived prospectively, retrospectively, or experimentally. Prospective asset cost information is acquired through analysis of the proposed design and construction costs of physical plant, and estimation of the extent of damage due to types of possible incidents as part of a hazard review. Often, an analysis requires independent verification of experimental or design data. These values are adjusted with other prospective expectations such as interest rate and inflationary expectations, and estimates of functional life versus product life cycle. Retrospective analyses include historical construction costs of similar assets, profit and loss on continuing operations for the analysis of business interruption insurance, and histories of legal settlements.

Asset risk assessment must consider the cost of loss mitigation. These include assessment of physical assets such as estimates of useful life, and residual value, and human resource assets in medical care, training, and rehabilitation. Accounted mitigation costs are particularly important where the loss is a significant fraction of the operational asset value or where it has subjective market value, as in the case of human pain and suffering. In any of these cases, audited accounting data provided by the insured or usual and customary settlement costs are critical to deriving "higher order" insurance pricing information.

Second: Loss probability is projected from real time inputs and historical records appropriate to the attributes of the asset under coverage.

To complete the total pricing of risk requires not only assessing the capital constituents under coverage, but also computation of the probability and extent of a loss. Whether it is frequency of floods, tornadoes, or trucking accidents, pricing the risk of loss is related to how often, and under what circumstances, losses occur. Probability of loss is calculated from the frequency of claims against attributed causes such as accidents or natural disasters. Other estimates are derived from laboratory experiments conducted by institutional organizations. (Underwriters' Laboratories has developed invaluable technologies investigating causes of failure and means of risk reduction by experiment.)

There are many ways to reduce the cost of risk. One could build better houses to reduce the damage due to earthquakes or choose to build them elsewhere because the cost of earthquake insurance is just too high. Once these costs are measured and the probability of loss calculated, a relationship develops between the cost of reducing the size of the loss, inherent to the product, or the cost of avoiding the sources of loss. One might choose to build houses that can resist a magnitude of 7.0 on the Richter Scale without damage, but to do so for an 8.0 or greater that appears only every 100 years or so may not be worth it. The decision will be a balance between the capital cost of building houses engineered for 7.0 and the operating cost of insuring losses against 8.0 quakes, versus the price of houses elsewhere. The market will seek to minimize the total cost of houses in earthquake zones, to be competitive with houses elsewhere. The key to the decision is to understand the costs associated with repairing or preventing losses due to earthquakes. Whether it is a Northridge Earthquake, Love Canal, or Bhopal, the estimates of the frequency and severity of insured losses derive from historical data. Without data, we cannot calculate the cost of risk.

There really isn't much of a financial difference between an investment risk and the risk associated with an insured loss; in fact the latter is more predictable when the risk is spread among many customers. Analyses of pooled risk data have been shown to have severe limitations when attempting to satisfy the demand for accurate attribution of large financial risks to the individual owner of an asset. This is particularly true in the case of financial loss due to causes for which there is no historical basis. Although this makes selecting the appropriate risk instrument difficult, the market has striven to provide a risk management mechanism against that event.

Because of the need to retain fungible capital, it is now common for large corporations to purchase insurance against an unexpected financial loss or even earnings below projections. It is a way of, for example, dispersing the risk of an investment in a specific new technology that may be rapidly superseded due to an unanticipated competitive entrant. This is particularly the case in a market where, though the rewards may be enormous, the term of development is long, and risk of failure is high; as for example in the development of prescription drugs. As financial instruments have matured, they have extended beyond the mere probability of a loss into a set of purchased financial outcomes. The market prices of these options readjust constantly as new information changes the probability of a particular outcome. In this way, specialized knowledge of the causes and effects of probability variation are accommodated by pooled ownership of risk through successful hedging.

Compare the sophistication of free-market risk management to the political valuations of civic risk management. It is no contest. Free markets are so complex that no one really understands how they work. Somehow, that does not keep us from using them to manage risk. Current research, to price financial risk accurately, is focusing upon integration of the total population of actual transactions of both asset value and loss probability, such that specific knowledge can be correctly applied to particular cases. This includes research and development investments with long lead times, with a risk of supercedure by competing technologies. It takes enormous computing power to integrate millions of individual transactions and extract their appropriate analytical constituents, and pooled risk can do much to protect invested capital.

Even if resource assets, such as forests, are not at high risk compared to insuring profit expectations in the prescription drug business, there is no reason that similar analytical instruments cannot move down-market as the power of computing drops and the accounting of loss estimates improves. In the case of the environment, the only remaining theoretical need is for accounts of the cost of mitigation and loss history data to be developed. The models and computational tools exist or are developable; what we really need is infinitesimal data, the nails, bandages, and labor hours, of pricing environmental assets. That is where the system design of the current invention to require collecting that data applies to its greatest advantage.

Weighing ecological risks has been difficult because we don't understand them very well. One reason that they have been subjected to political valuation is that we have had no account of the constituents of risk. The publicly purported threats are nearly always drastic, subjective, and almost always leveled by immediately interested parties. We don't have the data. Although we have nifty analytical tools, we don't have a decent knowledge of the economic attributes of, and risks to, ecological assets.

Property owners own the source of that information; they just haven't measured it. That information is generated as a component of the Insured Certification process. Insured Certification uses a similar combination of asset analysis, loss history, and experimentation to compile the cost of environmental risk, as did the development of classical insurance pricing. It starts with tangible and recognizable economic risks and motivates development of financial risk management instruments applied to environmental risks. That the risks can be weighted and reduced by the behavior of the insured, renders the system a just means of incorporating the cost of externalities into the cost of goods sold. There is a way to get the owners to want to generate the necessary source data, even before it is consolidated into higher-order information.

The Insured Certification process standard operates as a positive feedback loop that lowers the cost and risk of hazard management and mitigation. It simultaneously generates the data that accounts the cost of risk and identifies risk-offset opportunities. There are five aspects to the invention that bootstrap the proposed environmental risk valuation mechanism:

1. The best practice standard includes research, data collection, and continuing education. It directs the data acquisition of environmental knowledge toward methods and applications. The data thus has leverage both toward the immediate resolution of problems and the eventual characterization of the cost of risk. The companies in the certification business will want to charge competitive rates. The entities responsible for verifying the conduct of operations thus have a stake in customer success for two reasons. First, they don't want to pay the higher premiums because of the cost of insurance claims that they would have to pass onto customers. Second, they need to minimize the overhead cost of verification to be competitive in the price of certification services. There is another set of counterbalancing considerations on the part of the insured. When the insurance customers are purchasing coverage, they have reason to reduce the probability of loss just as driver has a reason not to get a traffic ticket. There is a reduced motive to over-state a loss because of the risk of a higher price of coverage. The system is bi-directionally self-regulating, similar to other insured industries.

2. Process design control, inherent to the type of certification proposed, produces verified objective inquiry toward improving the limits of practice in order to reduce the cost of risk. The dual verification systems of certified financial accounting and process standards validated by audit, assures that Insured Certification processes are capable of delivering reliable data. There is no reason for the insured not to market mature process designs as long as the reliability of the system assures low risk and addresses concerns that intellectual property will be respected.

3. Risk management, based upon multilevel insurance, places a cost on risk that a prudent investor in process knowledge will seek to minimize. This predisposition leads to investment in activities designed to reduce the probability of loss and improve the productivity of the asset. In the case of forestry, these natural process assets include those that support and depend upon the growth of healthy trees.

4. Verify risk reduction history to justify lowering the price of insurance. That takes data. The logic here is thus a program loop, with a decision point:

Once risks associated with continuing operations are reduced to the point of diminishing returns, what is the practitioner to do with this "stupid" Insured Certification requirement to keep studying and collecting data?

5. Apply the research and continuing education toward an ancillary ecological problem or new opportunities on the property in terms of how it interacts with its surroundings. Here is where the results of continuing education and research come into play. One may have been learning about the cost of murrelet losses due to predators based upon the attributes discovered during data collection and the price being paid for coverage. Is there a way to reduce that predation? One could sell that information to help get the murrelet delisted. We may have been learning about the cost of weeds based upon the labor expended for control. Are there better ways to reduce seed transport? Should we use a pre-emergent in the washing of heavy equipment? How and where should that be done? Once these questions are asked, concerns about the manner in which the surroundings affect the operational costs are considered as part of total costs. With consideration of those costs comes the opportunity to consider the ecological interactions of the property with the rest of the planet.

This is where the Insured Certification regimen, as proposed, begins to gain power toward motivating solutions to larger ecological problems and discovery of environmental business opportunities. The program gives both the practitioner and owner reasons to learn and motive to experiment while maintaining consideration of the risks associated with deviation. It gives the certifying entity a reason to assure continuing reductions in the cost of risk. This takes scientific experimentation and accurate data. The manner in which experiments could be conducted, will perhaps start being distorted by more transient forms of self-interest. Is this a problem? Are we concerned with the nature of the practitioner's perception, skewing the objectivity of the data? Perhaps. It's pretty common to ask a forester a question about forest health and get an answer back in terms of increased timber production. That is, after all, what they get paid for. If however, they were paid for what was a more integrated perspective of total ecological health because there was a cost of risk in continuing operations without that consideration, the answer would reflect that broader perspective.

Research. The insured certification and best practice standards motivate the scientific collection of data and the differentiation of methodologies. Intellectual property laws motivate the license and dissemination of the acquired knowledge. Competition selects the best methods and rewards the inventors.

Many multivariate designed experiments have simply too many possibilities to be practicable. These circumstances engender the need for crude screening trials and acts of what might seem to be spontaneous judgment. Occasionally, one has to push a control variable out of the expected range to the point where the process doesn't work at all in order to test a process principle. If you can't trust the person doing the work, you have a real problem. The trick is to capture the data properly and communicate it to others to render the trial or record useful, and to confine the scope of the experiment to limit the damage a mistake might do. To learn how to make things more rugged, we occasionally have to test them beyond normal operating limits under controlled conditions. It is akin to analyzing automobile design safety by studying crash data. Conformance specifications, particularly those that are risk averse, will never allow such things. They are simply too rigid to perform good science.

An example is the clear-cut. There are experimental data suggesting that, in some types of forest, a clear-cut with an extended reentry time is ecologically preferable to selective harvesting. In other types of forests, this could be an outrage. If the governing body specifies group selection harvesting methods and uneven-aged forests as an output, you may never know which system is better under local circumstances. If instead, the property owners propose an array of approaches with careful, independent scientific monitoring and data collection, out of a verifiable effort to prove how best to manage each type of location on their property under a constructed array of carefully selected circumstances, why should they not find out? All that remains is to weigh the risks involved and pool them. This is where the hazard review and pooled risk offsets under this invention become essential.

Meadow species in many areas are truly threatened, far more so than forests. Meadows are principal stores of biodiversity and are the reserves of species that repopulate a forest after a fire. Meadows are threatened by development, fire suppression, and by exotic species that rapidly convert them to a foreign form of chaparral and thence to forest. Meadows are cheaper to develop for housing. Historically, they were first under the bulldozer. Given the history, we may need to create a few meadows artificially that might serve as fuel-breaks for prescribed fire control and to maintain and distribute replacement species. Would landings do under some circumstances? It could well be that, under some circumstances, concerns about forest "fragmentation" are more figment than fragment. We just don't know. What is the risk? If a "rolling wave of succession" method of forest management were proposed as a controlled experiment, what would it cost to mitigate? This is how risk management offsets the desire to invent pseudo-experiments designed to maximize the take from the land and lower costs for those who would do otherwise. Such an experiment as a clear-cut would come at higher risk and therefore, cost more to insure.

The best practice may well change over time, in fact it must. Climate change, natural disasters, and changes in technology will force such continuous development anyway. Would it be preferable for us to have proven contingent process systems in place for the adaptation to changes in external conditions compared to universal government policies? What if somebody invented a machine that could harvest a redwood by merely ripping it out of the ground like a large garden vegetable and thus simulating the fall of a mature tree in nature? Should we grind some of the stumps instead? Should we replace caterpillar tracks with walking machines? Would it be worth it to reduce skid trails or reduce seed transport? Could we make biodegradable foam curtains or blankets that would contain prescribed strip fires at a riskier, but more biologically appropriate times of year? How would we best use such tools and what problems are we trying to solve? The process of continuous investigation is the way such questions are generated and answered.

None of these problems are solved unless we allow the questions to be asked. The measurements will be meaningless unless they are motivated toward useful purposes, else the answers will have no correlation with the actual conduct of economic operations. Productive purposes are the essence of discovering the wealth of knowledge unforeseen, in part, because the experiments are investments in profits that fund more tests. But what if the experiments don't work?

Mitigating Circumstances. Reversing course costs time and money. The practice of mitigating environmental risk in private hands accounts the price of offsetting the cost of errors and disasters. This improves the accuracy of estimates of the price of environmental risk.

Suppose we continue with our grossly oversimplified meadow example: add a converted patch of forest to a landing to create an indigenous meadow as a natural firebreak, seed reservoir, and access area. The idea is that we can work a minor clear-cut across the forest front leaving a functioning succession process behind like a waveform over perhaps hundreds of years. We rooted out stumps and hired an expert botanist who planted native grasses, locally collected wildflowers, bushes and broadleaf trees. What we got was an infestation of star thistle from a dirty tractor that dried out all the natives and killed them in three years. As an experiment, it was a failure. We have choices now: sterilize and replant meadow, or replant a forest. Let's say we doggedly do the former. Now we find that we have a nifty firebreak, a great tractor washing process, and know a great deal about the process of meadow species propagation and succession, and even more about how often to weed, based upon the type of infestation. There are other problems, however, when it comes to weeds, the birds and deer bring them in anyway. It's a two-acre flop.

What about a forest? It is going to take over a hundred years before we get back to where we were and with significantly reduced productivity during the interim. We plant the trees, protect them from browsing, get them growing, and do the requisite stand improvements for 50 years. We also have to devise some other way to confine the prescribed burns. The whole time, we kept track of the cost under a project authorization. The costs? There was lost income and increased insurance, the prescribed fire experiment had to be written off. At least we can sell the results of the experiment to an insurer or forest owner who wants to know what the risks are in trying such a thing. Perhaps someone else has a few ideas how to prevent the problems we had. Their insurer might pay to know what the worth of the risks might be.

Under Insured Certification, much of the actuarial cost data will be derived from compilation of financial records of just such mitigation projects, pest eradication efforts, propagation and reintroduction exercises, as well as insurance industry experience. Learning the cost of repair is key to learning the cost of risk. Giving people a reason to measure and lower those costs is far better than simply passive measurement. There is no point in the kind of compartmentalized intent so commonly found in government and NGO-funded projects, bounded by contractually limited scope with the exclusive intent of busting somebody for something that may not be ecologically important. The data can be rapidly readjusted with changes in the market price of risk, associated with successful reduction in its cost.

The property owner accumulates data, not only on products that now have tangible resource value (such as timber), but also on the other physical and biotic attributes of the property that someday might have such value. As these are catalogued and measured over time, the processes particular to that location, by which its attributes transform the state of commons, become apparent. That leads to a process of discourse in higher level functions with other participants with commonly held assets. It identifies those whose behavior is a threat to those assets. Such processes of communication lead to negotiations by which to weigh their relative value and offset the risk.

Insurance, Warranties, and the Like. Some people are bound by their promises. We get really upset whenever we pay for a product that doesn't work and rightly demand a warranty before we buy it, which we thus usually get. We expect the makers of a product that causes subsequent or collateral damage to pay to redress the loss. We usually get that too. Insurers have to deal with uncertain outcomes among unique circumstances. They are masters of the actuarial mathematics of probability, game theory, statistical uncertainty, and hedged sets of possible outcomes. Such is ecosystem management. Here again, the market has modalities to deal with the risks associated with managed ignorance.

Competitive pricing of risk in ecosystem management is environmentalism with an insured guarantee. Government offers no warranties for its control systems. This proposal allocates managed funds to redress mistakes if they occur, and regulates behavior with the price of risk. Insured Certification can do things that government never will. It can guarantee a degree of efficacy of practice. It motivates all involved to minimize the damage due to a disaster. It can offer protection associated with damages. It can efficiently manage risk capital to rectify a problem. By contrast, government assumes no liability associated with its monopoly to verify conformance to its own specifications. The government will provide FEMA after a disaster and fix problems, with borrowed money after the source of cash flow has been destroyed.

Many major insurance companies are short of both new markets and better margins. Many others are looking at enormous liabilities in regulated markets with no means to manage the risk. What is lacking is the data to move into such markets or, an idea of what the limits of liability are likely to be. Insurers are not familiar with either forests or the costs of mitigation of hazards associated with the conduct of timber operations. They would have to acquire that data over time and through research. No single insurance product will cover every need. There will be a motive for a much more intimate relationship among property owners, practitioners, and insurers in order for any of this to work. A similar approach can be utilized on an individual or neighborhood basis toward drainage control and landslide risk management, road evacuation efficacy, or earthquake hazard reduction and emergency preparedness. All it takes is the will on the part of people to get the insurers out of their protective shell of regulated pricing and into the businesses of risk reduction and financing. Society would be richer for it and so would the health of natural habitat.

The insurance industry rightly fears the possible magnitude of the limits of liability for economic externalities related to the environment. This is because we are operating under conditions of ambiguous political valuation and the endless greed of rapacious lawyers. We have thus reverted to government regulation, out of the need for "protection." In that respect, civic accountability (or the lack thereof) could be a net subsidy. Civic regulation certainly lowers the overhead required for measuring individual ecological risks and competitively pricing them because it doesn't get it done, but why should the public subsidize that mismanagement of risk analysis?

Insurers currently risk catastrophic financial loss due to an underbid market. The problem is that every time there is such a loss, the State raises the rate base and everybody goes back to what they were doing without accountability to shareholders. Why should the public subsidize that mismanagement of competition? Government misallocates resources to adverse environmental impact because it won't allow insurance companies to measure and price differential risk based upon behavior. Besides the obvious political interest groups, whom would we be protecting? We are protecting the very people who funded the tax-exempt foundations that supply grant money to the NGOs. It makes an interesting test of industry claims that bank and insurance regulation is so often unjustified. What unfortunately happens, is that we collectively lose wealth and cause environmental damage because we fail to address the questions of risk and correctly apportion the costs. The banks and insurance companies don't need to manage the range and extent of environmental risk because you pay for it with FEMA, the FDIC, etc.

Wouldn't it help our society to have individual reasons to work together to reduce the cost of problems rather than simply operating out of denial? Would it help the bottom line of insurers of resource enterprises to finance the environmental risk reduction as a business? How would those environmental enterprises be defined?

Property Transfer Functions. This discussion centers upon rural residential development. The selection of this subject does not represent advocacy of additional development. It is a set of familiar issues, to which existing law applies.

1. Determining ownership of many products of ecosystem processes is difficult. They do not usually respect traditional property lines because many are mobile, chaotically distributed, and have overlapping boundaries. They are not tradable or valued when the parcel is considered as a single use. Some operate on a minimum scale too large for a single owner. The land people own is not pristine, pre-Columbian habitat. It is the owner's investment. When the owner chooses to vacate, it is a choice to discontinue operations in that location. The potential buyer considers the property as an existing or abandoned operation with the intent either to continue operations or to convert its use toward a more attractive return on investment.

Public claims on the use of private property have induced owners to sell. The public often extends its claims by citing historic "damage" for which they hold the owner accountable. The historical record of the original transaction that induced the damage, therefore, demands close examination. The transfer price of a parcel represents the investment value of its assets employed toward the use anticipated by the buyer. The price and assessed value of any parcel reflects its intended use.

A farm or tract of timber does not typically include appraisal for residential value and residential buyers do not include appraisal of the value of soil fertility or standing timber. Neither of these uses includes an accounting of endangered species, range for large carnivores, rain percolation, or the contribution to the health of downstream flood control and fish habitat in the appraised value. These are unvalued (or in some cases negatively valued) assets that, for purposes of this discussion, will be referred to as external land assets, so called because somebody besides the owner derives a benefit or expense from how those processes are managed. The buyer typically is not notified of these externalities at the time of purchase, nor are they considered in the purchase price of the land. Unless the property is encumbered by specific legal or regulatory action, the land is only worth the investment value of those assets applicable to the anticipated use. The rest of its assets are not recognized in the purchase price unless they radically effect the intended use.

2. Land purchases are legally equivalent to the purchase of the entire balance sheet of land assets including unaccounted externalities not related to the intended use under purchase. The law assumes that when a person buys title to a property, unless contractually stated otherwise, they have purchased all the assets and liabilities of that enterprise. If a buyer finds gold nuggets or rare antique liquor bottles on the parcel, they belong to the titleholder unless mineral rights have been deeded away, or recovery of artifacts is prohibited by law. If there is a hidden toxic dump on the site, or a problem with a road, those belong to the new owner, as well. It is up to the owner to settle with sellers regarding non-disclosure should the problem have existed before the transfer of title.

Suppose that there is a road on a property that was constructed for the purpose of removing logs in the 1920s. If the current owner bought the property in 1960, the road was likely to be considered an asset at that time. The buyer may have paid more for that land based upon the economic benefit of roads. It was fire control access. It was a way to get maintenance equipment to the more remote reaches of the property. It was a way to get to a potential home site, should the owner wish to subdivide the property later. It also had potential value as a hiking trail for scenic access or for hunting and fishing. It retains every one of those potential uses to this day.

3. Democratic claims against the historic uses of the asset, and its potential transformation products, change its value after the transfer of title. Suppose that a downstream city that consumes the water has grown in population and uses more water out of the river. The road collects rainwater, and concentrates the flow of runoff. The urban water users assert that all such roads are potential drainage or erosion problems or threats of additional development and that they must be upgraded or removed, even if no demonstrable adverse impact exists with any particular road. That threat of sediment is regarded as a liability belonging to the road owner, placed upon water consumers who supposedly have a legitimate expectation of a pristine forest draining into a democratized commons: "our river."

These adverse impacts may be somewhat true. One would think, however, that access for fire control was still important. One would think that a conflagration would cause more landslides, sediments, and other problems for spawning fish than a few cubic yards of erosion every ten to twenty years. A road certainly makes habitat restoration efforts (such as removing weeds and managing controlled burns) much more efficient and less risky. Does this mean that we get rid of all such roads? Who decides upon which roads to keep or how they are to be maintained?

These claims are often subjective interpretations of "ecological damage" supposedly visited in the past projected as a liability against a parcel. It is assumed that the only transactional beneficiary and sole perpetrator to this "misdeed" was the original property owner. Thus, all future costs to remediate "the problem" are somehow to be borne solely by subsequent property owners when they purchase that resource enterprise. There is no means or opportunity for a transaction to weigh these externalities objectively because . . . .

4. External assets cost or benefit someone other than the owner. Other people, besides the owners of the road, have personal opinions that determine the negative economic worth of the risk of sediment from rural roads, versus pristine water quality at high extractable volume. These people have no immediate use for it as a road, but do have a collective interest in water quality. Because they don't want to pay to buy and mitigate the road, that mitigation requires a coercing agent. The only effecting agent at the claimants' disposal is government. Government rule systems are particularly bad at weighing individual cases, especially when designed in service to the interests of either the politically dominant or its own.

The urban party to the external claim upon the road has historically chosen to impose such regulatory restrictions upon all private roads politically, without consideration of their benefits. The legal and political effort to force mitigation of one road is not much less than to do so for all roads. The "responsibility" to mitigate roads is coerced out of the owners because the state has the power to do so and the democratic majority doesn't want to pay for it. Failure to comply then constitutes a crime, whether or not an actual problem with any particular road is proven to exist.

5. Retroactive claims on the use of land disregard the participation of the beneficiaries of the original transaction. Besides the original owners, there are other transaction participants that benefit from the original road construction for tree removal who did not pay for the externalities of lumber production. These people are also the sole beneficiaries of the subsequent retroactive political imposition of "remedy." Let us consider the original transaction upon which this conclusion is based.

The parcel owner, at the time the forest was originally logged, priced the logs in a competitive market that would not pay for any consideration of externalities, such as sedimentation of watersheds. The consumer of that product did not pay, and would not pay in any way, for habitat mitigation as part of that product. Much of that material, sold long ago, is in use to this day. These houses, located primarily in cities that were built of these materials, bring no less a benefit to their current owners, than those in new houses. Higher current construction costs are due, in part, to more expensive materials that reflect the mitigation costs of recent timber harvesting standards. The capital gain on the existing homes reflects the replacement cost of the original lumber, induced by the current cost of mitigating those original externalities. That capital gain accrues entirely to the urban homeowner of the old house. None of that capital gain accrues to the original producer of the lumber or the current owner of the enterprise, indeed the opposite. The owner incurs a liability and a significant operating cost.

The current urban owners of that lumber in houses, holders of all that capital gain, politically demand that the current property owner (who probably did not materially gain from the original sale of the lumber) pay for the mitigation of the activities of the original property owner. Those original harvest processes were performed to the legal standards of the day as permitted by the agent of that primarily urban public, the government. The sole parties benefiting from the mitigation are the urban homeowners, who demand it by political means, derived by superior numbers, and government bureaucracies who demand it using the police power of the state.

Political valuation is not only counterproductive to the protected resource itself. The public either pays too much for grudgingly executed mitigation in the products that it buys or it induces an artificial preference for substitute goods and subsidizes needless damage to ecosystems therewith. The former carries with it needless civic overhead for compliance and enforcement systems laden with expensive administrative and legal conflict. The substitute goods are either a direct substitute (supplied by a competing producer elsewhere) or a product substitution with a competing good. Substitute goods carry their own externalities, borne by those who suffer them where they are produced. Worse, if because of such subjective valuation the best of property owners are driven out of business, then their land is either converted in use, sold to inferior competitors, or abandoned to civic control. Disturbed habitat cannot revert to anything even resembling pre-Columbian condition without an enormous amount of work. Finally, there is the inevitability of catastrophic fire, weed infestation, and the like.

How does one objectively balance the benefits and liabilities of the road? The answer should depend upon its unique characteristics. One has to go through the steps of evaluating the risks and benefits of any road to arrive upon the balance of its total asset and liability accounts, including externalities.

The total value of ecosystem assets is seldom reflected in the market price for land, nor are the assets severally tradable. When these assets extend across property lines, are fragmented, or are mobile, the situation is more complex. Without appropriate boundary definitions, we are left without bases for transaction contracts. In a very real sense, without property boundaries there is no property. Let's look at the factors below and see if there are some principles that apply toward a new way of defining the problem in such a way that total solutions become simpler.

As competition for uses of property becomes more acute, the demand for precise property boundaries becomes more important. The physical attributes of resource assets that confound boundary definition include: mobility across boundaries of ownership, combinatorial factors among resources and processes, changes in technologies employed in the use of land resources, and discrete versus continuous physical properties of particular assets.

Constructing a definition for a claim of ownership has had much to do with the perception of permanence, or residence time of an asset within specific boundaries, as does its scarcity. Fluid resources, such as air, are sufficiently mobile and inexpensive that no one has bothered to define "air rights." In many locations throughout the West, water is relatively a scarce resource. Boundaries and contracts governing water rights are more difficult to define than for dirt because water is a continuous fluid capable of mobility across property lines. Other mobile goods can be regarded similarly. An aesthetically pleasing view of a landscape is an asset that crosses property lines instantly by reflected light (photographic rights to the Monterey Cypress or the Golden Gate Bridge are famous examples).

Even things we commonly regard as "fixed" can be treated as mobile as long as one opens the span of time for the movement to be significant. Such changes can happen more rapidly than is commonly supposed. This has been demonstrated in more than one dispute over property lines defined by rivers, where riverbanks can be very suddenly relocated by an earthquake or flood. No resource is perfectly fixed. Perhaps this problem with mobile assets is more about how we define ownership than about how we define boundaries. When highly mobile resources become scarce, the definition of ownership boundaries gravitates toward control of the means by which the asset is transported and distributed and the manner in which its state is transformed. A typical such example is the definition of water rights: both riparian and underground.

In our case of water rights, it is not as important to own the water itself, as it is to be able to control it. It is nearly impossible to stop water from leaving the property entirely; it evaporates, it leaks into the ground, it leaves in animals, or runs downhill. The owner of the water has the right to use an asset for which ownership is defined, such as the earth within a bounded region with which to make a reservoir. That asset collects, stores, or transports the water in usable condition such that it can be extracted for use. What one can control, and what does have value are the physical process assets that change the state of the water, for example, the dip in the ground in which to construct a reservoir. The water thus acquires potential value once it is contained, in part, because a claim of ownership is no longer so ambiguous.

There is no actual value in the water until it is used, even if that use is to support ecosystem assets. People may have various opinions about its relative usefulness, depending upon what it solvated, suspended, or cultured, prior to their intended use. Condensed water may fall onto the property as snowmelt and collect a few ions on its way into a creek. It may be ingested by animals, and then expelled onto the ground along with a few amines and salts undesirable to people, but very desirable to plants. After soaking into the ground to be greedily consumed by bacteria and roots, it might be thrown up a pump, or cross the property line underground. It might leave the property as vegetables for sale or escape as vapor.

No one cares as much about the water itself as its condition and availability for a specific use. They care about the degree of control they can have and what it will cost to acquire. Thus, the issue of ownership of a mobile asset is about how it is contained and used. How an asset is used is all about the process assets used to control it.

It is the physical properties of an asset that determine the simplest manner by which to define a control boundary. Water is easier to control as ice than as a liquid, or more controllable as liquid than as atmospheric vapor. It is well contained within a cow, but not for long. That all physical materials are dynamic, and that they are transformed in state by process assets, is at least something all resources have in common. If one can then define ownership of a process asset in terms of how it changes the state of a mobile good as it crosses a control boundary, one then has a powerful definition for private property that can be applied to a number of vexing problems. Could we use that commonality of motion among all resources to simplify the characterization of the behavior of the resources that cross the control boundary from a philosophical, and perhaps legal, perspective? Would that then determine the characteristics of the asset?

It should not be surprising that if control of the use of process assets really is the issue in creating a market in ecosystem management, then control system mathematics might be a useful model to characterize the operating principles. Control System Engineers use a capable range of mathematical tools to describe how signals propagate through a device called transfer functions. The idea is that if you assume a bounded and controlled environment and insert a series of known inputs and measure the outputs, you can eventually learn how that environment will respond to dynamic variations of known inputs. The mathematical description of how the environment modifies that unit input is the transfer function of the system. One then uses the math to describe all inputs as scaled and time-delayed multiples of a basic, unit input. It is not necessary to know everything about the internal workings of the environment to have a useful mathematical model with which to characterize system performance. Chemical engineers use analogous tools to describe processes called characteristic equations. These can be as simple as polynomial approximations of a system derived by statistically designed experiments.

Regardless of the approximation tool applied, it is paradoxically true that the only way to successfully analyze how an ecosystem asset interacts with its seemingly limitless surroundings is to limit analysis of its inputs and outputs to that which transpires across a control boundary. By using these descriptive tools, one might then define real property, not so much as a bounded region with internal activity, but as a right to control and manipulate processes within control boundaries through which resources are transported and modified along the way. There are important practical benefits to this philosophy:

1. The legal description of the boundaries matches the physical attributes of the asset. This directs the legal and financial descriptions of those attributes toward manipulation of characteristics pertinent to their value.
2. There can be no ambiguity about whether civic constraint of a use is a regulatory taking of private property, because all real property is defined as a right to control the use of assets.
3. Consideration of the public concern over a manner of use of such private process assets can be addressed through a free market and a civil risk management system such as Insured Certification.

What if one finds a new use for which there is no previous definition? If it is a good investment then patent and license it. Then purchase contractual rights from property owners. It really makes proprietary process development of means to improve the use of resource assets worth the trouble.

There are minimum economies of scale, necessary for some of these intangible process assets to operate economically, that have no interaction with or impact upon other valued uses (orthogonal to the respective transfer functions). How does one deal with process assets that are themselves continuous? If the asset control boundary held by a single property owner is too small to be worth an investment, might there be an interest in buying or leasing rights to the totality of uses in the area? Is there such a thing as fractional ownership of a land use, or a contract for rent on a use, that can be exercised upon a regional basis? Is there a way to unitize such a product without property owners ceding away all their rights to the use of their land? Is there a way to market these uses while protecting the interests of other users on a parcel?

Every property has attributes that do not possess market value until they are combined with other goods toward completing an economic use. The total account of resource assets, as applied to these combinations, are unique to each bounded parcel and each prospective use. For example, groundwater has different value for irrigation versus mining. The highest value is found in the most profitable combination of uses and resources particular to the parcel. Each use of property requires a combination of physical, technological, and market factors. It is intuitively obvious that some parcels are particularly suited for at least one purpose, lacking only investment to develop or compensate for its lesser attributes to complete a profitable composite use. Each property has a different total account of these asset composites and investment requirements, relative to other available parcels. Every selection of a combination of uses is a compromise, especially when some eliminate the possibility of others.

To combine the attributes of a parcel into a functional composite often requires at least some modification of one or more of its attributes. We do needless damage to both habitat and capital when these alterations are necessary or beneficial uses are forgone, simply because of legal boundaries or the cost of paperwork. The degree of ecological compromise can be reduced if we make land assets more fluid such that their attributes can be allocated optimally or combined into functional units. To make a particular combination of assets a functional entity thus requires the ability to assign control boundaries of the necessary assets such that they circumscribe or conform to the requirements of the process.

To maximize total value would then entail that those attributes, unnecessary for the conduct of a particular use, be combined or employed toward their highest valued combination of uses. The obvious means is to move the control boundaries of the constituent assets in order to combine them into their respective composites through purchase of suitable contracts for use of those constituents. Conversely, when unemployed constituents overlap, or lie across traditional property lines, they can bring a return by selling a similar contract by which a composite is completed. As each of these uses is unitized and maximized toward its maximum potential, total land value increases. Even if that use is for the parcel to remain undisturbed, under this regimen, it would be that particular parcel's most valued economic use.

Completing a composite use therefore involves several requisites:
1. It must be possible to complete the entire set of constituents. A site for a residence, having no adequate route for an access road, would not be so considered. Attributes or uses of other parcels can be purchased in order to complete a composite use. Assets to be combined as a system, need not be adjacent in order to be functionally complete, as long as they are connected through an appropriate transmission medium. Were one to invest in a chain of wetlands to support a migratory bird, one would regard useful proximity to be perhaps the distance of a safe day's flight.

2. The scale of operation should be appropriate to the attributes. A plot of land must be at least a minimum size to be a successful farm or National Park. Scale can be offset by a concentration of value. Somebody would definitely go to the trouble to stake a claim on a one-cubic-meter gold mine if it were comprised of a solid nugget.

3. The technology to take advantage of the use must exist. Changes in technology can reconfigure the allocation of assets toward new uses or modifications of existing uses. Without the technology to pump water over mountains, Los Angeles could not exist as it does today. There would be few houses on ridges without water transport technology. Soft rock or level soils were once more suitable for building a road and residential footings because they could be easily dug out and graded. Modern equipment has reversed that desire, so that houses on ridges or slopes can be more secure in an area subject to earthquakes or landslides. The trick is then routing the access road. Alluvial bottomland near riparian areas once useful for roads and residences might now be considered for other purposes.

The original design of property lines reflected the uses of land as perceived by the original settlers, appropriate to the markets and technologies of the time. It is insanity to spend hundreds of thousands of dollars shoring up an unstable slope so that a driveway can get to stable rock, simply because of setback requirements from property lines that reflect design considerations based upon the use of picks, shovels, and horses.

Improvements in land surveying technology resulted in a demand for accurately calculated, fixed artificial boundary lines instead of physical landmarks. As the demand for consideration of particular physical features becomes more acute, these nice and precise lines begin to have their own unintended consequences. They sometimes break up usable resource regions into unusable subunits, or cut off access to a critical resource. One should be able to move the lines on the paper more easily in order to adapt appropriately to new land uses, given new technology.

4. The precision and tolerance of a property line should be appropriate to the intended use. The greater the demand for a resource, the more important it is to define the boundaries of ownership with great precision. People care about who owns every fraction of an inch of downtown Manhattan, but might not worry too much about a property boundary tolerance of a hundred yards in Southern Utah.

The cost of unnecessary precision is a barrier to investment in resources with marginal returns, particularly those with enormous minimum scale and few interactions with other uses. There is no need to know the boundary of a timber harvest to the nearest hundredth of an inch, much less that of a desert ecosystem. To motivate a market capable of weighing minute distinctions in the management of resources demands that we reduce costs to a minimum.

Complications to property transactions encumber its optimal combination of uses. There are currently limited means to broker and insure transactions in ecosystem assets because it is obviously preposterous to invest in a complex, expensive contract for a use of something that returns next to nothing. Property owners will not go the effort of adjusting boundaries or selling shares in bounded ecosystem assets until it becomes less difficult and less expensive to do.

There is only very specialized understanding of how one might write contracts in uses of ecosystem processes. Current consideration of such resources is incorporated within contracts and permits controlling other uses with significant economic worth. They are considered only as costs. It might not be so unlikely for an owner to consider each component of land value for its distinct profit potential, once its economic value is measured and transaction costs are minimal.

As complex interactions among ecosystem assets become better understood, it will be simpler to construct standard agreements about the manner of their use and how their boundaries are defined because of economies of scale in the volume of transactions and analysis. Control of a constituent asset could be marketed through an easement, rent, contract, partnership, or formation of a corporate entity. Once such uses are characterized by mathematical model, the agreements governing their use can be constructed with software as easily as we do stock market trades. This could be a whole new business by which the skill sets of title officers and insurers might market their products by the degree of risk specific to the type of use. The market can exist only if an objective accounting of the economic value of the risk exists.

Government has instituted policies diametrically opposed to open markets in ecosystem assets by virtue of its monopoly to administer democratic claims. Few people recognize the cost of preferential regulations restraining trade at the behest of organized groups of State licensees. First, consider the case of title transfers and real estate.

Current regulatory law in the County of Santa Cruz, Calif. demands that each residential lot meet all the functional requirements to support a residence before allocating a permit. It is called the "bio-dome" principle. It was proffered as another way to "resist development" by attempting to render fewer parcels appropriate for construction. This "unit-compliance" policy has a tendency to disperse the distribution of homes to the best location within each set of existing property lines. The law forces property owners into far more elaborate and expensive adaptations to the less ideal circumstances specific to each parcel, and requires more overkill engineering and civic administration. These adaptations in the name of the "bio-dome" are often unnecessary consequences of zoning laws, building codes, and inflexible property boundaries. But, they really made it easier for real estate agents to "unitize" each parcel entirely in terms of its residential potential.

It backfired. Now every one of these compromises has to have its own technical analysis and disclosure at the time of title transfer (when it is really too late to be telling the buyer). The net impact is to have massive legal title documentation of a non-optimal situation that does little to prevent a problem. The technical points end up lost in a blizzard of details that are patched up to close the deal and then forgotten, until huge amounts of money have been spent to file for a permit and something hangs up the whole thing, often after significant physical disturbance of the parcel. People get sued.

The people who pushed for the bio-dome law probably had little idea how inventive prospective homeowners and their contractors would be in devising ways to force their will upon the land, or maybe they did? It was certainly a good deal for contractors, civil engineers, consultants, and trade unions.

Sometimes the requirement for a license ends up as an extortion scam. (It is not exactly a good use of capital to pay $65/hour for a $10/hour person to "witness" a grading and compacting operation in order to make certain that there are no roots in a fill.) Professional license requirements make numerous, easy jobs inaccessible to professionals with cross-functional training in the name of restraint of trade, professional liability, and barriers to entry. The lack of that cross-functional, synthetic capability leads to the understandable behavior of covering every one of those professionals' interests, to the exclusion of all else. The bio-dome is yet another protection racket without the protection. It is a significant barrier to trade in a market of fungible resource land uses. Limited rights of use could be traded and combined across property lines instead.

Ecological tradeoffs are seldom given the weight they deserve when but a single professional interest is at heart. If the barriers to trade drop, the total volume of analytical work to determine which among the available technical options is best will rise. There is little recognition of the potential to be found in a larger total volume of analysis at lower overall liability, but at least we would end up with better development. If they all operate under the umbrella of an insured and certified best practice general contractor, who knows when to hire a licensed professional and when it is a waste of money, isn't it covered anyway?

Turnover and instability of ownership have hidden ecological consequences that are difficult to quantify, but easy to understand and observe. It takes time and dedication to learn about the unique characteristics of any piece of land. People who are more experienced with local ecology are less likely to make mistakes in their choice and manner of uses but, if they are at risk of losing the land, the incentive for long term investment is lost.

Instead of selling land outright, use contracts could transfer at higher velocity without such drastic impacts as sales. Tradable assets foster interdependence and socialize people. They bind neighbors together with motives to cooperate to solve local ecological problems. They reduce the need for unnecessarily replicated tools or site visits by heavy equipment and government "surveillance." They make people more cautious about the character of their prospective neighbors, thus making impeccable integrity as a neighbor, a personal and group asset. Economic interdependence, generated through collective enterprise in economic land uses, stabilizes communities, much to the benefit of families. It slows the spread of development and reduces environmental impact because collective interests more often bear on individual transactions. A body politic, more familiar with local ecology, is less likely to make political misjudgments about land use and care more about neighbors. Such interdependence complicates the sale of entire bundles of these overlapping investments as real estate transactions, but need not do so when the sales are in but a single use. Such a market in freely exchangeable boundaries of property uses would considerably ease the process (and reduce the trauma) of suburban "in-fill" redevelopment, by unlocking sites theretofore unsuitable. Redrawing boundaries for land uses can mitigate many causes of water pollution such as roads, septic drain fields, and overdrawn water rights. By trading in uses, small or marginal sites could be more easily "unlocked" from existing constraints. Property lines might be redrawn to take advantage of changes in technology. A property owner could buy an alluvial parcel, too unstable for a house, as nothing more than a commercial drain field to accommodate a rather smelly mobile asset with negative value. Roads could more easily be routed and combined, unlocking "in-fill" parcels that are otherwise inaccessible, using site locations as best suits the land and reducing the propensity to sprawl. A site with particularly hard rock could have asset value as a location to dissipate the energy from the fall of winter runoff. A site with available fill dirt, or for that matter a site that could accept it to mitigate an old road, has value that prevents mining and transporting the fill from elsewhere, and more rapidly corrects an existing problem before a catastrophic failure. Whether it is visual impact or the runoff from a horse corral, trading such uses among property owners employs each property in a manner best suited to its specific attributes with lower total impact. A market can instantly balance all the considerations, but only if all such considerations have a market price. Where is the public bulletin board for noticing and trading in these assets and facilitating services?

Not all boundaries defining such uses need the kind of precision tolerances required for urban boundaries. If a walk with a wireless Global Positioning System (GPS) transceiver was of sufficient accuracy for the anticipated use, boundaries could be redrawn and uses transferred very inexpensively. Software could generate the necessary descriptive maps and translate the coordinates into a legal description. Necessary negotiations could be simultaneously completed onsite via the Internet. This would allow consideration of details that would eliminate the impacts of otherwise accommodating a set of historic boundaries.

The key to all of this flexibility is the recognition of a principle: real property is a bounded right to the use of land process assets that transform the state of commons. Once one recognizes that one does not own the dirt itself, but only what can be done with processes within control boundaries, what one then learns is to define workable boundaries for newly identified uses and conclude the appropriate contracts. In the case of a marketed drain field right, one uses a land process asset to remove and process nutrients that are considered water contaminants elsewhere, and then goes about identifying harmonious uses that improve the function at a larger profit. Land use contracts might then be a more competitive market. Those most technically qualified to maximize efficiently the beneficial uses, with a record of success justifying a reduced cost of risk, would have the capital to commit more funds to resource investment operations, much as they do in other markets.

Without a way to trust the motives of the owner, these markets are unlikely. However, owners won't trade or invest in a use over which they have little control. A civil accountability and risk management system, such as Insured Certification, has the competitive incentive to address that balance directly and efficiently and collect the data necessary to initiate the mechanics to account the value of ecosystem resources.

If the public continues to demand a specific use of private property, such as preservation, then they should contract for the necessary management services at full market value. Anything less is a taking. Why should they go looking to government when a proven resource manager is available with incentive to provide the best possible product at minimal cost? Doesn't the public want to pay full market value for ecosystem management services? If the public doesn't pay for such services, where will the money come from to care for the land and who will do the work? Won't it be even more expensive if the government does the work? Don't they systematically neglect the public lands they manage? Wouldn't the contracts for the work degrade into a patronage system? What if the work isn't done and the land degrades into mandated neglect, is there a cost for that? What would be the lost opportunity cost of taxes on profitable operations? Would the bureaucracy have any motive to deliver a self-sustaining system? If they succeeded, they would be out of a job. Don't they have every reason to fail?

Insured certification and fungible property assure diversity in property management strategies to minimize pooled risk and improve the limits of quality. Privately responsible contractors, insured ecosystem assets, and pricing of relative ecological risk into every product, directs people toward the blessings of self-government and weighs ecological risks scientifically and objectively on an interactive basis.

A Synthesis of Principle and Method. The following section details the integration of insured certification, risk-based pricing, and trade in bounded rights of use.

Under current law, no property owner can freely market all the products of the land. As things are now, one does not own the oxygen-producing and water collection potentials of land; one does not own the value a pond has as a stopover for migratory birds. Now, government wants to charge the property owner penalties for deleterious effects, even when largely caused by others who are immune for political reasons or converted their land before anybody cared. Under current environmental law, these ecosystem assets have become liabilities. No wonder they are undervalued.

The property owners are told that those butterflies that just moved in are rare because somebody else converted their land. If they harm the weeds, preferred by those butterflies, the fine is twenty-five thousand dollars and/or a jail sentence. The property owners, still paying taxes on the land, just wish the weeds would die so that the butterflies would leave. If they do leave, that property owner will pave it before something like that happens again. It is a tragedy.

This type of taking is an evil because it removes value from ecosystems and eliminates the incentive to invest in their health. What the "takers" argue is that the assets to be found on a parcel cannot be claimed rightfully by the owner, because their effects beyond the boundaries of the property are necessary to all. Curiously, they find little difficulty in claiming that the owners are responsible for all the liabilities under the same logic. Such political claims are about property, who controls it and at what cost.

These claims were extended because too many people ignored their transformation products and forced their costs upon others. There has been at least a short-term market advantage in doing so, among other reasons, because those who first eviscerated the land of those rarities have had less need to worry about such things as endangered species or riparian resources.

The method of Insured Certification to a Best Practice Process Standard can return some of that market advantage back to the responsible resource practitioner and property owner. The principle of rendering asset ownership across property lines more tradable by describing it as a bounded right to control a use of process assets, as characterized by an operational model, has been shown to have the potential to reduce environmental impact. By themselves, implementing these two elements would be better than what we are doing now. When they are combined however, they can be applied to ecosystem assets that transform the state of commons, extending beyond or moving across property lines. Over the years, wonderful things can begin to happen.

Where the concept of fungible land assets as processed really gains power and applicability to solving major environmental problems is when applied to the "tragedy of the commons."

First, the best practice method sets people free from dealing with needless bureaucracy. They are motivated by that dispensation to use their time and money to study the land and accumulate the knowledge of how its components work as elements of larger systems and what they cost to operate and maintain. The property owner accumulates data, not only on products that now have tangible resource value (such as timber), but also on the other physical and biotic attributes of the property. As these are measured over time, the processes particular to that location become apparent. That recognition leads to a process of discourse among property owners with similar assets related to opportunities to reduce the cost of risk. Discussion economizes the language of resource function into higher order models. It identifies those processes or behaviors that are causes of expensive risk. Such communications lead to negotiations that weigh the relative value of these processes and how they might be combined into functional economic units offsetting other ecological risks.

Second, the owners can then combine their data to identify and consolidate operations of contiguous regional systems or non-contiguous systems that can operate on a global scale. In a search for scientific truth, the motives for collecting and analyzing data is what transforms their application to technology. Rarely are the properties under study fully understood unless free exchange is conducted in an environment that supports profit opportunity. People, motivated by common interests, articulate those opportunities and a language of discourse appears. Ideas are realized, their potential excites, and articulations are clarified. Wishful thinking is vigorously challenged. Justifications for investment are sold and investment requirements are calculated and allocated. Results are measured and, if successful, there is reinvestment and replication on a larger scale. Successful investors then look to successful inventors for new opportunities. Motivation is what transforms empty compliance into research. It is a natural process of being human. The only thing in the way is the all-too-human desire to control the use and take that value, without paying for it.

Civic agency exercises power through collective assent; civil approval is not a requirement. A civic agent is the only person armed with the police power of the state, the power to violate private property rights. Civic agency can discount the cost of land acquisition in the interest of enlisting democratic support, by which to accrue the use and power to itself. Once the value of that good is discounted, there is no longer any value to investment in its development, nor is the process readily reversible. Once control of the factors of production is enforced by sufficient police power, there is no longer any value to the collective claim. In other words, you can't trade what you don't own. You don't own what you can't use. Then what is the use in taking care of it? So nobody pays attention. They'll turn it into a welfare program for trees. If it all goes to hell, too bad. Such is the devolution to a socialized commons.

It matters not whether property rights originate by divine providence or universal public agreement on inviolable Constitutional law, the mechanics of free trade in ecosystem assets demand unyielding civic respect for individual property rights as unalienable. Alienation of the individual from the collective interest, with the freedom to control an asset as property, demands the consideration of free trade in order to alter a choice of how to employ that asset. Without identified and accounted alternative investments, with predictable returns and controllable risks, there are no bases for an investor to weigh options of land use. The question remains, how do we rekindle such public understanding and render individual choices reflective of interdependent considerations?

Communication within a structured context of risk management opportunity is what selects and organizes products for free exchange. Recognition of the economic value of ecosystem resources starts a process of individual outreach.

Perhaps there are marketable contracts in fuel management or services to disperse concentrated drainage flows near a residence on an adjoining property. Data-sharing and contract negotiation is an ongoing process that leads to the combination of the data from one property with others similarly affected. This process helps define how we communicate about ecosystem processes functions.

Discussion of such transactions builds that common language into higher level understandings of more macroscopic functions. Their heterogeneous origins will demand concatenations that themselves induce redefinition and refinement of the data collection and discussion format. It is a positive feedback loop, that simplifies means of understanding interactive processes with multilevel variables and combinatorial effects.

Data, integrated from heterogeneous sources, facilitate discovery of systemic operations on a scale and with a depth, unachievable when managed from the top down, no matter how sophisticated the analytical model. It is far easier to identify systemic function from base data and randomized trials, than it is to posit oversimplified cases for a theoretical computer model, and then query reality for corrections to the lack of fit. Property owners have the benefit of local knowledge with which to identify a spurious or locally inappropriate theory. Trust, as earned by a validated record of excellence, reduces transaction overhead sufficiently to allow the flexibility to experiment with new models of interactivity. Social verification among individuals with interdependent interests can both prevent and limit the scope of needless errors.

Sometimes data bring bad news. An outwardly directed process, with structural provision to manage problems, will seek to correct them early and share the information derived from corrective action with customers and investors. The process necessarily leads to assessment of how plans or problems affect others or how assistance might be enlisted. That motive is founded upon the knowledge that in problems are often found opportunities, particularly when the actors are co-invested. There is then reason to offer or purchase economic goods that mitigate the effects.

Does forming a dedicated corporation sound like too much of a hassle for what appears to be a small asset such as a migratory butterfly landing? It seems ridiculous only because we have little idea how much the existing system really costs or how big the scope of butterfly management might be. It is a hassle to do only because of current costs of transaction and data processing, in large part imposed by the legal system and government. Many transactional externalities exist merely to document evidence for potential lawsuit or to enrich the gatekeepers. The paperwork in resource enterprise incorporation and operations could be completely automated. The corporations currently processing and insuring these transactions could instead be creatively competing at efficient ways to assure low-cost transactions in such management contracts, and marketing management tools to reduce those costs. With the higher transaction volume in use contracts resulting in lower transaction overhead, an investment in butterflies might be justified.

A corporate entity requires cash flow. Historic sources include timber sales and grazing leases. Other uses were combined under those operations to render the total revenue adequate against the cost of management. These simpler forms differentiate as the mechanics of their operation are clarified, the sophistication of targeted marketing develops, and the cost of overhead falls. Early and more traditional products have included recreational access from private roads and trails, hunting, bird watching, fishing, or tuition from educational programs. These exist in scattered locations, but we are still not talking about much money, in many cases because of price suppression by the public park monopoly. Economies of scale will reduce transaction cost but the main reduction in overhead will be that of regulatory cost.

The respective sellers would differentiate their combination and emphasis of specific products with respect to local conditions. Some locations might be more appropriate to high volume timber production, selling open space access, or offering contracts for forest and fuels management according to the preferences of nearby homeowners or watershed management companies. Some uses might not be marketable at all unless multiple owners participate, such as chemical management in a watershed or a range for large predators. Other products might not exist until a network can form over huge distances such as migration stops on a flyway. Such enterprises would extend across whole regions, eventually encompassing global markets. Consider that a network of wetlands on a flyway could well be considered to be such a multinational product, where the birds constitute a mobile asset and the landing itself a transfer function transforming the state of that mobile good. A wetland in a developed area might then be quite valuable because, without it, the whole network is badly degraded.

New products will emerge as the legal instruments in use contracts are automated to reduce the transaction overhead. These can be leases for undeveloped space and unbroken views; charges for rainwater percolation, collection, and transport; maintenance of habitat for predators to pest insects for development of Integrated Pest Management techniques; safe maintenance and retention of minimal populations of pests for test culling of resistive populations and operation of interactive trials. The market can operate under extremely complex requirements, especially when these enterprises are combined and overlaid across multiple regions.

In some cases, the value of these enterprises would rise with their proximity to developed land. People value open space more highly in an urban setting, than they do in a rural setting. (Think of the loss in property value to San Francisco if they paved over Golden Gate Park.) This represents an economic force to counterbalance sprawl. Farms could market some of these "open space" products as an additional source of income to remain closer to urban centers. The purchase of shares in these rights is cheaper than buying the land outright and it retains a source of truly fresh food nearer to the customer. (The value of that product will rise once freshness is recognized as possibly having far more health benefit than does reducing pesticide content.) The same lands can also be used for hands-on education, or rental space for vegetable gardening, as is seen in much of Holland.

A market can integrate the risks and benefits of competing approaches in order to expand the range of potential trials without forcing them toward extremes. Sharing in pooled risk among different approaches balances the temptation to get too heavy-handed. Where a highly extractive approach might yield a great deal more money from operations, the mitigation and insurance costs might tend to offset that approach. A more gradual extraction method might yield less initially, but then yield a cash return by marketing offset services for aggressive experiments elsewhere. The market, in that respect, is self-correcting, as long as the costs of risk can be assessed against the conduct of operations.

Discounted futures can even disperse the harvests according to a time-managed plan by location and according to initial conditions, relative productivity, and superposition of other considerations by site. A civic authority simply can't do that without being subject to the temptations of corruption through the legal power to apply non-uniform treatment.

What has been happening is that the urban public has been taking many of these things for granted, and for free. Public universities, who hold vast tracts of forest upon which to conduct this type of work, have spent years doing research for the purpose of justifying civic takings. Much of the knowledge that is generated is either effectively withheld from the public by poor marketing of information or used against property owners as justification for additional public control of land. These forests are not exemplary. Who pays their bills?

Without the value in, and financial consideration of, what land assets provide we are back to political fights with the resulting mandated neglect and confiscation of wealth that the land needs for its own. This is a compelling argument for the divestiture of civic holdings into the private sector and going through the effort to learn how to weigh the value of ecosystem resources objectively in a free market of ecosystem services.

Every time someone crosses a property line for the purpose of a walk, it is in a very real sense a theft of uncompensated pleasure absconded from the land they came to see. If these things are truly "goods," then the fact that they are rendered more fungible reduces transaction costs that can resolve the conflict of competing claims. One could own stock in that collectively-held asset. The public could buy shares in land use enterprises and make claims or derive benefit as shareholders. This is a mechanism for integrating an external public claim with internal private ownership that is truly voluntary and has a basis in cooperation and common interest.

In review, each property owner can study the land and analyze its individual potential in light of its interaction with the surroundings, as part of the certification process. One can then recognize the net worth of its constituents by having analyzed and recorded the cost of risk associated with its loss. Not all the assets and liabilities to be found on a single parcel are entirely contained within its boundaries when considered as an operational enterprise. There are many ecological processes that can only be considered as such when they are combined with other proximate parcels for a regional process asset to exist. The capital value might not be much for these factors individually, but they could be quite important when considered in total as long as managerial overhead can be reduced. Pricing is derived from both the lost opportunities associated with extortive preservation and the cost of habitat restoration and investments offsetting impacts elsewhere.

In any assessment of market potential, the problems and threats to the health of the land become more obvious and weigh against its total capital value. Market systems have the capability, for example, to determine the capital impact of infestations of exotic species. At least under Insured Certification, there would be a measure of the economic loss associated with controlling pest plants on wild lands that should properly affect the purchase price and known operating costs. In fact, there is a very good case that the mismanagement of what have been historic responsibilities of government, to protect the nation from imported infestations, could be considered grounds for legal action to redress inverse condemnation of private asset value.

Sometimes, though the problems can be overwhelming and something that rightly should alter net worth, the net discount on a parcel could serve as an opening to those with the skills and knowledge to see those problems as an opportunity. What is wrong with that? Recording the cost of exotic species control is a way to price the risk of pest introduction. Such information should be worth money and might best be derived in cooperation among property owners at both the point of origin and the site of infestation.

The cost of insuring transportation companies at risk of introducing pest vectors could be thereby derived. Buyers would then be paying the true price of imported goods. Shipping companies could then justify funding development of control processes by which they could then pass ports-of-call without the extensive inspection we should be demanding from government. If we are going to have a global economy, we must learn to account externalities and assure that they are correctly borne by transaction participants.

Wouldn't it be a wonderful change for our society to be thinking about improving ecosystem health, rather than being so endlessly absorbed with its failings? As it is, the only existing alternative to this system is to sell the land to the government and wait until they remember that they own it. Once they do own it, you will have a long wait before you see a carefully tailored and fully funded plan for the property.

What has it cost us to save the California Condor? This is a case where a hugely expensive, multi-decade preservation program had failed completely before a controversial captive-breeding program was begun. How many dollars were spent in lost resource and land use value during the preservation? How much was spent in breeding studies, behavior analyses, incubation, training, release monitoring, and what are the fines going to be for the homeowners who have the insensitivity to allow the condors to steal the nachos off the back deck? All that preservation with nearly total failure and the birds apparently enjoy the shelter of suburban housing developments. Would it have been cheaper and more successful to have allowed a heterogeneous approach to increasing condor populations? Did we really have to preserve their habitat or would diverse approaches demonstrated that suburban condor overpopulation would have driven young birds with better genetic diversity back into the wild? Is there a benefit to having semi-domesticated, transitional, suburban condor population reservoirs? Would there be people on the margins of the wild areas prepared to make a buck assuring their success? Do we really know? Is the information of how much time and effort that went into the restoration and reintroduction valuable as an indicator of the cost of the risk associated with the loss of other species?

None of these countervailing questions would come into play with a risk-based pricing system. Jealous property owners would have already invested in a critical range junction at Gorman Pass (in Southern California) for its natural process assets as ideal for condor habitat. They would demand too high a price for the land for Enron to buy, compared to other locations with steady winds. Under the current system, Enron had to find out the hard way after years of site exploration and negotiations. A lawsuit stated that their tax-subsidized wind generators threatened to chew more condors into little bits. Under Insured Certification, there would have been no extortionate lawsuit, no bad PR, no political hassle, and no wasted energy on the part of Enron. The benefits of a good management system are not found in how they solve problems, but in how effortlessly they are prevented.

Once the attributes of a parcel are identified and the individual degree of contributions to total utility evaluated, local assets can be rendered tradable, in larger-scale systems. Is there a way for a central planning agency to weigh those decisions or does it just get political? Wouldn't you rather have seen a way to economically value the marshland of San Francisco Bay so highly that it would have been too expensive to develop?

Ask yourself, who are the real forces behind the rural takings as they progress? Greenbelts and other constraints upon "urban sprawl" are advocated by benefactors of the environmental NGOs: investors who wish to inflate the asset value of their urban real estate portfolios. All they have to do is manipulate the supply by location, which inflates the market price of select assets.

Why is it that, though it is often the large timber corporations that do most of the damage, each successive generation of regulations advanced by those same NGOs do more harm to small property owners who supposedly weren't the problem? The big guys and the activists even admit it in public hearings! It is the same story. To the dominant corporation, environmental rules are just another opportunity to flex the muscle of the economies of scale. It is high time for property owners to assume the moral high ground of environmentalism. It is justified. The temptation to corruption makes government a lousy steward of the land.

Let us extend this idea to show how powerful it really is. Let us consider that great human institution, the family farm, and the sense of visceral loss and injustice we all feel at the plight of families, who have loved and cared for land for countless generations, destroyed by our cravings for subsidized food.

What corporations do well is take advantage of economies of scale to make one thing incredibly efficiently. What we need out of resource land management is more than one thing on a frighteningly detailed, site-specific basis. What we feel, in our loss of the family farm, is all the implicit goods that farms provide, disappearing with the farmers when they go out of business. The tragic thing is that the very goods that farms supply, out of which we feel that sense of loss, are those for which we never pay! The more goods we need from them and the more we regulate their lives, the more likely those constraints will disinvest farming and force family farmers out of business when we punish them for not having satisfied our desires. The answer is not price supports, subsidies, or fines, the answer is to return to farmers all the assets that come off their land, and allow them to market the full range of goods their land is best suited to provide.

Cities use groundwater and farms collect it. How they manage pests affects the water and air, but we just tell them to take a yield hit to protect it for us by banning pesticides. Birds need watering holes and a network of farms can provide food, and collect data. Major river valleys require flood plains that farms can provide and manage, while improving their soils, managing silt flows, soil minerals, and silt transport for estuarine deposition. Riverine fisheries require nutrients and insects; farms could allot the frontage to manage that, but what do you pay for a healthy river? Do we get one by stopping everybody from using their land, taking a poorly compensated fraction of it out of production and calling in the Corps of Engineers to do a forced restoration project? When faced with managing all these details among the thousands of products the land provides, we need the loving attention to detail only the family farm can provide at the lowest overall cost. They might have a competitive advantage in a diverse array of resource-based risk management markets.

Imagine that Monsanto is under fire for endangering Monarch butterflies with their Genetically Modified (GM) corn borer-resistant Bt Corn product (there is evidence that it does not, but for the purposes of this example, it works to so suppose). Suppose also that this special corn is a product, resistant to RoundUp® (a broad-spectrum herbicide). Nobody wants the GM DNA to escape and cross-pollinate the RoundUp® resistance with weeds. Monsanto, Novartis, and others responded with a gene technology that prevents the seed from ever cross breeding with anything because it is sterile. Because of its productivity advantages and the risk of escape or crossbreeding wild stock, all seed might then be sterile, available only from a tightly-controlled oligopoly of giant seed corporations. People are legitimately afraid of corporate extortion or a single-point failure of a year's worth of seed production, resulting in a modest public concern called famine. Meanwhile, the GM manufacturers, after having spent billions in research dollars, face expensive political resistance to the introduction of products that could end global hunger.

Through the research process of best practice, a family farmer may discover that you can plant cornfields with some normal, non-Bt seed corn and a fraction of milkweed. These crops could serve as a double risk offset for those who use the improved productivity that genetically altered seed provides. First, the standard corn serves as a store of viable seed. It adsorbs the multigenerational effects of sterile pollen in a calculated yield loss and might even be worked into a fallow crop rotation. Second, the milkweed is a haven for those butterflies that might otherwise be killed by the downwind drift of Bt corn pollen. A clever investor finds some co-conspirators to form a corporation to serve as a migratory chain of non-Bt corn and milkweed fields for the butterflies. They call Monsanto and sell them the potential for a regulatory dispensation. Together, they can then grow more corn on fewer acres of poorer land with an established migratory path for those, otherwise-would-be endangered Monarchs, with perhaps some restored prairie thrown in with the deal. Would it work? How big must these offset buffers be? How many would be necessary for a migratory habitat? Do they need to be contiguous? Perhaps Monsanto would like to know. What would they pay to know?

Motive and Means Meet Opportunity. What is needed, is a system that is more suited to help people find personal benefit in an increasingly sound form of ecosystem asset management. Upon the appearance of such a competitor, one would expect beneficiaries of the existing system and try to scuttle the whole concept. Let's look at the underlying motivational structures and how they might be redirected. Maybe these people could find more satisfying and productive work that can more effectively fulfill the intent of their individual career choices.

The structural requirement, for education and research of the proposed process standard, reclaims university research into a cooperative effort with private industry. It addresses one of the great evils of our educational system: the degree to which students and academics are isolated from working society. Students often select fields of study upon the basis of emotional appeal. Then, after using them as cheap grad student labor, we dump them into the world to "make it" without a clue as to how, and desperate to recoup their investment. The higher the degree, the bigger the loans, the later the start, the more desperate the need to recoup that investment.

Might the research requirements of Insured Certification and classroom participation of experienced property owners in continuing education foster more productive relationships among property owners and the academic community to solve real problems? Might this help return the public universities to the public that pays their bills? Might early internship help students meet people who have been working in resource enterprise for years, before they select a thesis topic? Would students make better career choices if they get a preview of what the work is like? Do they understand the alternative of bureaucratic indenture?

If this invention is considered, then the bureaucracy will demand consideration of its security. Universities and NGOs, living off both public and private grants, will cry foul. Insured Certification will threaten their source of security, by turning grants into venture capital investments. Plutocrats owning massive "charitable" foundations might learn that a world rationalized under the intelligence of an elite is a world limited to the intelligence of a few, and that there are better ways to make money. Resource property owners might consider it worth the cost and inconvenience of continuing education to learn new ways of making a buck on their land. The public will have to stop asking government to control private property without the willingness to pay a fair price for the use. It is unconstitutional and immoral to do otherwise, not to mention ecologically destructive.

There is enormous investment in the current system. How then are we to break the loop? That is where this invention offers hope. It is a dual system.

It is proven that there is a fraction of any industry, interest group, or government that will abuse laws as a means of acquiring wealth. It is the proposal in this work that the current regulatory system should be focused for the exclusive benefit of persons with no intention of adopting resource enterprise management to the standards of Insured Certification.

Insured Certification also encourages any person to join in the ranks of the living and enjoy a system of verified and proven personal responsibility for the process of intellectual inquiry. Though the Insured Certification process is technically and ethically demanding, it would be more fun than dealing with unaccountable bureaucrats. Might there not be less collateral damage to be found in a path of highly-educated personal integrity and the search for creative solutions?

If Insured Certification proves superior to the existing system, those who had no reason to push the limits of best practice, still enamored with winning the cat-and-mouse game with regulators, will have a choice. They can change their ways or go out of business. With fewer victims left to regulate, what will the regulators do? They will slowly be drawn into more productive work. The private management job market will need people with such expertise. What they discover will engender new products and services. We can give these people a place to go with their intent to do good where they can actually realize it in verified terms. We must give them a basis to drop their reliance upon conformation and civic "job-security." It will take massive amounts of retraining, but in that respect, a profit (or loss) can work wonders. So too, can the exercise of individual freedom.

The conversion of our existing regulatory system is an enormous undertaking. However, the goal of any civil environmental management system should be to integrate economic externalities into conscious selections and then use the market to reduce their cost. The returns are thus greatest where the unexpected is being looked for, rather than avoided. There may be some costs, which we may not know how to pay because they are immeasurable to sufficient accuracy by current technology. Though that might seem problematic with the proposed system, that is how things are now. Capitalists, ecologists, and property rights advocates should observe such political resistance, look for its source, see what is at stake, and seek the carrot of opportunity for all concerned. These are business investments, job opportunities, and returns on intellectual property developed from identifying and reducing ecological risk.

APPLICATIONS OF THE INVENTION

Timber and Fuel Management.

In California, the specified minimum clearance between combustibles and a single-family residence in a rural area is 30 feet. Assume a house in a transitional forest region, such as Santa Cruz County, Calif. Is knowing that one has 30 feet of clearance enough information to determine the risk and scope of a fire loss? What is the sheathing material on the house? Is it stucco, siding, or shingles? If the house has a deck overhanging a steep chaparral, the house is a "loser" unless the minimum distance is at least doubled and the chaparral is carefully managed. What kind of bushes they are, how old, and how they are distributed makes a huge difference. If the house is above a slope of dense conifers or bay trees, triple the 30 feet, at least (the flames can reach 300 feet in height). If it is nestled in second-growth redwoods, how old are they? How much undergrowth is there? How dense is that forest? How much water is available at what pressure? Are there roads on the property to fight the fire? Will the fire trucks and forest crews be able to get in while people are choking the roads trying to run for their lives?

Many of these houses use electricity to pressurize their water. In a fire, the power is the first thing to go. Some have embrittled PVC water pipes on top of ground. Many are standing on 4×4 wooden stilts with skirts made of wooden lath. They have redwood siding, or worse, shingles. Many have inadequate roofing and tree droppings in the rain gutters. The trees are huge, often lean, and have heavy overhanging branches. The slopes are so steep and the roads are so narrow that some cannot accommodate a fire truck at all.

The price of residential insurance coverage is largely determined by a rating of the roof material, the age of the building, and how far the house is from the nearest fire station. Think about the above. Should everybody have the same spec and pay the same insurance, regardless of the surroundings? If the house meets the 30-foot minimum clearance then, if it burns, the insurers have to pay and pass on the cost to the entire state. Does that make sense?

Lighting prescribed fires under such legal and physical circumstances is insane. Banning prescribed fire protects CDF from accountability for collateral damage, should one get out of control. We have thus instituted a regulatory system that is assured to destroy the historic fire balance of the forest and has elevated the risk of conflagration to inevitable. Such a fire will destroy the capital that the fire control systems were intended to protect.

The air quality agencies and their activist sponsors use increasing numbers of asthma cases to justify more stringent regulatory measures. A rule system can only regulate human sources of atmospheric pollutants. In many areas, rules mandating "clean air" preclude burning, even if "natural" air isn't clean. When we have controlled burns with planned ignitions, they make "air pollution," while if it is a wildfire the news media call it smoke. The civic response from the California Air Resources Board (CARB) has been to ban controlled burns in the name of protecting a socialized commons: clean air. Though the air may be "cleaner" in terms of those sources, it may be worse with regard to those that are not. Instead of asthma cases from smoke, CARB may have ended up prompting more allergy and asthma cases due to airborne mold spores from rotting vegetation.

Would environmental agencies destroy the fire-balance of the forests of the entire coastal region in the name of protecting urban air quality while degrading that same air quality by other measures? That is what a socialized commons can do.

Maybe we should try another way? Though the principles of Insured Certification are scalable to large, complex problems, such things are usually comprised of smaller, more tractable problems that tend to replicate themselves onto the variation as exists. No management scheme should be adopted without tests and trials. This first example is an operating experiment to determine how best to manage competing interests in the forest at the rural/suburban interface. It is a first step for a market in management contracts, risk-based pricing, and best practice timber and fire management. It can meet the needs of interested parties, with different tastes and physical circumstances.

Insured Certification can deliver a forest that local residents would find aesthetically pleasing, provide a legitimate income to the forest property owner, and safely reduce the fuel load around many of these homes. It would restore a more natural balance of flora and perhaps fire. It invests capital in forest health and can differentiate to local circumstance. It respects individual tastes, and pools risk to temper radical ideas. It might lead to organized, neighborhood based forest management and habitat restoration activities.

The obvious question regarding this proposal is: "Where will we get the money, time, individual energy, and expertise to do it?" We are spending money now, wittingly or not. A firestorm is a capital loss, no matter who makes money on promises to pay it back. An insurance policy on a $250,000 structure with a $2,000 deductible is around $900 per year. We are therefore talking about a full replacement payback period (assuming no inflation), less a return to the stockholders, of perhaps as little as 75 years without a loss. One might conclude that it is unlikely that the true cost of that risk, plus a reasonable profit, is reflected by the insurance premiums. This remains true even when considered against the future value of higher subsequent rates, statewide. The Oakland fire of 1991 cost $1.7 billion. If one looks at the residential insurance market as a risk management business instead of a regulated form of bank protection, then we are obviously not effectively managing the level of fuel around homes because insurance is not priced correctly. It is a heavily regulated market.

Were one to consider the total cost of a firestorm, including the ecological costs, the current situation in most of rural California would pose an astronomical financial risk. Although fire does have ecological benefits, there are none derived from a firestorm that could not be realized by a series of smaller, cooler fires. Perhaps the reduction of that risk, as a business, might finance some of the work. The State has requested an experimental forest management plan that can take the differences of each site into consideration. They would also rejoice at the prospect of making the activist noise from Santa Cruz go away. They are under pressure from the federal government to provide better protection for riparian areas. A successful trial program would help provide a viable alternative to be applied to the riparian corridors, elsewhere.

As it is, suburban residents in Santa Cruz County are demanding that the Board of Supervisors provide them with either timber harvest rules or zoning laws that maintain the forest on someone else's land to their liking. For most of them, their liking is a vastly reduced harvest with "no cut buffers" around riparian and residential areas. If the homeowner really wants to live in an "old growth forest," then perhaps they want to purchase a management plan from the property owner that will deliver upon that eventual goal.

Careful thinning around houses is expensive. So is the risk associated with a "no cut" alternative. Do the taxpayers want the bill for taking the harvest? The forest won't recover by itself. There is a cheaper way to get what they want.

The only reason these forests are a draw for new homebuyers is that they are still there. At the rate the developers are going, this won't last forever. The real estate industry would find the higher property value of a "gardened" appearance to the forest to be a benefit. They surely do not want to deal with the impact of a catastrophic fire.

Politicians have found preservation of forestlands to be a direct line to higher office. If they get saddled with a lawsuit the size of Montana, the voters will be stuck with a resulting tax bill or fewer services. The politicians would like a way to have what they can spin as a win and have the lawsuit go away. If the whole thing burns to a crisp, it won't look good for their future if it is proven that they had been warned and stood in the way.

Perhaps a possible realignment of interests would form a more functional majority: residents who understood the risk of a fire or trees falling on their houses and preferred a more manicured look to the forest, timberland property owners who wanted to thin their forests, State fire officials who don't want to deal with a holocaust, insurers, local banks, as well as a more progressive faction of environmentalists. Would politicians who fostered a new consensus like to run for higher office upon a popular solution to a longstanding problem?

The timber operators want the work, but more importantly, they want steady work. It helps them size their operations and equipment to available jobs. It makes for a steadier work force, which improves teamwork and allows for continuous training and higher levels of skill. Would that reduce mistakes performing close work around houses? Would they learn something valuable attempting to recreate an old growth forest?

The local mills want the logs, but more importantly, they want to manage the forest on the stump much the way the larger concerns do up north. This reduces inventory costs for decks of logs outside the mill. It allows a rapid response to changes in price.

How disinvested are forest property owners? Where else can you find an industry with billions in assets and no idea within 25% how much they own? Why should some property owners have to cut more trees to pay for permission to do it, while other forests are choking to death? Would it be better if property owners were out measuring their assets, investing in their health, and selling the data? As it is, it's not worth the effort. Might they look for a way to make money, in cooperation with their neighbors?

Foresters would also appreciate continuous management of larger acreage without the need to concern themselves with maximizing production. To participate in the management of forests for aesthetic value might be regarded as a privilege. To return lands to cycles of fire, to get rid of exotic pests, doing scientific work to extend the state of the art, and to see the lands they love maintained as productive forest, in perpetuity, would befit their personal career goals.

The above interests present an opportunity: How do we get people to work together to thin, burn, and weed without either "butchering" the forest or incinerating burning both the houses and the forest?

Were insurance rates reflective of reality, there might well be a real incentive for homeowners to thin for an effective distance around the house. It might seem that the preference of the insurer would be bare dirt, but it isn't that simple. There are other risks involved, for example: landslides, falling trees, and floods. Roots hold hillsides together and dry out unstable alluvia upon which the houses sit. Vegetative cover reduces droplet impingement erosion and adsorbs a fraction of the runoff. Trees protect aesthetic property value but they need pruning. Drainage design is an art form. Who is best qualified to make that call, among all these competing ecological needs? Foresters and timber operators are.

That knowledge could well be a product for sale: Suburban Forest Hazard Management. Properties could qualify for an insurance pricing scheme based upon the landscaping product selected (even if the product is "no cut"). Under best practice management, these plans could recover some of the cost by selling a few logs without the cost of a permit.

It could be a range of products, from a "parkland forest" of majestic oaks and soft, herbaceous groundcovers, to a plan to deliver something similar to an "old growth redwood" stand. There could be a lot in between. They might have various prices for the degree of attention to detail, proximity to the house, value of the stand, and degree of risk. Just imagine how good the homeowners might feel about the knowledge that they were participating in the restoration of local habitat instead of possibly making a mistake. They will end up paying for it, anyway. Wouldn't it be preferable that the money went into restoring the land, rather than rebuilding after a holocaust?

The insurance companies could make money in the hazard reduction financing business. They can use what would have been the first few years of higher premiums at the total risk rate, apply it to the net cost of the work, and put the policy holder on an "easy payment plan." Society can stop throwing its capital down the dumper and incurring needless ecological damage every time we have a catastrophe for which we have not prepared. The price of the insurance would reduce the attraction of forest housing.

This same philosophy can work without a marketable forest. The insurance industry could contract retired firefighters, fire contractors, or foresters specializing in vegetation management to assess the property for its fire risk status as a periodic cost of insurance. The policy price can be scaled according to the risk score. Without any possibility of a follow-on contract, there would be no incentive for extortion.

There is a risk that homeowners, who possess high fuel levels, inflict not only on themselves, but upon the entire neighborhood. Those who have not conducted risk reduction operations should bear an increasing fraction of the remaining cost of collective risk as others complete the work. There needs to remain a collective motive to assist, educate, and motivate, or drive out, the uncooperative. It is among other things, a socializing force for neighborhood cooperation. If but one remaining person wants to bear nearly the total financial cost of additional risk, to both themselves and the entire neighborhood, and also bear the social pressure on the part of their neighbors, for the privilege of a half-dead Monterey Pine tree, leaning over their wood-shake roof, let them pay for it. It's a free country, or it ought to be. The practice of threatening policy cancellation simply must end. Measure and price the risk instead, including uncertainty.

There are also neighborhood capital assets that figure into total risk. Roads should provide a functional means of evacuation to a safe site, and participation in a system of neighborhood plans for evacuation should be considered. Once a total neighborhood has achieved a hazard reduction attainment, a second collective insurance discount could be derived. It beats being trapped by a random conflagration, every time.

There are arguments that the determination of risk levels associated with fuel management is a matter of subjective judgment. It will remain true until sufficient experiments are conducted and measurement methods optimized. If the effort to make such judgments is not made, how do we get an accurate assessment of fire risk? There is certainly a huge financial incentive to reduce the liability associated with erroneous judgment. There is an incredible array of technical means available for this kind of development work. What is lacking is a reason to develop and market it.

Now, what happens if some of the land in need of thinning to qualify for the insurance benefit is owned by an adjacent timberland owner? This is where the market in land use contracts comes into the equation. The adjacent property owner could sell a contract for whatever applicable style of forestry the homeowner prefers. The difference in present value between the timber resource when managed for maximum capital gain and managed as preferred by the purchaser of the lease, could help determine the price of the contract. It would cost less if integrated into a larger harvest plan as a sector operation.

The timber property owner, or prime management contractor, could collect and assimilate scientific information as part of Insured Certification and apply it to a plan of hazard reduction, mitigation of exotic species, and collection or propagation of local natives in preparation for a controlled burn. The coordination of the specialties, required to complete the work under a fiduciary, provides the means to balance the individual interests of the subcontractors with those of the property owner. Competition in that management market creates an incentive to get the work done at low cost. Insured accountability for failures provides an equal reason not to incur a catastrophic loss.

The work can be done, surplus logs sold for renewable fuels, pulp, or lumber, thus offsetting part of the cost. The insurance policy price increase can be used to finance the initial hazard reduction work over an extended term if a maintenance contract is let for the property. If the jobs look too small for the LTO to consider, the residents might have a reason to do some of the organizational work to coordinate activities.

This plan reverses the current trend of asking fewer acres to produce more wood. The average harvests would be smaller in percentage of material extracted per acre but from more acreage than before, resulting in a larger total harvest. This plan raises total revenue for foresters, and provides tax revenues as well. Most important, it would be a way to help preserve timberland as a healthier forest, instead of converting it to houses or watching it burn along with families, wild animals, and children.

Pests and Management of Environmental Toxins.

The most serious form of pollution today is biological, the only form of pollution that replicates itself. Exotic species, notably plants and insects, convert ecosystem function to a greater degree than any other type of habitat degradation. Infestations are often impossible to reverse. It might be destructive in many cases to try. One thing is certain: we should be almost as concerned about introductions of exotic species as we are about genetically modified plants.

The goal of this system design is to optimize the balance between maximum control of exotic pest species and minimum dosage of toxic chemicals. This discussion will be broken down as follows: vector transmission, pest identification, treatment, and process development, all in service to the stated goal: Maximum Target Reduction with Minimum Total Risk.

Vector Transmission. It is one thing to recommend means to eradicate pests, it is another to prevent their entry in the first place. Control of vector transmission is the easiest way to prevent the need for pesticide application. Federal and State governments do relatively little about it.

The infectious disease model is a good way to illustrate the vector control mechanics of exotic species, as well as demonstrate the mechanics of risk pricing. Suppose that there is an airline transporting people from the tropics where there are known epidemics of Ebola or tuberculosis. If the patrons of the flight into the U.S. come down with Ebola, it is obvious that the international airline flight was the carrier transport mechanism. Why is it obvious? Ebola is rare in the U.S., has easily identifiable symptoms, is highly virulent, and has a short incubation period. The passenger manifests will be checked immediately and all flight patrons will be notified and quarantined. People will rightly complain that the person so infected should have been identified and not allowed onto the plane.

If, on the other hand, the problem is tuberculosis (TB), the symptoms start out looking like a cold and become chronic before anybody goes to the doctor. The diagnosis takes time and the disease is treatable. The energy placed on controlling the transmission is, consequently, less. There is already TB in the U.S., and the airline could legitimately deny that it was the vector transport mechanism. It is thus harder to get anybody to do anything about TB carriers on airplanes than carriers of Ebola.

Similarly, it is very difficult to prove who was the vehicle for transporting an exotic plant or bug because infestations start small and take time to develop until they are recognizable. A colony of Africanized Bees is easier to treat than a Formosan Termite, for example, because their aggressive behavior renders them immediately visible. Most often, however, the vector is a seed or larva. Once they hatch, mature, propagate, and become enough of a problem to be diagnosed, the perpetrator may be long gone.

If the airline were liable for the transport of infectious diseases, they would likely test for the disease, or require proof of non-infectious status at the gate, and then figure out how to make it both cheaper and less annoying to customers. This would provide an incentive to develop and distribute an effective screening process that is quick and cheap. The reason we find this intuitively obvious is that we understand the cost of epidemics and the control methods associated with infectious diseases. The same could be said of exotic species, if only we understood the cost associated with the infestation.

The problems with affixing responsibility for vector transport are several: duration of the incubation period, difficulty of diagnosis of threat, scope of the impact, relative cost of the infection, scope of the control boundary, and degree of prior infestation of the destination host. The two optional systems for transmission control are civic or civil.

Civic: Stop every vehicle and vessel at, or before, the border. Inspect and decontaminate every truck, package, ship container, airline passenger, and boat bilge. Culture all larvae until detected. Hold them up until they are clean. Yes, it would be expensive. It is the size of the trade subsidy as it exists. It might be cheaper to manufacture domestically. Would that reduce environmental impact and increase real wealth, worldwide? You bet.

Civil: Independently certify and audit the importer that validated systems are in place to prevent the transport and introduction of exotic species. Carry insurance to fix mistakes.

Theoretically, no one would want to be an insured and certified transporter unless there is a net benefit, either a reduction in cost for adopting the system or a cost for not doing it. One might assume that, without the threat of civic regulation in transport of exotic species, it would be difficult for a market to reduce the cost through competition. That isn't necessarily so. There is every reason to believe that the containment, inspection, and prevention work can be done by private industry. The research and startup costs can be funded out of the financial need to reduce risk. It is a good business opportunity. Identification and market apportionment of externalities is often an insurance function.

If property owners, marketing the value of their ecosystem resources, sue those whom are identified as vector transporters, the perpetrators should be held accountable for damages equivalent to the cost of control. Without accounted knowledge of that cost, however, there would be little opportunity to make such a claim. It is likely that civil liability for the negligent harboring and incubation of exotic species that spread from private or public property would outweigh the cost of inspection and prevention.

Gosh, it sounds like a lot of work. Who is going to do that? It just might be a productive use for graduates of ecological study programs. Perhaps they would rather actually start a business performing these services, rather than languish in servitude as bureaucrats. We have long recognized, as a society, that these things needed doing. It is time we invested in a mechanism to help it happen.

Once there is real focus on the mechanics of vector transport, through the application of the cost of the insurance to cover remediation, research to reduce those costs will happen. It could be a pressure-washing process for trucks, and construction equipment with pre-emergent to kill seeds. It could be the deployment of detection dogs. It could be machines to decontaminate luggage. It could be antibody detection strips at airports. It could be fresh-water, floating dry-docks off the coast to kill larval shellfish and externally-attached parasites. It could be broadband communications instead of travel. These techniques will develop, once we discover the cost of dealing with the alternative. What we cannot continue to do is constantly transport the DNA of every region on the face of the earth and not find habitats critically altered forever.

Regardless of whether or not a civil pest control system develops, efforts to prevent transport of exotic species over borders should be greatly expanded. This is one of the great failings of the current fad of trade barrier reduction and a legitimate complaint about the World Trade Organization (WTO). The current policy discounts the externalities associated with introduction of foreign pests (including human diseases when the import is labor). It operates as a net subsidy to corporate transportation systems.

We simply must begin, again, the process of vigorous boundary inspections. Without national sovereignty and enforceable borders, such control systems will ultimately fail, because of corrupting influences. We must stop subsidizing "free trade" with the outrageous cost of managing the damage it does to local ecosystems. (New Zealand inspects the boots and clothing of travelers and could serve as an example, but they have a uniquely advantageous and ecologically perilous situation.)

Pest Identification. One property owner's pest is another's native species. This is where global data networks of intellectual property among property owners can have astonishing effect. Not only could it be rapidly known what the species was, but its behavior within an operational niche could be available as well, including interactions with local biocontrols. Because exotics are tightly monocultured, DNA analysis might identify a very localized source of the infestation, and thereby begin the trace to identify a transporter. Such local information is necessary to the development of a remote control strategy, as well as a means to rapidly identify the transmission mechanism by which to halt continued reintroduction.

If you detect the power of accountability here, you're right. Private environmental management can work with astonishing speed if we get the capital we are needlessly flushing down a bureaucratic hole, and invest it in useful knowledge instead. Web-based library subscription services for the identification of exotic pests in all their forms might make a nice business. People should not only find it easy to identify them, they should see an advantage to reporting early infestations. The result would be to lower the use of costly pesticides.

Infestations could then be mapped by species. Click its tag name on a map as a way to report a new infestation. Link to treatment documents for infestation history information. This would be relatively inexpensive. Without telling people that it is there, what it can do for them, and how to learn to use it, these things will remain arcane. It is time for the information to be valuable enough to people who want to retain or invest in property value that they will pay for the information systems.

On a more local scale, once an exotic is identified and the site of infestation posted, a control boundary can be established for either quarantine or the limits of applicable treatment. Here again, a cooperative ethic born out of pooled risk among property owners, not wishing to be infested with a pest, could finance the venue for communication and management of the control boundary through civil liability. The key to such control might be privatized transmission media, including roads.

These arguments again expose the flaws of relying upon civic boundaries for the control of exotic species. The virulence of the pest and the risk associated with infestation will vary by local conditions. If somebody in the road business were liable for the transmission of exotic species, you can bet that more effective and efficient control measures might develop or more efficient transportation technologies. They might find a good investment in concentrating transportation across habitats, inhospitable to vector species. It might shock some ecologists that privatization of roads might benefit habitat. The inclusion of the cost of externalities in transportation would offset the cost of lower labor costs.

The key to making the system work, is the knowledge of the property owner of the cost of risk, acquired as a result of accounting of mitigation operations. Without that data and a civil system to capitalize upon it, there is no ecosystem management, there is only tyranny, wasted effort, and smuggling.

Treatment. Where is it best to develop processes for pest control? Often, it is from where they originate. The point of origination is where the environmental impact of development and testing of control mechanics might be most easily and cost-effectively minimized. There would certainly be no risk of escape. This would be a good business for the poorer farmers of foreign countries. Property owners could have businesses supporting pest control process development, not just from the standpoint of eradication, but from the perspective of preventing a local pest from escaping a local control boundary. Should such cost-effective control measures be developed, it might bring the economic boon of increased exportation. This can occur if, and only if, there is a financial risk associated with such an escape. That risk only exists if domestic property owners have financial recourse for infestations.

Chemical Manufacturing Process Development & Regulatory Review. Suppose a U.S. manufacturer has been producing a successful herbicide for many years. They have billion-dollar chemical plants all over the world. They apply for registration and then the EPA changes its mind? Who pays for that inverse condemnation? Why not just subject the price to a calculated degree of risk? Should the cost of that risk be identified?

Let the developers go get venture money and take responsibility for their products like the rest of the industry through the proposed Insured Certification process. Let them be measured by the same yardstick. When biocontrol species choose a source of food other than the intended host (rather than starve), it can be a disaster. With the system proposed in this invention, the same principles apply to biocontrols as chemicals. That means both will be weighed more objectively.

We should have all the weapons available toward the control of pest species with the goal that overall impact is minimized. There is no substitute for the application of reasoned judgment at all levels of industry, given the variety of threats and conditions. This proposal merely argues that the producer be managed by civil procedure and operational contracts, rather than by arbitrary rules from regulatory agencies. This might return some pesticide production to the US, where it can be watched. If the current structure of pesticide laws had not been on the books, Bhopal might not have happened.

We should junk the practice of pesticide "bans." Their use can be regulated by price when the liability cost of damage to habitat is weighed against the liability cost of the escape of the pest. For example, under this proposal, a few gallons of Chlordane might be available to eradicate an early invasion of a Formosan termite. It would cost a lot for the material, but it beats letting the bugs get loose, and then have to use thousands of gallons of something that is less effective, over a wider area. Toxicity to the environment is a matter of dosage, just as it is with people. Let the contractor make that risk-based decision based upon expert considerations of risk and efficacy and price the level of risk into the chemistry. Few people are profligate with pesticides that cost $500/gallon (they exist).

Individual practitioners will make mistakes, but under this program, the motive to cut corners is minimal. The scope of damage due to an individual might be smaller than a poor decision by an agency of government. Government is capable of huge mistakes, like kudzu, a vine introduced to reduce soil erosion that has infested 27 million acres of the Southeast or when Governor Jerry Brown failed to order aggressive early treatment of a Mediterranean Fruit Fly infestation in California and ended up using vast amounts of the pesticide, Malathion in an urban area.

We should eliminate gag rules on dissemination of pesticide formulation and use techniques circumscribed by label constraints by anyone who can pass an appropriate examination. Put the course and the test on the Internet at the site of the pesticide manufacturer. It could be part of their certified process of verification of buyer competence. Dissemination and improvement of application technique, circumscribed by label directions, could broaden the research base on the best applications and uses of the product. It could also serve as a means to identify people operating on misconceptions.

Research on "host-specific pest" biocontrol methods should be reviewed for safety and consigned to private funding with appropriate application of financial liability for mistakes, similar to anything else in this proposal. Remember that the Africanized bee was a research project that escaped. Since when has the government been responsible for its introduced species?

Dose Management. Civic pesticide management systems use "level of detection" as a way of defining safe groundwater, food, etc. Detection keeps getting better. A measurable value of zero is logically impossible because there is always error and tolerance. "Detectable level," as a safety criteria, is getting so absurd that it has become a pork barrel. No government, including ours, could successfully police the sheer volume of produce entering the U.S. for compliance to such a system.

Rather than trying to ban chemical toxins in food, Insured Certification pest control practitioners would have a motive to research minimum total toxicity methods and price the risk of an error. A redundant civil management system within a supply chain has a better chance of operating with effective internal checks and balances with contracts and remedies than does the policing function of government. Each supplier within the chain would hold each other liable for passing on, or accepting the residues, in measure of the risk to the worker or the consumer.

Humans consume 5,000 to 10,000 times more naturally occurring carcinogens in food, by weight, than of pesticides. Many naturally occurring carcinogens are far more toxic than the artificial chemicals. These chemicals increase in concentration as food rests unconsumed after harvesting. Toxicity of pesticide residues should be evaluated in combination with those naturally produced, for minimum total toxic load, along with the externalities of effects upon the surroundings as evaluated under Insured Certification. Pesticides could actually reduce the presence of the total amount of carcinogen in food by reducing the production of natural toxins by reducing pest attack. The message should be clear: If you really want safe food, grow your own, practicing Integrated Pest Management (IPM) techniques, pick, wash, and consume them immediately, steamed or raw.

The technical name for an acceptable level is the "no observable effect level" (NOEL) or the Zero Effect Level (ZEL). No abatement or mitigation of residues at a statistically significant level below the ZEL should be performed unless the customer wants to pay for it. Research to establish ZEL on established toxic chemicals should be conducted more aggressively than perhaps the studies of the limits of toxicity (the LD50). If we qualify more pesticides, even if they are more toxic, the freedom to use a variety of these compounds in sequence would greatly delay (or could possibly reverse) the development of chemical tolerance in target species. Overall dosage levels would stay lower, and therefore introduction of toxins to the environment would be reduced.

Advertised food information could include degree of freshness and levels of natural toxins when discussing food safety, especially useful for people with a congenital history of cancer. Fruits and vegetables might be date-coded for times of picking and preservation. Ideally, pesticides should be evaluated in terms of total toxic load in goods at the time of sale as used when combined with the toxins generated by the food source when attacked by pests. This is a very lofty goal but when completed one could determine the correct Minimum Total Toxic Load (MTTL).

For example, if the pesticide degrades, it might be safe for a longshoreman to handle a load inside a container that, at the time, might be relatively unsafe to eat. Post treatments, including rinsing and neutralization processes, or the time required for distribution, might take care of the chemical residue by oxidative decay. The benefits are lower cost, fresher food to the consumer, jobs for the foreign workers, and lower environmental impact. On the other hand, if the naturally occurring carcinogens inherent to certain vegetables develop rapidly, the value of a farm, proximate to the consumer, would rise.

Management of Rare and Endangered Species.

The Endangered Species Act (ESA) has done more to destroy the value of private resource land than any other piece of environmental legislation. It started out protecting animals that were being hunted to the verge of extinction. Whether it was passenger pigeons, raptors, or prairie dogs, the main reason for their decline was that people were trying to kill them. Often it was government that was the prime offender, by offering a bounty for the killing.

Early biological surveys suggested that one of the factors contributing to the decline of some species was destruction of habitat. It was argued that, to save the species, their habitat must be preserved as well. Preservation was the usual prescription, whether that included preserving conditions that had contributed to the decline in population, or not.

Consider such a forest property owner that has, for generations, cared for a forest by the best standards of the day, learning to do a better harvest each time one was conducted, and complying with the law, as necessary. The land near the property is being developed rapidly, and because that family has done such a good job caring for it and preserving open space, the government wants to take it to protect some fish or other species, that may be doing fine.

Should the owner resist, the listing of an endangered species can leave the property valueless. It can destroy the ability to raise the capital or provide the cash flow out of operations to mitigate the underlying problem for the species of concern. If the mitigation doesn't work, the owner may be held responsible for the results anyway. The "standards" are subject to rapid change. If the mitigation isn't performed, in a manner preferred by the enforcing agent, the owner can face an expensive defense against outrageous fines, even if the specified mitigation is demonstrably counterproductive. These fines can be assessed without due process, even if the owner is not culpable for the historic decline. Sometimes, the use of the land is taken simply because it might be a place deemed suitable for reintroduction. From the perspective of the property owner, endangered species have literally been transformed into dangerous species.

What property owner would take "the long view" of habitat management, when faced with an escalating risk that the option to recoup the investment in a land use may be removed forever, through the exercise of public power based on a political whim. If a property owner discovers an endangered plant on the property, instead of seeking help in understanding it, the motive resulting from this policy is to identify and destroy the species before the authorities find it. If the authorities protect the habitat, they can end up mandating retention of the very processes that are inducing habitat degradation. Both are counterproductive.

The urban population has demanded that government take control of riparian corridors from timberland owners, even if there is little to no evidence of stream degradation, as a pretext for their use of it as a park. The public representatives declare the forest "too valuable" to the interests of the people who bought the houses and wanted the freeways. Meanwhile, the State still issues licenses to fish for salmon when the ocean survival rate has been established as the cause of decline! Together, the policies guarantee that a firestorm will destroy houses, forest and fish. It is a democratized commons created because there is a majority constituency that got theirs, wants new products from the land, and doesn't want to pay for them.

The suburban areas are already developed. The owners of all those other parcels, whose use was previously converted to a higher financial return, derived all the benefit of the conversion at no cost to protect the displaced species. The owner of that last remaining undeveloped parcel must bear nearly the entire cost to protect that species and be disallowed any reward for their investment, their patience, or even their desire to operate a resource business adjacent to an urban area. Such an owner is, in effect, punished for not having already destroyed that habitat. It's insane. Shouldn't we be thanking these people for finding a way to hold the land intact for all this time, instead? Given that they have been so patient, altruistic, and foresighted, not to plow it under and plant houses?

This idiotic process of punishing those we should celebrate is happening all across the country. The number of cases is so numerous, it really isn't worth trotting out an endless list of horror stories about spotted owls, fairy shrimp, furbish lousewort, snail darters, kangaroo rats, bull trout, and the like, to prove the point. We already know about government stewardship of the land, so what is the choice really about?

What might we do, to get people to look for rare and endangered species and foster their development and renewal, while maintaining a dynamic balance among competitors? This proposal is about what might be done to have property owners protecting them as if they were indeed, buried treasure.

We could take a lesson from what nearly destroyed many endangered species. Years ago, if we wanted to get rid of a "pest," the government offered a bounty. It was effective. Bounties are why so many of these animals were nearly destroyed (including the marine mammals that are now decimating the fish). Could we just do the opposite? Pay people to increase their numbers inverse to the difference between current and sustainable levels? Do they want spotted owls? Do they want steelhead? Do they want jealous protection of the endangered species? Do they want good census data? Do they want it done under the guiding hand of a specialist? Then they can pay for it without having to buy the property or lose all its productivity. Those property owners will invent better spawning pools. They will seek new varieties of bugs. They will learn all about how to optimize the quality of habitat.

Would it cost less to pay people to increase the numbers than pay for all the lawsuits and lost production? How would we qualify the price? How expensive is the land? How valuable is the alternative use? What is the cost of the work to be done? What is the risk of species loss? It would be great if we knew. Through the Insured Certification process, we would slowly find out through that same accounting of mitigating activities and research. It would be no surprise if government ended up paying property owners less for helping endangered species than the price of the lawsuits to property owners, not to mention an enforcement bureaucracy that does little for fish. Such payment need only be enough to motivate the desired result and would yield income taxes in return. It is also likely that a market in risk offsets will replace civic incentives. If it is a good investment, there will be a source of capital to support it. Imagine a commodities market in endangered species credits. Such credits could eventually function in a privately-funded market as risk offsets among Insured Certification enterprises. It would be mitigation, with hard, quantified economic value.

Pay the public, instead? The activists would be apoplectic with fear and rage, "The situation is too delicate! The public doesn't understand! They could make a mistake!" As if the government never has? At least they won't all try the same thing. It would also make the bureaucrats just a little more circumspect about declaring a "subspecies" endangered in the first place. A lot of these declarations of subspecies status are simply for the purpose of confiscating land for variations that are not subspecies at all. Sometimes the motives involve corruption.

The real reason the activists would howl is that they would be losing what they regard their key weapon in "their" fight to "save the environment." Why the fight? Do they have to do the saving? Whose environment is it, anyway? Did they buy it? Is this about career, ego, or results? Since when did "weapons" save anything? Isn't there such a thing as collateral damage?

Who would verify the work and the census data? The certifying body that audits best practice land management and the insurers that finance the risk would require independent verification under this proposal. They could organize and manage the payments system. Because it is a competitive market based upon objective data, it would be less corrupt than what is happening now.

The EPA policy goes so far as to demand confiscation of the use of land to preserve habitat for species, both non-native and of undetermined origin, as if their presence was somehow critically necessary, when the situation may be the converse. It is becoming increasingly common for amateur biologists, such as lepidopterists (butterfly collectors), to keep populations of unique insects secret from the EPA in order to protect the species from civic preservation. If they know that the reason the butterflies are in decline is that the supporting native vegetation is being displaced by weeds, they instruct local property owners how to raise the necessary supporting plants and the importance of weed control, instead of telling the government to protect the bugs. Sometimes the best thing one can do to bring up native plants is to turn over a vacant lot with a bulldozer!

Under Insured Certification, and with the power of creativity that it unleashes, we might even end up with a futures market in risk related to resource assets. There might be speculative value to be found in the knowledge derived of ecosystem interactions, cyclic weather phenomena, and new mitigation technology. The net result would be that capital would flow to the most valuable resources under the greatest objectively-measured and weighted degree of threat or greatest leverage toward improving ecosystem function. The investment would be more cost-effectively focused toward reducing the scope of the problem and its associated risks.

How do we differentiate in value between a wetland on the edge of an urban bay and a corridor among high desert communities? Do they want differentiated experiments? Would those civil servants want to go into the business as consultants? Would they prefer that people who are trained as ecologists, would have an advantage in property markets because of their ability to identify and manage ecosystem assets? Do the people who are currently busy fighting property owners and pushing paper in government want to join the living and start a company? Would it help to have people trained in good science learning to extend the state of the art of improving ecosystem function? Will the government make that happen? If we shut down the productive assets of the nation how then would the work be financed?

Septic System Management.

Septic systems are, in many ways, the ultimate rural sewage treatment method. They recharge the water as close to its source as possible, which is a minimum disturbance to the natural hydrological cycle. They do not require major arterial pipes that are a hazard in an earthquake or landslide. There is (usually) no requirement for electrical power or other utilities. It is astounding really, that the government could turn administration of septic systems into something so terribly complex.

Assume that 5% of the existing systems cannot be upgraded to meet specifications. This is where insurance steps in. An insurance fund can pay to upgrade the system to something more complex or relocate the homeowner and mitigate the site. The insurance premiums might cost an additional 10% of the base cost of each system, but this is wildly less than is being assessed by the government for all the plan checking and oversight being done now. It beats the cost to the community of a personal financial disaster and a public health hazard.

A management system, designed around Insured Certification septic contractors solves the problem permanently. If the contractor guarantees that the system will perform when operated within design limits, that is better than what government does now. Once the guarantee includes operation and maintenance of the septic system, the miracle of the marketplace starts to blossom.

Septic contractors could put together a utility business to manage the systems and guarantee operation. When they take over operation they will probably find that they have a hard time monitoring operation. If a toilet has a bad valve and starts to run 24 hours a day, it can kill a marginal system in the winter. There is a fix: timed flow switches and solenoid valves in toilets. If a house system cannot be monitored for flow easily, because gray water or irrigation systems are mixed with sewerage and domestic supplies, divorced piping systems may be necessary. These things get cheaper and improve under competitive pressure evolving water management systems for the entire home.

A water management system such as this could maintain a marginal septic system on an old house safely until it was economically justified for removal, without a huge waste of capital or a needless environmental impact. It would be a way to create the management instrumentation for a functional water market. There is even more profit opportunity in converting systems that have a high potential for future failure before the event; something the civic system does not address. If a large percentage of the systems are deficient, then that fact may serve to motivate more collective action on a neighborhood basis. Would the local regulators have an incentive to redefine the specification, so that everybody has to come to them for an expensive upgrade with outrageous fees? Watersheds are a socialized commons. Does it work? No. People end up so afraid of the outrageous fee structure that they fear to report or correct outright system failures.

A septic "drain field right" is an example of an unrecognized asset. A site lower on a hill with a field of alluvium could generate open space revenue as a deposition site for houses on a steeper ridge, while being unsuitable for building foundations. This would less likely destabilize slopes, the liquid could reduce the need for irrigation, and the asset value of "view sites," unsuitable for septic systems, could be improved with lower impact and a nice view of an open field. The use of easements can allow neighbors to take advantage of minor economies of scale, for example, with neighborhood black water systems and gray water leaching on each site. This could reduce the occurrence of many of the undesirable compromises affixed when the boundary conditions governing system design is a set of property lines and could assist the process of removing roads from riparian areas.

People have sold water rights, access easements, and redrawn boundaries for years, so that is nothing new. In the past, it has been an exorbitant process, with no independent source of education for the participants to keep the gatekeepers from getting out of control, nor has there been a recognized benefit in reduced regulatory cost. Indeed, there has been government resistance in the name of making development more difficult, but as illustrated above, that claim is more than suspect. The market is constrained enough that the transaction volume is so small that specific expertise in these matters has not developed into a widely recognized professional trade. Once that happens, people with the combination of technical and legal expertise will make such transactions affordable, but first they have to be legally permissible. Perhaps those real estate agents might want to learn.

A private management system will be, in all likelihood, cheaper to operate. It will end the idiotic practice of constructing overkill solutions, placed where they are not needed, or are inadvisable. This will end the legal hassles when the real estate agents come under fire for houses that are sold in summer, only to have their systems fail the next winter. This will end the waste of capital when a person buys a piece of otherwise excellent property, only to find out that the property is inappropriate to the latest change in the State specifications. It will allow in-fill development instead of forcing continued sprawl and allow construction of simpler systems to meet unique circumstances.

When people start asking the producers to guarantee the performance of the systems that they are free to design, install, and operate, these products will improve. Consider, for example, a fire proof black-water hose that eliminates the need for trenching steep slopes and absorbs earthquakes without rupture. The technology won't be invented and these products will never get cheaper unless the public is free to buy them. This is something environmentalists have long understood, but seem determined to mandate it by law.

State septic R&D department employees can work for the people who will make the new products. They actually do have expertise for sale that could be put to better use. There are producers of multi-channel control systems, thermal flow switches, and solenoid valves. Most of the technology is there and it is just a little more humane than condemning the house, turning families out on the street, and paying lawyers to carve up the turkey over lunch. It also beats cholera, typhoid, or dengue fever spread in a winter flood by people too afraid to call the pump truck.

While the present invention has been described herein and many examples provided of the benefits of its application, the invention is not limited to the specific examples, but rather to the scope of the invention as set forth in the appended claims.

The invention claimed is:

1. A method for developing a natural process asset management method as a risk-reduction service, means to produce a performing asset or assets capable of offsetting the destructive use of an asset or assets performing a similar service elsewhere, a source of certified data by which to quantify risk, or a method to be licensed by which to market a product or service, certified and warranted to meet performance specifications to a prospective second party: a customer or customers in the free market, the steps comprising of:

(a) developing an experimental process for improving the condition of a natural process asset that deviates from an accepted standard process, meeting conformance specifications to deliver performance expectations, performed by a first party, the property owner or his agents;

(b) contracting for verification of the experiment and preparation of data collection performed by the first party with one or more persons constituting a third party, a certifying entity;

(c) contracting for indemnity covering consequential damages due to said experiment only, not including hazards of pre-existing conditions, performed by the first party with a fourth party: one or more persons constituting the insurance function;

(d) indemnifying said third party, certifying entity, for risk of failing to perform step (b) performed by a party of the insurance function;

(e) conducting said experimental process performed by said property owner;

(f) validating accuracy of data from said experimental process performed by said property owner;

(g) validating that said experimental process was conducted according to said conformance specifications performed by said property owner;

(h) characterizing the performance of the asset with a mathematical model or other quantitative process description thus completing a performance specification with known tolerances or limits, performed by said property owner;

(i) verifying and certifying said data were properly validated, said experimental process was conducted according to said conformance specifications, that said quantitative process description is accurate, and that said experimental process achieved the expectations of said performance specifications within specified tolerances, performed by said certifying function;

(j) determining a financial cost of said experimental process for restoring said natural process asset, performed by said property owner;

(k) estimating extent and probability of damage to manmade assets and/or natural process assets resulting from a loss of said natural process assets, performed by said insurance function;

(l) using said financial costs of steps (j) and (k) to re-evaluate existing indemnities resulting from to failure to restore said natural process asset successfully, performed by said insurance function;

(m) defining a description of the functional boundary of each process unit, performed by said property owner;

(n) combining functional units into a scale and/or configuration sufficient to constitute an economically viable product or service, performed by said property owner or owners.

* * * * *